United States Patent
Bruening et al.

(10) Patent No.: US 10,773,217 B2
(45) Date of Patent: Sep. 15, 2020

(54) POLYACID-FUNCTIONALIZED POROUS MEMBRANES, RELATED METHODS, AND RELATED POLYACID POLYMERS

(71) Applicant: BOARD OF TRUSTEES OF MICHIGAN STATE UNIVERSITY, East Lansing, MI (US)

(72) Inventors: Merlin L. Bruening, East Lansing, MI (US); Salinda Wijeratne, East Lansing, MI (US); Wenjing Ning, East Lansing, MI (US); Jinlan Dong, East Lansing, MI (US); Weijing Liu, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 280 days.

(21) Appl. No.: 15/524,483

(22) PCT Filed: Nov. 4, 2015

(86) PCT No.: PCT/US2015/058971
§ 371 (c)(1),
(2) Date: May 4, 2017

(87) PCT Pub. No.: WO2016/073565
PCT Pub. Date: May 12, 2016

(65) Prior Publication Data
US 2018/0117538 A1    May 3, 2018

Related U.S. Application Data

(60) Provisional application No. 62/076,286, filed on Nov. 6, 2014.

(51) Int. Cl.
*B01D 69/14* (2006.01)
*B01D 71/64* (2006.01)
(Continued)

(52) U.S. Cl.
CPC ....... *B01D 69/142* (2013.01); *B01D 67/0088* (2013.01); *B01D 67/0093* (2013.01);
(Continued)

(58) Field of Classification Search
CPC ............ B01D 67/0088; B01D 67/0093; B01D 69/02; B01D 69/141; B01D 69/142;
(Continued)

(56) References Cited

U.S. PATENT DOCUMENTS

2003/0198825 A1   10/2003   Mayes et al.
2013/0244338 A1    9/2013   Bruening et al.

OTHER PUBLICATIONS

Ning, W., Wijeratne, S., Dong, J., and M.L. Bruening, "Immobilization of Carboxymethylated Polyethylenimine-Metal-Ion Complexes in Porous Membranes to Selectively Capture His-Tagged Protein", ACS Appl. Mater. Interfaces, 2015. 7: p. 2575-84.
(Continued)

*Primary Examiner* — Dirk R Bass
(74) *Attorney, Agent, or Firm* — Marshall, Gerstein & Borun LLP

(57) ABSTRACT

The disclosure relates to processes, related polyacid polymers, and related articles for functionalizing a porous membrane by contacting the membrane with a polyacid polymer at low pH to stably adsorb a polyacid layer on the membrane pore surface, in particular polyacid polymers including repeating units with a pendent metal-binding ligand or star polyacid polymers. The resulting functionalized membrane is characterized by a high density of free acid groups, resulting in a higher specific capacity for its intended application. The process allows functionalization of porous membranes in a very simple, one-step process, for example without a need to derivatize an adsorbed polyacid layer to impart metal-binding ligand functionality thereto. Such functional membranes may find multiple uses, including
(Continued)

rapid, selective binding of proteins for their purification or immobilization.

25 Claims, 13 Drawing Sheets

(51) Int. Cl.
    C08L 77/02     (2006.01)
    C08L 73/02     (2006.01)
    B01D 71/82     (2006.01)
    B01D 67/00     (2006.01)
    B01D 69/02     (2006.01)
    B01D 71/40     (2006.01)
    B01D 71/60     (2006.01)
    B01D 71/38     (2006.01)

(52) U.S. Cl.
    CPC ........... *B01D 69/02* (2013.01); *B01D 69/141* (2013.01); *B01D 69/144* (2013.01); *B01D 71/38* (2013.01); *B01D 71/40* (2013.01); *B01D 71/60* (2013.01); *B01D 71/64* (2013.01); *B01D 71/82* (2013.01); *C08L 73/02* (2013.01); *C08L 77/02* (2013.01)

(58) Field of Classification Search
    CPC ...... B01D 69/144; B01D 71/38; B01D 71/40; B01D 71/60; B01D 71/64; B01D 71/82; C08L 73/02; C08L 77/02
    See application file for complete search history.

(56) References Cited

OTHER PUBLICATIONS

International Search Report and Written Opinion in International Application No. PCT/US15/58971 dated Mar. 11, 2016, 12 pages.
Carlotti, S.; Labbe, A.; Rejsek, V.; Doutaz, S.; Gervais, M.; Deffieux, A., "Living/Controlled Anionic Polymerization and Copolymerization of Epichlorohydrin with Tetraoctylammonium Bromide-Triisobutylaluminum Initiating Systems", *Macromolecules* 2008, 41, 7058-7062.
Bhattacharjeee, S.; Dong, J.; Ma, Yiding; Hovde, S.; Geiger, J.H.; Baker, G.L.; Bruening, M.L., "Formation of High-Capacity Protein-Adsorbing Membranes Through Simple Adsorption of Poly(acrylic acid)-Containing Films at Low pH", *Langmuir* 2012, 28, 6885-6892.
Ehrbar, M.; Schoenmakers, R.; Christen, E; Fussenegger, M.; Weber, W., "Drug-Sensing Hydrogels for the Inducible Release of Biopharmaceuticals", 2008, 7, 800-804.
Hoffmann, K. and B. Tieke, "Layer-by-Layer Assembled Membranes Containing Hexacyclen-Hexaacetic Acid and Polyethyleneimine N-Acetic Acid and their Ion Selective Permeation Behaviour", *Journal of Membrane Science*, 2009. 341(1-2): p. 261-267.
Meyer, J.; Keul, H.; and Moller, M., "Poly(glycidyl amine) and Copolymers with Glycidol and Glycidyl Amine Repeating Units: Synthesis and Characterization", *Macromolecules* 2011, 44, 4082-4091.
Nagaoka, S., Shundo, A.; Satoh, T.; Nagira, K.; Kishi, R.; Ueno, K.; Iio, K.; Ihara, H., "Method for a Convenient and Efficient Synthesis of Amino Acid Acrylic Monomers with Zwitterionic Structure", *Synthetic Communications*, 2005, 35, 2529-2534.
Naka, K.; Tachiyama, Y.; Hagihara, K.; Tanaka, Y.; Yoshimoto, M.; Ohki, A.; Maeda, S., "Synthesis and Chelating Properties of Poly (N,N-Dicarboxymethyl)Allylamine Derived from Poly(Allylamine)", *Polym. Bull.* 1995, 35, 659-663.
Plamper, F.; Becker, H.; Lanzendorfer, M.; Patel, M.; Wittemann, A.; Ballauff, M.; . Muller, A., "Synthesis, Characterization and Behavior in Aqueous Solution of Star-Shaped Poly(acrylic acid)", *Macromol. Chem. Phys.* 2005, 206, 1813-1825.
Shim, Y. H.; Bougard, F.; Coulembier, O.; Lazzaroni, R.; Dubois, P., "Synthesis and Characterization of Original 2-(dimethylamino)ethyl Methacrylate/Poly(ethylene-glycol) Star-Copolymers", *European Polymer Journal*, 2008, 44, 3715-3723.
Weller, D.; Medina-Oliva, A.; Claus, H.; Gietzen, S.; Mohr, K.; Reuter, A.; Schaffel, D.; Schottler, S.; Koynov, K.; Bros, M.; Grabbe, S.; Fischer, K.; Schmidtt, M., "Solution Properties and Potential Biological Applications of Zwitterionic Poly(ε☐N☐methacryloy☐L☐lysine)", *Macromolecules* 2013, 46, 8519-8527.
Wijeratne, S., M.L. Bruening, and G.L. Baker, "Layer-by-Layer Assembly of Thick, Cu2+-Chelating Films", *Langmuir*, 2013. 29(41): p. 12720-12729.

POLYACID-FUNCTIONALIZED POROUS MEMBRANES, RELATED METHODS, AND RELATED POLYACID POLYMERS

CROSS REFERENCE TO RELATED APPLICATION

Priority is claimed to U.S. Provisional Application No. 62/076,286 (filed on Nov. 6, 2014), which is incorporated herein by reference in its entirety.

STATEMENT OF GOVERNMENT INTEREST

This invention was made with government support under CHE-1152762 awarded by the National Science Foundation and under GM080511 awarded by the National Institutes of Health. The government has certain rights in the invention.

BACKGROUND OF THE DISCLOSURE

Field of the Disclosure

The disclosure relates to a process and related article for functionalizing a porous membrane by contacting the membrane with a polyacid polymer at low pH to stably adsorb a polyacid layer on the membrane pore surface. The process allows functionalization of porous membranes in a very simple, one-step process. Such functional membranes may find multiple uses, including rapid, selective binding of proteins for their purification or immobilization.

Brief Description of Related Technology

Affinity adsorption of tagged recombinant proteins is a vital step in their purification. Remarkably, specific binding of the tagged protein to ligands immobilized in packed columns often leads to eluted protein purities>90%. However, slow diffusion of large macromolecules into the affinity resin sometimes results in long separation times that are particularly deleterious for purification of sensitive proteins or their complexes. In large scale affinity adsorption, column packing is also challenging, and high pressure drops may occur.

Bruening et al. U.S. Publication No. 2013/0244338, incorporated by reference herein in its entirety, relates to a process and related article for functionalizing a porous membrane by contacting the membrane with a polyacid polymer at low pH to stably adsorb a polyacid layer on the membrane pore surface.

SUMMARY

The disclosure relates to a process and corresponding article for functionalizing a porous membrane by contacting the membrane with a polyacid polymer at low pH (e.g., generally less than 4) to stably adsorb a polyacid layer on the surfaces of the membrane pores. As illustrated in the examples, in some embodiments, the polyacid polymer as deposited and adsorbed on the membrane includes pendent metal-binding ligands which include free acid groups. In other embodiments, the polyacid polymer as deposited and adsorbed on the membrane is in the form of a star polyacid polymer.

In one aspect, the disclosure relates to a method for functionalizing a porous membrane, the method comprising: (a) providing a porous membrane substrate comprising a plurality of membrane pores; and (b) contacting the membrane pores with an aqueous fluid mixture (i) having a pH value less than 3.8 and (ii) comprising a polyacid polymer comprising (pendent) free acid groups selected from the group consisting of carboxylic acid groups (—COOH), carboxylate groups (—COO$^-$), and combinations thereof for a time sufficient to (stably) adsorb a polyacid layer on surfaces of the membrane pores, thereby forming a polyacid-coated porous membrane comprising the free acid groups.

In one aspect, the disclosure relates to a method for functionalizing a porous membrane, the method comprising: (a) providing a porous membrane substrate comprising a plurality of membrane pores; and (b) contacting the membrane pores with an aqueous fluid mixture (i) having a pH value less than 3.8 and (ii) comprising a polyacid polymer comprising repeating units comprising a pendent metal-binding ligand comprising one or more free acid groups selected from the group consisting of carboxylic acid groups (—COOH), carboxylate groups (—COO$^-$), and combinations thereof for a time sufficient to adsorb a polyacid layer on surfaces of the membrane pores, thereby forming a polyacid-coated porous membrane comprising the metal-binding ligand and the one or more free acid groups; wherein the repeating units are selected from the group consisting of: (i) repeating units comprising a nitrogen atom (N) (e.g., along with other carbon atoms along the polymer backbone); (ii) repeating units comprising an amide group (—C(=O)NH— or —C(=O)NR—) linking the pendent metal binding ligand and the polyacid polymer backbone; and (iii) repeating units comprising an oxygen atom (O) (e.g., along with other carbon atoms along the polymer backbone). Alternatively or additionally, the pH value of the aqueous fluid mixture can be at least 0.2, 0.4, 0.6, or 0.8 pH units less than the isoelectric point of the polyacid polymer. The free acid groups generally are not paired to another group (e.g., such as when a carboxylic acid group is covalently bound to another functional group via a reaction product such as amide or ester, or such as when a carboxylate group is ionically paired to a cation such as in an adjacent polycation layer). As described below, the metal-binding ligand suitably additionally includes one or more nitrogen atoms.

In another aspect, the disclosure relates to a method for functionalizing a porous membrane, the method comprising: (a) providing a porous membrane substrate comprising a plurality of membrane pores; and (b) contacting the membrane pores with an aqueous fluid mixture (i) having a pH value less than 3.8 and (ii) comprising a star polyacid polymer comprising three or more polymeric arms, each arm comprising repeating units comprising a free acid group selected from the group consisting of carboxylic acid groups, carboxylate groups, and combinations thereof for a time sufficient to adsorb a polyacid layer on surfaces of the membrane pores, thereby forming a polyacid-coated porous membrane comprising the free acid group. Alternatively or additionally, the pH value of the aqueous fluid mixture can be at least 0.2, 0.4, 0.6, or 0.8 pH units less than the isoelectric point of the polyacid polymer. The free acid groups generally are not paired to another group (e.g., such as when a carboxylic acid group is covalently bound to another functional group via a reaction product such as amide or ester, or such as when a carboxylate group is ionically paired to a cation such as in an adjacent polycation layer). In an embodiment, the star polyacid polymer includes at least 3, 4, or 6 polymeric arms and/or up to 6, 8, 12, or 20 polymeric arms, for example polymeric arms including (meth)acrylic acid monomer repeating units, which can be further derivatized to include a metal-binding ligand, a protein affinity tag, etc. A star polycation analog of the star polyacid polymer suitably is co-deposited with the star polyacid polymer, for example being deposited separately from different solutions in a layer-by-layer method.

Various refinements and extensions of the functionalization methods and resulting functionalized membranes are possible.

For example, the plurality of membrane pores can have an average pore size of at least 0.02 µm, 0.1 µm, 0.2 µm, 0.5 µm, 1 µm, or 2 µm and/or up to 3 µm, 4 µm, 5 µm, 6 µm, 8 µm, 10 µm, 20 µm, or 50 µm. The foregoing sizes/ranges can additionally or alternatively represent bounds of a pore size distribution in the membrane. A size range of about 0.5 µm to about 10 µm is suitable, for example, for protein isolation applications, in particular when the sample containing the protein to be isolated/purified is admixed with other larger, non-target interfering components such as cell lysate products. Lower pore sizes down to about 0.1 µm can be used for samples without larger interfering matter such as for isolation of (small) proteins without cell lysate products and/or isolation of metal ions (e.g., generally with the free acid group or with some metal-specific ligand based on further derivation, such as to capture a $Cu^{2+}$ byproduct of a click chemistry reaction system). Other pore sizes (e.g., up to about 50 µm) can be used to target other analytes, for example including oligonucleotides/DNA and/or microorganisms such as bacteria, viruses, and/or characteristic oligonucleotides/DNA thereof (e.g., using an analyte-complementary antibody or probe oligonucleotide/DNA immobilized via derivatization of the polyacid free acid groups to provide a membrane functionalized with a capture probe/analyte binding pair member).

In various embodiments, the porous membrane substrate can comprise a synthetic polymeric membrane material selected from the group consisting of cellulose acetates, nitrocelluloses, cellulose esters, polysulfones, polyether sulfones, polyacrylonitriles, polyamides (nylons), polyimides, polyethylenes, polypropylenes, polytetrafluoroethylenes, polyvinylidene fluorides, polyvinylchlorides, hydroxylated derivatives of the foregoing, and combinations thereof. Hydroxyl group-containing materials (e.g., which can be present in the native form of the polymeric membrane material or as a hydroxylated derivative of the polymeric membrane material) can be useful to promote hydrogen bonding interactions with the polyacid. Such hydroxyl functionality is not required however, since hydrophobic interactions (among others) between the membrane material and the polyacid backbone can provide substantial adhesion forces as well.

In an embodiment, at least 50%, 60%, 70%, 80%, 90%, or 95% of the polyacid free acid groups in the aqueous fluid mixture are in the form of carboxylic acid groups (—COOH). Alternatively or additionally, at least some of the free acid groups can be in carboxylate form (—COO$^-$), such as at least 5%, 10%, or 20% and/or up to 10%, 20%, 30%, 40%, or 50%. At least some carboxylate groups can be desirable in multi-layer films so that the polyacid layer has some ionic groups to promote interlayer adhesion with neighboring polycation layers. Conversely, in membranes functionalized with only a monolayer of polyacid, the polyacid can have any desired level of carboxylic groups and exhibit good adhesion properties, for example where all or substantially all free acid groups are in the form of carboxylic acid groups. The foregoing values for carboxylic acid and carboxylate content apply to the free acid groups of the polyacid layer as deposited on the membrane as well, although they need not be identical to those of the original polyacid polymer in the aqueous fluid mixture prior to deposition.

As noted above, the polyacid-coated porous membrane deposited according to the disclosed methods has a substantially higher free acid group content relative to equivalent polyacid layers deposited at higher pH values. For example, the polyacid-coated porous membrane can have a free acid group content of at least 1.25, 1.5, 1.75, 2, 2.5, 3, or 4 and/or up 3, 4, 5, 6, 8, or 10 times that of an analogous polyacid-coated porous membrane in which the aqueous fluid mixture containing the polyacid to be deposited had a higher reference pH value such as 4 or 5. This relative free acid group content can be determined/approximated, for example, by measuring a chemical moiety such as a ligand-bound metal (e.g., NTA-complexed $Cu^{2+}$ or $Ni^{2+}$) that corresponds to the free acid group content of the as-deposited polyacid. In this example, the metal-binding ligand selectively binds to the free acid groups during derivatization/attachment to provide a measurable correlation to the free acid group content of the polyacid layer as initially deposited (e.g., by measuring the metal-binding capacity of the derivatized coated membrane). The metal ion may also bind to the free carboxylic acid groups (e.g., underivatized groups) in the film.

In the functionalized membrane, the polyacid layer can be stably adsorbed on the surfaces of the membrane pores due to various interactions, such as one or more of hydrophobic interactions, hydrogen bonding interactions, and coordination interactions. In an embodiment, the polyacid-membrane adhesion forces are free or substantially free of covalent substrate attachments (e.g., such as when the polyacid is adsorbed directly on the substrate). In another embodiment, the polyacid-membrane adhesion forces are free or substantially free of ionic attachment forces to the substrate. In other instances, however, ionic forces may be present, such as when the polyacid is adsorbed on an intervening polycation layer or when the membrane material has ionic functional groups. In an alternative embodiment, the polyacid layer can include covalent attachments to the membrane surface (e.g., instead of or in addition to other, non-covalent attachments). The adsorbed polyacid layer is resistant to high-pH treatment such as a rinse with sodium hydroxide or other strong base for membrane decontamination and re-use (e.g., allowing the membrane to be treated/decontaminated without removing or otherwise substantially degrading the adsorbed (functionalized) polyacid layer). After the basic rinse, the membrane can be rinsed/reconditioned with DI water and/or a suitable sample buffer (e.g., such as a buffer for sample delivery or target analyte elution).

The specific polyacid polymer used is not particularly limited, but it suitably comprises repeating units having one or more pendent free acid groups. In many embodiments, the polyacid polymer has an ethylenic backbone. For example, the polyacid polymer can include mono-acid repeating units (e.g., acrylic acid and methacrylic acid repeating units) and/or poly-acid repeating units (e.g., itaconic acid and maleic acid as examples of di-acids) either in a homopolymer or copolymer. Suitable homopolymers can include poly(acrylic acid) (PAA) and poly(methacrylic acid). Suitable copolymers can include other acid-containing repeating units (e.g., which can include pendent metal-binding ligands as described below), other non-acid-containing units (e.g., alkylene-derived repeating units such as ethylene, propylene, etc.), and other non-acid-containing units which can be cationic units under proper conditions (e.g., repeating units with amide- or amine-containing pendent functional groups such as derived from acrylamide and methacrylamide). In different embodiments, the polyacid polymer can be a linear polymer (or copolymer) or a star polymer (or copolymer). The star polyacid polymer includes at least 3, 4, or 6 polymeric arms and/or up to 6, 8, 12, or 20 polymeric arms, for example polymeric arms including acid repeating units above such as (meth)acrylic acid monomer repeating units (e.g., which can be further derivatized to include a metal-binding ligand, a protein affinity tag, etc.) and optionally non-acid comonomer repeating units. The star polyacid polymer generally includes an aromatic or (branched) alkyl core with suitable linking groups for the polymeric arms (e.g., a poly ether-functional core linking polyacid polymeric arms to the core as illustrated in the examples). In an embodiment, a monomer of the polyacid repeating unit can be represented by $R_1R_2C=CR_3R_4$, where $R_1$-$R_4$ are independently selected from H and carbon-containing groups having from 1 or 2 to 4, 6, or 8 carbons (e.g., a hydrocarbon group such as an alkyl group), potentially in addition to one or more N, O, S heteroatoms. At least one of $R_1$-$R_4$ is a carbon-containing group having one or more free acid groups (e.g., $R_1$-$R_3$ are H and $R_4$ is —COOH or —COO⁻ for acrylic acid/acrylate; $R_1$-$R_2$ are H, $R_3$ is $CH_3$, and $R_4$ is —COOH or —COO⁻ for methacrylic acid/methacrylate). In other embodiments (described below), the polyacid polymer can have a polymer backbone including repeating units with both carbon atoms and one or more other heteroatoms such as nitrogen or oxygen (e.g., ethylenic —C—C— segments linked via N or O heteroatoms such as in poly(ethyleneimine)-based polyacid polymers or poly(ethylene oxide)-based polyacid polymers).

In a refinement, the polyacid polymer can comprise repeating units that comprise a metal-binding ligand group (e.g., a pendent metal-binding ligand group including one or more free acid groups). In various embodiments, the metal-binding ligand group can itself include the free acid group(s) of the polyacid, or the free acid groups can be separate from the metal-binding portion of the polyacid polymer. Suitably, the metal-binding ligand group contains at least one (e.g., 1, 2, 3, 4, or more than 4) nitrogen atom and/or at least one (e.g., 1, 2, 3, 4, or more than 4) free acid group such as an acetic acid group to provide a polydentate metal-binding group. In an embodiment, a monomer of the polyacid repeating unit can be represented by $R_1NR_2R_3$. $R_1$ is a carbon-containing group having from 2 or 4 to 4, 6, 8, 10, or 12 carbons (e.g., a hydrocarbon group such as an alkylene or aromatic group), potentially in addition to one or more N, O, S heteroatoms that contains at least one ethylenic unsaturation for polymerization. $R_2$ and $R_3$ are independently selected from H or carbon-containing groups having from 1 or 2 to 4, 6, or 8 carbons (e.g., a hydrocarbon group such as an alkyl group), potentially in addition to one or more N, O, S heteroatoms, where at least one of $R_2$ and $R_3$ is a carbon-containing group having one or more free acid groups (e.g., at least one of $R_2$ and $R_3$ is or contains a —COOH or —COO⁻ group). In one refinement of this embodiment, $R_1$ is $H_2C=CH—CH_2$—, and $R_2$ and $R_3$ are —$CH_2COOH$ to provide a polymerizable tridentate metal-binding iminodiacetic group (e.g., a polyacid polymer including a N-(2-propenyl) iminodiacetic acid monomer unit). In another refinement of this embodiment, $R_1$ is $H_2C=CH—C(COOH)H$—, and $R_2$ and $R_3$ are —$CH_2COOH$ to provide a polymerizable tetradentate metal-binding nitrilotriacetic group analogous to that of aminobutyl NTA (e.g., a polyacid polymer including a N-(1-carboxy-2-propenyl) iminodiacetic acid monomer unit). The polyacid polymers which themselves include the metal-binding ligand group can be homopolymers of the given repeating unit or they can be copolymers with other repeating units (e.g., acrylic acid or otherwise).

In an embodiment, the polyacid polymer can include repeating units which include (i) a nitrogen atom (N) (e.g., along the polymer backbone; generally linking carbon-based repeating unit backbone segments, such as various ethylenic or other alkylenic segments), and (ii) a pendent metal-binding ligand with one or more free acid groups (e.g., 2 or 3 free acid groups in addition to a nitrogen atom joining the same, such as in a tridentate metal-binding iminodiacetic group or a tetradentate metal-binding nitrilotriacetic group, respectively). In a refinement, the repeating units including the nitrogen atom have the general formula —[—$CH_2$—$CH_2$—NR—]—, where R includes the pendent metal-binding ligand (e.g., in addition to any linking carbons or other heteroatoms to the backbone nitrogen in the repeating unit). More generally, the repeating units including nitrogen atom can have the general formula —[—$(CR_aR_b)_n$—NR—]—, where n is 2, 3, 4, or more, $R_a$ is H or a $C_1$-$C_4$ alkyl or heteroalkyl group, $R_b$ is H or a $C_1$-$C_4$ alkyl or heteroalkyl group, $R_a$ and $R_b$ can be the same or different on n different backbone carbon atoms, and R includes the pendent metal-binding ligand as above. The R group can include a linear or branched $C_2$, $C_4$, or $C_6$ to $C_8$, $C_{12}$, or $C_{16}$ alkyl chain, a linear or branched $C_2$, $C_4$, or $C_6$ to $C_8$, $C_{12}$, or $C_{16}$ heteroalkyl chain. In a particular refinement, R includes N heteroatoms as branch points for the branched heteroalkyl chains, such as in a branched PEI-based structure. R can include 1, 2, 3, 4, or more (such as up to 6, 12, or 20) free acid groups, depending on the degree of branching, for example free acid groups in the form of acetic acid groups (—$CH_2COOH$, —$CH_2COO^-$) linked to nitrogen heteroatoms in the repeating unit itself or in the pendent heteroalkyl chains off of the repeating unit backbone Examples of suitable polymers include PEI-based polymers (e.g., linear or (preferably) branched) further functionalized at the primary and secondary amine sites to include metal-binding ligand free acid groups, such as monoacetic groups (e.g., at secondary amine sites in the original PEI polymer)m diacetic groups (e.g., at the primary amine sites in the original PEI polymer), triacetic groups (e.g., ethylenediaminetetraacetic acid (ETDA) amide-linked to a PEI amino group, leaving three acetic acid groups and two nitrogen atoms as metal binding sites from EDTA), tetraacetic groups (e.g., diethylenetriaminepentaacetic acid (DETAPAC) amide-linked to a PEI amino group, leaving four acetic acid groups and three nitrogen atoms as metal binding sites from DETAPAC). Examples 1 and 3 illustrate the synthesis and use of CMPEI to functionalize a membrane according to the disclosure.

In an embodiment, the polyacid polymer can include repeating units which include (i) a carbon-based backbone segment (e.g., ethylenic or other alkylenic segment), (ii) a pendent metal-binding ligand with one or more free acid groups (e.g., 2 or 3 free acid groups in addition to a nitrogen atom joining the same, such as in a tridentate metal-binding iminodiacetic group or a tetradentate metal-binding nitrilotriacetic group, respectively), (iii) an amide group (e.g., —C(=O)$NR_2$—, where $R_2$ is H or a $C_1$-$C_4$ alkyl or heteroalkyl group) linking the pendent metal binding ligand and the polyacid polymer backbone. In a refinement, the repeating units including the amide linking group and have the general formula —[—$CH_2$—$CR_1(C(=O)NR_2R)$—]—, where (i) $R_1$ is H or a $C_1$-$C_4$ alkyl or heteroalkyl group, (ii) $R_2$ is H or a $C_1$-$C_4$ alkyl or heteroalkyl group, and (iii) R includes the pendent metal-binding ligand (e.g., in addition to any linking carbons or other heteroatoms to the backbone carbon in the repeating unit, such as the pendent —C(=O)NR$_2$— amide linking group joining R to the backbone in the illustrated structure). More generally, the repeating units including nitrogen atom can have the general formula —[—(CR$_a$R$_b$)$_n$—CR$_1$(R$_c$C(=O)NR$_2$R)—]—, where n is 1, 2, 3, or more, R$_a$ is H or a C$_1$-C$_4$ alkyl or heteroalkyl group, R$_b$ is H or a C$_1$-C$_4$ alkyl or heteroalkyl group, R$_a$ and R$_b$ can be the same or different on n different backbone carbon atoms, R$_c$ is not present (e.g., as in the foregoing structure) or a C$_1$-C$_4$ alkyl or heteroalkyl group linking group, and R, R$_1$, and R$_2$ are as above. The R group can include a linear or branched C$_2$, C$_4$, or C$_6$ to C$_8$, C$_{12}$, or C$_{16}$ alkyl chain, a linear or branched C$_2$, C$_4$, or C$_6$ to C$_8$, C$_{12}$, or C$_{16}$ heteroalkyl chain. In a particular refinement, R includes N heteroatoms as branch points for the branched heteroalkyl chains, such as in an iminodiacetic acid group or nitrilotriacetic acid group linked via a linear alkyl group to the pendent N atom of the amide linking group to the backbone in the repeating unit. R can include 1, 2, 3, 4, or more (such as up to 6, 12, or 20) free acid groups, depending on the degree of branching, for example free acid groups in the form of acetic acid groups (—CH$_2$COOH, —CH$_2$COO$^-$) linked to nitrogen heteroatoms in the repeating unit itself or in the pendent heteroalkyl chains off of the repeating unit backbone. In a refinement, the polyacid polymer is a copolymer further including one or more repeating units such as vinyl acid repeating units, vinyl amide repeating units, and alkylene repeating units (e.g., acrylic acid, methacrylic acid, acrylamide, methacrylamide, ethylene, propylene, butylene). Examples 4 and 5 illustrate the synthesis of polyacid polymers and copolymers with the amide linking groups according to the disclosure, for example poly(NTA), poly(NTA-co-AA), and poly(NTA-co-AA-ACM).

In an embodiment, the polyacid polymer can include repeating units which include (i) an oxygen atom (O) (e.g., along the polymer backbone; generally linking carbon-based repeating unit backbone segments, such as various ethylenic or other alkylenic segments), and (ii) a pendent metal-binding ligand with one or more free acid groups (e.g., 2 or 3 free acid groups in addition to a nitrogen atom joining the same, such as in a tridentate metal-binding iminodiacetic group or a tetradentate metal-binding nitrilotriacetic group, respectively). In a refinement, the repeating units including the oxygen atom have the general formula —[—O—CH$_2$—CH(CH$_2$NR)—]—, where R includes the pendent metal-binding ligand (e.g., in addition to any linking carbons or other heteroatoms to the backbone carbon in the repeating unit, such as the pendent —CH$_2$N— linking group joining R to the backbone in the illustrated structure). More generally, the repeating units including oxygen atom can have the general formula —[—O—(CR$_a$R$_b$)$_n$—CH(R$_C$NR)—]—, where n is 1, 2, 3, or more, R$_a$ is H or a C$_1$-C$_4$ alkyl or heteroalkyl group, R$_b$ is H or a C$_1$-C$_4$ alkyl or heteroalkyl group, R$_a$ and R$_b$ can be the same or different on n different backbone carbon atoms, R$_C$ is a C$_1$-C$_4$ alkyl or heteroalkyl group linking group, and R includes the pendent metal-binding ligand as above. The R group can include a linear or branched C$_2$, C$_4$, or C$_6$ to C$_8$, C$_{12}$, or C$_{16}$ alkyl chain, a linear or branched C$_2$, C$_4$, or C$_6$ to C$_8$, C$_{12}$, or C$_{16}$ heteroalkyl chain. In a particular refinement, R includes N heteroatoms as branch points for the branched heteroalkyl chains, such as in an iminodiacetic acid group or nitrilotriacetic acid group linked via a linear alkyl group to the pendent N atom in the repeating unit. R can include 1, 2, 3, 4, or more (such as up to 6, 12, or 20) free acid groups, depending on the degree of branching, for example free acid groups in the form of acetic acid groups (—CH$_2$COOH, —CH$_2$COO$^-$) linked to nitrogen heteroatoms in the repeating unit itself or in the pendent heteroalkyl chains off of the repeating unit backbone. Examples of suitable polymers include poly(ethylene oxide)-based polymers further functionalized at a pendent carbon atom to include metal-binding ligand free acid groups, such as an iminodiacetic group or nitrilotriacetic group (e.g., at a reactive pendent halogen site in an original poly(epihalohydrin) polymer). In a refinement, the polyacid polymer is a copolymer further including one or more alkylene oxide repeating units including a polyalkylene oxide pendent group (e.g., C$_2$-C$_4$ alkylene oxides in repeating unit and in pendent group sidechain, for example ethylene oxide; polyalkylene oxide pendent group can have 2, 3, or 4 to 6, 8, or 12 alkylene oxide units, for example terminated with a C$_1$-C$_4$ alkyl group). In another refinement, a polycation which is an analog to the polyacid polymer (e.g., including a pendent amino or ammonium group in place of the pendent metal binding ligand) can be used in a layer-by-layer membrane functionalization method as a layer deposited adjacent a polyacid layer. Example 7 illustrates the synthesis of poly(ethylene oxide)-based polyacid polymers and copolymers according to the disclosure.

A variety of conditions may be used to deposit/adsorb the polyacid from the aqueous fluid medium onto the porous membrane. For example, the pH value of the aqueous fluid mixture can be at least 1, 1.5, or 2 and/or up to 2, 2.5, 3, 3.2, or 3.5 (e.g., depending on the particular polyacid and/or to control the relative distribution of free acid groups between the carboxylic acid form and the carboxylate form). Alternatively or additionally, the deposition pH can be specified relative to the isoelectric point of the polyacid such that the pH of the aqueous fluid mixture is at least 0.2, 0.5, 0.8, 1, 1.5, 2, or 2.5 and/or up to 2, 2.5, 3, or 3.5 units less than the isoelectric point of the polyacid polymer. Suitably, the aqueous fluid mixture is in the form of an aqueous solution comprising the polyacid polymer and further comprising an electrolyte (e.g., an inorganic salt) in solution.

The polyacid layer can be adsorbed onto the porous membrane surfaces in various structural embodiments. For example, the polyacid layer can be adsorbed directly on the porous membrane substrate (e.g., no adhesion layer such as poly(styrene sulfonate) (PSS) or other polyelectrolyte is required as an intermediate between the membrane substrate and the polyacid). In an alternative embodiment, the polyacid layer is immobilized on the porous membrane substrate via one or more adhesion layers, wherein at least one of the adhesion layers is adsorbed directly on the porous membrane substrate (e.g., an adhesion layer such as poly(styrene sulfonate) or other polyelectrolyte such as poly(allyl amine) (PAH) in the PAH/CMPEI embodiment illustrated in the examples). In another embodiment, the polyacid-coated porous membrane has a monolayer of the polyacid polymer adsorbed directly on the porous membrane substrate and comprising the free acid groups (e.g., the single-CMPEI embodiment adsorbed directly on the polymeric membrane surface). In another embodiment, the polyacid-coated porous membrane substrate comprises a plurality of polyacid layers, wherein (i) a first polyacid layer is adsorbed directly on the porous membrane substrate and (ii) one or more further polyacid layers are adhered to adjacent polyacid layers via one or more intervening polycation layers (e.g., polyethyleneimine (PEI) or poly(allyl amine) (PAH) such as in the (PAH/CMPEI)$_2$ and (PAH/CMPEI)$_5$ embodiments illustrated in the examples). Such multilayer structures can be formed by performing a layer-by-layer polyelectrolyte adsorption process to deposit alternate layers of (i) the polyacid at a pH value less than 3.8 and (ii) the polycation. The polycation layers are suitably deposited at the same or similar pH value as that of the polyacid layers, but higher pH values above 3.8 or 4 can be used). While a higher pH deposition of the polycation could decrease the amount of free acid groups in the bulk/interior of the film, the outermost polyacid layer will exhibit the desired high free acid group level as a result of having been deposited under the low-pH conditions in the final layer-by-layer deposition step. In any of the foregoing embodiments, the low-pH adsorption of the polyacid still results in a high density of free acid groups in the membrane.

In an extension, for example when the polyacid polymer as deposited already includes the metal-binding ligand, the method for functionalizing a porous membrane can further comprise: (c) contacting the metal-binding ligands with metallic ions to form metal-ligand complexes at the surfaces exposed to membrane pore void volumes. In various embodiments, the metallic ions can comprise one or more of $Ni^{2+}$, $Cu^{2+}$, $Co^{2+}$, $Fe^{3+}$, and $Ga^{3+}$, for example polyhistidine tag-binding ligands (e.g., metallic ions such as $Ni^{2+}$ or $Co^{2+}$ which are in turn immobilized in and complexed with the pendent metal binding-ligand). In various embodiments, the metal-binding ligands comprise one or more of nitrilotriacetic acid groups (e.g., aminobutyl NTA that has been amide-linked to free acid groups of the polyacid), iminodiacetic acid groups, and salts thereof (e.g., including carboxylate forms thereof).

In an extension, for example when the polyacid polymer as deposited does not include the metal-binding ligand, the method for functionalizing a porous membrane can further comprise: (c) derivatizing the free acid groups of the polyacid-coated porous membrane to (covalently) attach other functional groups such as protein affinity tag-binding ligands thereto at surfaces exposed to membrane pore void volumes. In various embodiments, the protein affinity tag-binding ligands are selected from the group consisting of polyhistidine tag-binding ligands (e.g., metallic ions such as $Ni^{2+}$ or $Co^{2+}$ which are in turn immobilized in a suitable metal-ligand complex), glutathione, glutathione-S-transferase (GST) tag-binding derivatives thereof, amylose, maltose binding protein (MBP) tag-binding derivatives thereof, chitin, and chitin binding protein (CBP) tag-binding derivatives thereof. Suitable derivatives of the MBP and CBP tag-binding ligands can represent the inclusion of a linking group for covalent attachment of the affinity tag-binding ligand to the free acid groups as well as a potential non-polymeric form of amylose/chitin with sufficient α (1-4) bound glucose or N-acetylglucosamine residues for specific binding to an MBP tag or CBP tag, respectively.

In a refinement, derivatization of the free acid groups can comprise: (c-1) derivatizing the free acid groups of the polyacid-coated porous membrane to (covalently) attach metal-binding ligands thereto at surfaces exposed to membrane pore void volumes; and (c-2) contacting the metal-binding ligands with metallic ions to form (stable) metal-ligand complexes at the surfaces exposed to membrane pore void volumes (e.g., where the bound metals in turn serve as binding ligands for a protein affinity tag such as a polyhistidine tag). In various embodiments, the metallic ions comprise one or more of $Ni^{2+}$, $Cu^{2+}$, $Co^{2+}$, $Fe^{3+}$, and $Ga^{3+}$. In another embodiment, the metal-binding ligands can comprise one or more of nitrilotriacetic acid groups (e.g., aminobutyl NTA that has been amide-linked to free acid groups of the polyacid), iminodiacetic acid groups, and salts thereof (e.g., including carboxylate forms thereof).

In another aspect, the disclosure relates to a (star) polyacid-coated porous membrane as generally formed according to the disclosed method in any of its various embodiments (e.g., including the polyacid as deposited already including the pendent metal binding ligand or after further derivatization to include binding ligands such as protein affinity tag-binding ligands, either with or without a bound affinity tagged-protein).

In an embodiment, the disclosure relates to a polyacid-coated porous membrane comprising: (a) a porous membrane substrate comprising a plurality of membrane pores; and (b) a polyacid layer adsorbed on surfaces of the membrane pores, the polyacid layer comprising a polyacid polymer comprising repeating units comprising a pendent metal-binding ligand comprising one or more free acid groups selected from the group consisting of carboxylic acid groups, carboxylate groups, and combinations thereof; wherein: the polyacid layer is stably adsorbed on the surfaces of the membrane pores and is substantially free of covalent attachments to the surfaces of the membrane pores; and the repeating units are selected from the group consisting of: (i) repeating units comprising a nitrogen atom (N); (ii) repeating units comprising (A) an amide group (—C(=O)NH— or —C(=O)NR—) linking the pendent metal binding ligand and the polyacid polymer backbone, and (B) a pendent alkyl or heteroalkyl group on the polyacid polymer backbone at the same location as the amide group; and (iii) repeating units comprising an oxygen atom (O). The polyacid-functionalized porous membrane is suitably free or substantially free of covalent bonds formed between the polyacid and the polymeric material of the porous membrane substrate (e.g., having been formed in the absence of conditions intended to create covalent attachments to the substrate although some incidental linking reactions could occur in principle). In a refinement, the polyacid layer is stably adsorbed on the surfaces of the membrane pores due to one or more of hydrophobic interactions, hydrogen bonding interactions, and coordination interactions. In an alternative embodiment, the polyacid layer can include covalent attachments to the membrane surface (e.g., instead of or in addition to other, non-covalent attachments). In a refinement, the membrane further comprises (c) metallic ions complexed with the metal-binding ligands (e.g., the metallic ions comprising) one or more of $Ni^{2+}$, $Cu^{2+}$, $Co^{2+}$, $Fe^{3+}$, and $Ga^{3+}$). In a refinement, (i) the repeating units comprise the nitrogen atom and have the general formula —[—$CH_2$—$CH_2$—NR—]—; and (ii) R comprises the pendent metal-binding ligand (e.g., as described above, such as including CPMEI). In a refinement, (i) the repeating units comprise the amide linking group and have the general formula —[—$CH_2$—$CR_1$(C(=O)$NR_2$R)—]—; (ii) R comprises the metal-binding ligand; (iii) $R_1$ is a $C_1$-$C_4$ alkyl or heteroalkyl group; and (iv) $R_2$ is H or a $C_1$-$C_4$ alkyl or heteroalkyl group (e.g., as described above, such as including poly(NTA), poly(NTA-co-AA), poly(NTA-co-AA-ACM)). In a refinement, (i) the repeating units comprise the oxygen atom and have the general formula —[—O—$CH_2$—CH($CH_2$NR)—]—; and (ii) R comprises the metal-binding ligand (e.g., as described above, such as including polyethylene oxide-based polymers).

In an embodiment, the disclosure relates to a polyacid-coated porous membrane comprising: (a) a porous membrane substrate comprising a plurality of membrane pores; and (b) a polyacid layer adsorbed on surfaces of the membrane pores, the polyacid layer comprising a star polyacid polymer comprising three or more polymeric arms, each arm comprising repeating units comprising a free acid group selected from the group consisting of carboxylic acid groups, carboxylate groups, and combinations thereof;

wherein the polyacid layer is stably adsorbed on the surfaces of the membrane pores and is substantially free of covalent attachments to the surfaces of the membrane pores. The polyacid-functionalized porous membrane is suitably free or substantially free of covalent bonds formed between the polyacid and the polymeric material of the porous membrane substrate (e.g., having been formed in the absence of conditions intended to create covalent attachments to the substrate although some incidental linking reactions could occur in principle). In a refinement, the polyacid layer is stably adsorbed on the surfaces of the membrane pores due to one or more of hydrophobic interactions, hydrogen bonding interactions, and coordination interactions. In an alternative embodiment, the polyacid layer can include covalent attachments to the membrane surface (e.g., instead of or in addition to other, non-covalent attachments).

In another aspect, the disclosure relates to a method for binding an affinity-tagged target protein, the method comprising: (a) providing the polyacid-coated porous membrane according to any of the various embodiments including a pendent metal binding ligand complexed with a metallic ion; (b) providing a feed fluid sample comprising a target protein comprising an affinity tag; and (c) passing the feed fluid sample through the polyacid-coated porous membrane, thereby (i) binding at least some of the target protein via the affinity tag with the immobilized protein affinity tag-binding ligands and (ii) providing a permeate fluid with at least some of the target protein removed. In a refinement, the affinity tag is a polyhistidine tag, and (ii) the metallic ions comprise one or more of $Ni^{2+}$ and $Co^{2+}$. In a refinement, the method further comprises: (d) eluting the bound target protein from the polyacid-coated porous membrane, thereby forming a purified permeate comprising the target protein, for example where (i) the feed fluid sample further comprises non-target proteins, and (ii) the purified permeate is substantially free from the non-target proteins.

In another aspect, the disclosure relates to a method for binding a positively charged target analyte, the method comprising: (a) providing the polyacid-coated porous membrane formed according to any of the variously disclosed embodiments (e.g., star polyacid polymer or otherwise; including free acid groups but without necessarily having been further derivatized/functionalized with a target-specific capture ligand); (b) providing a feed fluid sample comprising a positively charged target analyte; (c) passing the feed fluid sample through the polyacid-coated porous membrane, thereby (i) binding at least some of the target analyte with the free acid groups and (ii) providing a permeate fluid with at least some of the target analyte removed; and optionally (d) eluting the bound target analyte from the polyacid-coated porous membrane, thereby forming a purified permeate fluid comprising the target analyte. In a refinement, (i) the feed fluid sample further comprises non-positively charged non-target analytes and (ii) the purified permeate fluid is substantially free from the non-target analytes.

In another aspect, the disclosure relates to a method for binding an affinity-tagged target protein, the method comprising: (a) providing the polyacid-coated porous membrane formed according to any of the variously disclosed embodiments and including a protein affinity tag-binding ligand (e.g., a star polyacid functionalized polymer or otherwise); (b) providing a feed fluid sample comprising a target protein comprising an affinity tag; (c) passing the feed fluid sample through the polyacid-coated porous membrane, thereby (i) binding at least some of the target protein via the affinity tag with the immobilized protein affinity tag-binding ligands and (ii) providing a permeate fluid with at least some of the target protein removed; and optionally (d) eluting the bound target protein from the polyacid-coated porous membrane, thereby forming a purified permeate comprising the target protein. In a refinement, (i) the feed fluid sample further comprises non-target proteins and (ii) the purified permeate is substantially free from the non-target proteins (e.g., non-target proteins without an affinity tag in general or without the affinity tag appropriate for the specific membrane).

Various embodiments for the protein affinity tag-binding ligand are possible. In one embodiment, (i) the affinity tag is a polyhistidine tag and (ii) the protein affinity tag-binding ligands comprise one or more of $Ni^{2+}$-ligand complexes and $Co^{2+}$-ligand complexes. In another embodiment, (i) the affinity tag is a glutathione-S-transferase (GST) tag and (ii) the protein affinity tag-binding ligands are selected from the group consisting of glutathione, glutathione-S-transferase (GST) tag-binding derivatives thereof, and combinations thereof. In another embodiment, (i) the affinity tag is a maltose binding protein (MBP) tag and (ii) the protein affinity tag-binding ligands are selected from the group consisting of amylose, maltose binding protein (MBP) tag-binding derivatives thereof, and combinations thereof. In another embodiment, (i) the affinity tag is chitin binding protein (CBP) tag and (ii) the protein affinity tag-binding ligands are selected from the group consisting of chitin, chitin binding protein (CBP) tag-binding derivatives thereof, and combinations thereof.

In another aspect, the disclosure relates to a polyacid polymer comprising: (a) repeating units comprising a pendent metal-binding ligand comprising one or more free acid groups selected from the group consisting of carboxylic acid groups, carboxylate groups, and combinations thereof, wherein: (i) the repeating units comprise an amide linking group and have the general formula —[—$CH_2$—$CR_1$(C(=O)$NR_2$R)—]—; (ii) R comprises the metal-binding ligand; (iii) $R_1$ is a $C_1$-$C_4$ alkyl or heteroalkyl group; and (iv) $R_2$ is H or a $C_1$-$C_4$ alkyl or heteroalkyl group; (b) vinyl acid repeating units; and (c) optionally vinyl amide repeating units (e.g., as described above for the various substituents). In another aspect, the disclosure relates to a method for forming a polyacid polymer, the method comprising: copolymerizing the following monomers to form the foregoing polyacid polymer: (a) a monomer comprising a pendent metal-binding ligand comprising one or more free acid groups selected from the group consisting of carboxylic acid groups, carboxylate groups, and combinations thereof, wherein: (i) the monomer comprises an amide linking group and has the general formula $CH_2$=$CR_1$(C(=O)$NR_2$R); (ii) R comprises the metal-binding ligand; (iii) $R_1$ is a $C_1$-$C_4$ alkyl or heteroalkyl group; and (iv) $R_2$ is H or a $C_1$-$C_4$ alkyl or heteroalkyl group; (b) a vinyl acid monomer, and (c) optionally a vinyl amide monomer. For example, suitable monomers can be reacted in a buffered aqueous solution containing a suitable initiator (e.g., ammonium peroxodisulfate) and/or a suitable catalyst (e.g., TMEDA).

In another aspect, the disclosure relates to a method for forming a polyacid polymer, the method comprising: (a) providing an α-amino acid comprising (i) a carboxylic acid group, (ii) a first amino group in α-position relative to the carboxylic acid group, and (iii) a second amino group (e.g., second amino group positioned further from the carboxylic acid group than the first amino group, for example at a terminal (ω—) end of the α-amino acid opposing the carboxylic acid group such as in lysine; α-amino acid can be provided in form of HCl salt); (b) forming a metal complex between the carboxylic acid group of the α-amino acid, the first amino group of the α-amino acid, and a metallic ion (e.g., $Cu^{2+}$, $Ni^{2+}$, $Co^{2+}$, $Fe^{3+}$, $Ga^{3+}$, or otherwise in an aqueous solution of a corresponding metal salt; metal complex includes 1, 2, or 3 α-amino acids per metallic ion; second amino group remains free/uncomplexed with any metallic ions); (c) reacting the second amino group of the α-amino acid with an acryloyl halide or a methacryloyl halide, thereby forming a metal-complexed α-amino acid derivative comprising an amide-linked vinyl group at the original location of the second amino group (e.g., acryloyl chloride or methacryloyl chloride); (d) decomplexing the α-amino acid derivative from the metallic ions, thereby forming an α-amino acid derivative comprising the amide-linked vinyl group at the original location of the second amino group (e.g., in an aqueous mixture including chloroform or other suitable organic solvent and decomplexing agent such as 8-hydroyquinolinol) (e) polymerizing the α-amino acid derivative, thereby forming a poly(α-amino acid derivative) (e.g., in an aqueous mixture including a suitable initiator such as 4,4-azobis-4-cyano valeric acid; optionally in combination with a vinyl acid monomer and/or vinyl amide monomer to form a corresponding copolymer); and, (f) reacting the poly(α-amino acid derivative) with an ω-halocarboxylic acid, thereby replacing the two hydrogen atoms of the first amino acid groups with two carboxylic acid groups and forming a polyacid polymer comprising repeating units comprising a pendent metal-binding ligand comprising three free acid groups, wherein: (i) the repeating units comprise an amide linking group and have the general formula —[—$CH_2$—$CR_1$(C(=O)$NR_2R$)—]—; (ii) R comprises the metal-binding ligand (e.g., reaction with bromoacetic acid to form a corresponding NTA pendent group as the metal binding ligand); (iii) $R_1$ is H or a $CH_3$ group; and (iv) $R_2$ is H (e.g., as described above for the various substituents).

In another aspect, the disclosure relates to a polyacid polymer comprising: repeating units comprising a pendent metal-binding ligand comprising one or more free acid groups selected from the group consisting of carboxylic acid groups, carboxylate groups, and combinations thereof, wherein: (i) the repeating units comprise an oxygen atom and have the general formula —[—O—$CH_2$—CH($CH_2$NR)—]—; and (ii) R comprises the metal-binding ligand. In a refinement, the polyacid polymer is a copolymer further comprising one or more alkylene oxide repeating units comprising a polyalkylene oxide pendent group. In another aspect, the disclosure relates to a method for forming the foregoing polyacid polymer, the method comprising: reacting a poly(epichlorohydrin) polymer or copolymer with an $NH_2R$ amine, wherein R comprises a metal-binding ligand comprising one or more free acid groups selected from the group consisting of carboxylic acid groups, carboxylate groups, and combinations thereof, thereby forming a the foregoing polyacid polymer. For example, under basic conditions with a suitable solvent such as DMSO, the poly(epichlorohydrin) copolymer with alkylene oxide repeating units comprising a polyalkylene oxide pendent group can be reacted with the $NH_2R$ amine to form the corresponding polyacid copolymer having the alkylene oxide repeating units and alkylene oxide pendent groups.

While the disclosed methods, compositions, articles, and systems are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

Typical membrane modification includes polymerization from the surface. This is a relatively complex process, and often includes initiator attachment to the membrane. The current approach involves adsorption of a polyacid to the membrane. Hydrophobic interactions strongly attach the polymer to the surface. Although others have modified membranes through polymer adsorption, a feature of the disclosed process is adsorption at low pH to maintain a low fraction of ionized groups and promote the formation of highly swollen films after deprotonation of the acid groups. These highly swollen films rapidly bind large amounts of protein and can be further functionalized. The method is much more convenient than previous approaches to membrane modification. Protein binding capacities are higher than for commercial membranes. In some embodiments, the adsorbed polyacid polymers incorporate metal-binding ligands as deposited onto the membrane surface, thus eliminating the need for further post-adsorption functionalization processes. In some embodiments, the adsorbed polyacid polymers incorporate nitrogen and/or oxygen heteroatoms into their otherwise carbon-based polymer backbone, which heteroatoms can improve film swelling and, correspondingly, membrane capture capacity and efficiency for a target analyte.

The process involves simple passage of a polyacid solution through a membrane at low pH. Additional layers may be deposited by sequentially adsorbing polycations along with the polyanion at low pH. Subsequent binding at neutral pH leads to a high density of ion-exchange sites for protein binding. Derivatization of the acid groups with ligands such as $Ni^{2+}$ complexes allows selective binding of tagged proteins such as those containing polyhistidine.

Figure 1A:
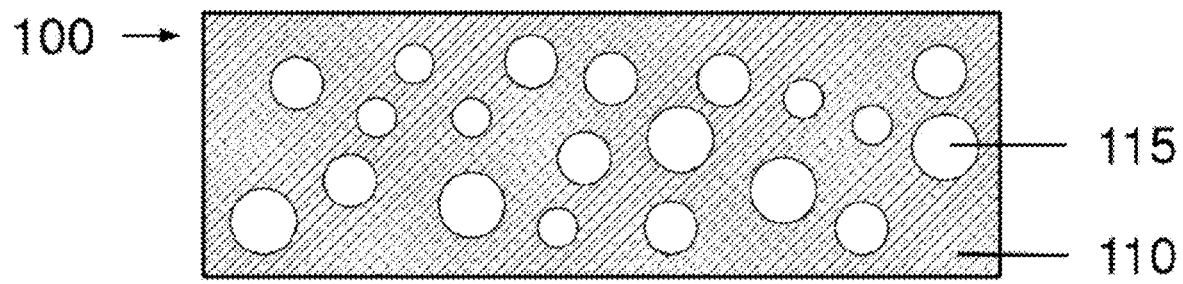
FIG. 1A illustrates a porous membrane substrate for functionalization according to the disclosure.

FIGS. 1A-1E illustrate several membranes and related methods according to the disclosure. FIG. 1A illustrates a generalized porous membrane 100 (e.g., pre-functionalization or post-functionalization as described below, with or without a bound analyte) having a body/substrate 110 defining a plurality of pores 115 through which fluids may pass through the membrane 100. As noted above, suitable materials for the substrate 110 and the sizes for the pores 115 are not particularly limited and can be selected based on an intended use (e.g., chemical compatibility with polymeric layers to be adsorbed thereon, size compatibility with target materials/analytes passing through the membrane).

Figure 1B:
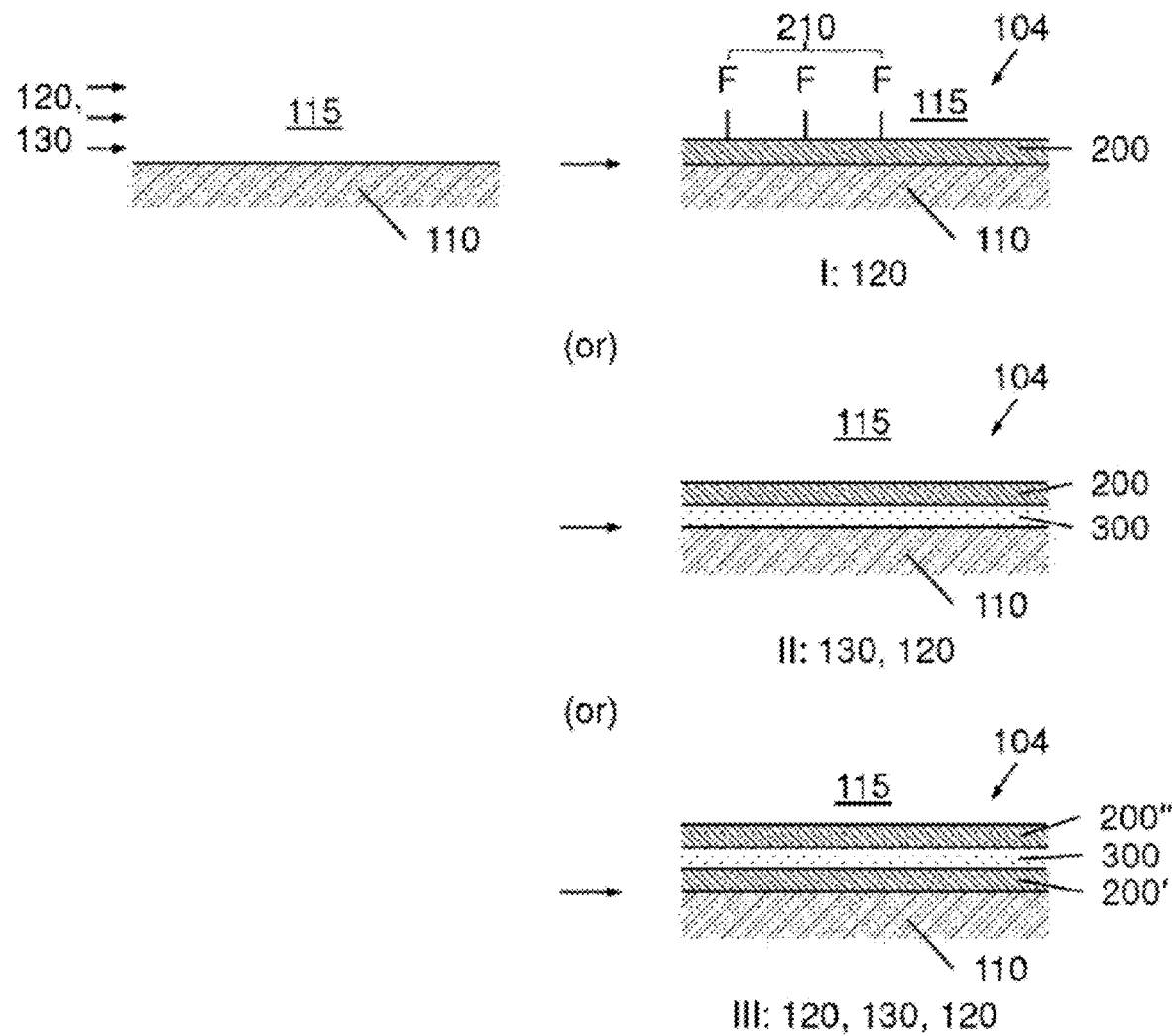
FIGS. 1B-1C illustrate functionalized membranes according to the disclosure, including functionalized membranes with free acid groups (FIG. 1B) and derivatized free acid groups (FIG. 1C).

FIG. 1B illustrates several methods for functionalizing a porous membrane 100. In general, the substrate 110 is contacted by passing fluid mixtures 120 and/or 130 through the pores 115. The mixture 120 can represent an aqueous fluid mixture including a polyacid polymer (e.g., already including a pendent metal-binding ligand) and having a low pH value suitable for forming a high-capacity adsorbed polyacid layer 200 with pendent free acid groups (F) 210 (e.g., as part of the metal-binding ligand). The mixture 130 can represent an aqueous fluid mixture including a polyelectrolyte (e.g., an adhesion promoter such as a polycation; generally other than a polyacid or polyanion) for forming an intermediate polyelectrolyte (or adhesion) layer 300 between neighboring substrate 110/polyacid 200 layers and/or neighboring polyacid 200'/polyacid 200" layers. The left side of FIG. 1B represents an unmodified membrane 100 prior to being treated/functionalized with one or more of the fluid mixtures 120, 130. The right side of FIG. 1B represents various functionalized porous membranes 104 including free acid groups 210 resulting from different functionalization methods. Embodiment 1 of FIG. 1B illustrates a single-step modification in which the membrane 100 is contacted with the low-pH polyacid mixture 120 to form a functionalized membrane 104 with a single polyacid layer 200 adsorbed directly on the substrate 110 surface. Embodiment II illustrates a two-step (e.g., sequential, layer-by-layer process) modification in which the membrane 100 is contacted with the polyelectrolyte mixture 130 followed by the polyacid mixture 120 to form a functionalized membrane 104 with a single polyacid layer 200 adsorbed/immobilized on the substrate 110 via an intermediate adhesion layer 300 surface adsorbed directly on the substrate 110 surface. Embodiment III illustrates a three-step (e.g., sequential, layer-by-layer process) process in which the membrane 100 is contacted with the polyacid/polycation mixtures 120/130/ 120 to form a functionalized membrane 104 with two polyacid layers 200'/200" adsorbed/immobilized on the substrate 110 with an intermediate polycation layer 300 therebetween. Although only specifically illustrated in Embodiment 1, each of the illustrated polyacid layers 200/200'/200" include a high density of free acid groups 210 suitable for use as-is (e.g., to capture a positively charged analyte) or for further modification (e.g., derivatization to contain some other chemical functional group, such as a protein affinity tag-binding ligand).

Figure 1C:
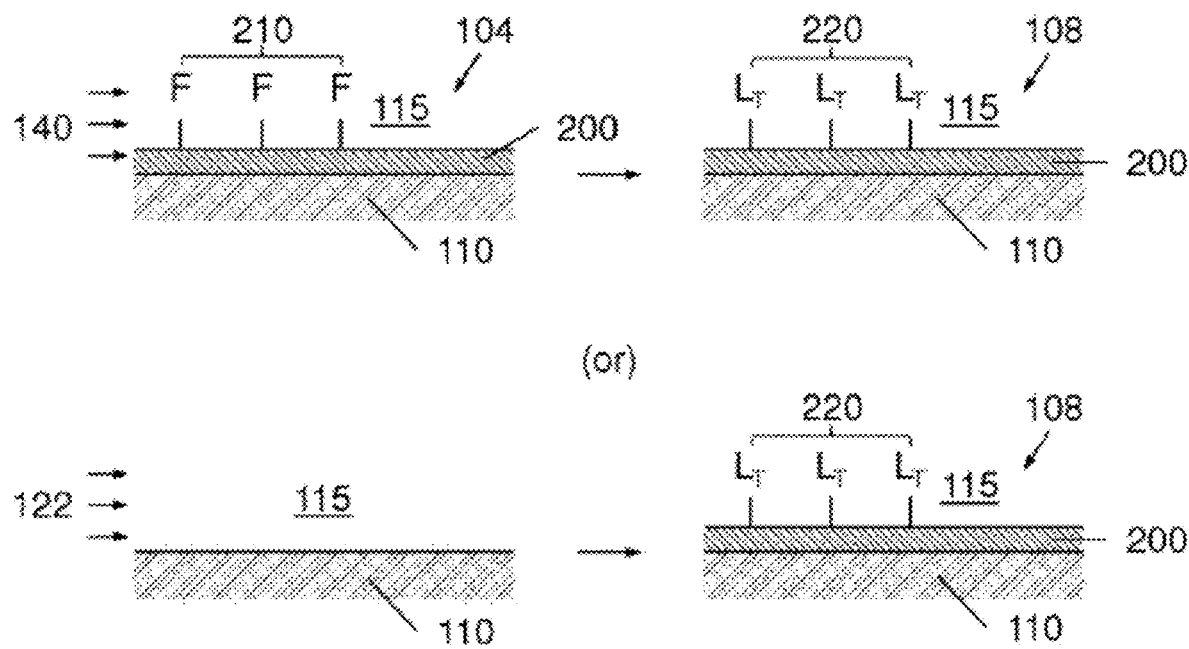

FIG. 1C illustrates additional methods for functionalizing a porous membrane 100, for example to form a functionalized membrane 108 including protein affinity tag-binding ligands ($L_T$) 220 (e.g., instead of or in addition to the free acid groups 210 as in the functionalized membrane 104). In the top embodiment of FIG. 1C, a previously functionalized membrane 104 can be further functionalized by contacting the membrane 104 with one or more derivatization components 140 (e.g., as mixtures in aqueous or non-aqueous (such as organic solvent-based) media). In addition to the chemical moiety/moieties forming the ligands 220, the components can further include one or more constituents as generally known in the art to mediate the derivatization/covalent attachment of the ligands 220 to the free acid groups 210 (e.g., converting some or all of the free acid groups 210 to the ligands 220, where some free acid groups 210 may remain in the functionalized membrane 108). In some embodiments, the free acid groups 210 already include the metal-binding ligand. In other embodiments, a metal-binding ligand (not separately shown) with amino functionality (e.g., co-aminoalkyl nitrilotriacetic acid or iminodiacetic acid) can be covalently attached via amide linkages to the (former) free acid groups using N-(3-dimethylaminopropyl)-N'-ethylcarbodiimide hydrochloride (EDC), and N-hydroxysuccinimide (NHS). The metal-binding ligand, whether originally present in the polyacid polymer as adsorbed or subsequently added to an adsorbed polyacid layer, can then be contacted with metallic ions (e.g., $Ni^{2+}$) to form a stable metal-ligand complex exposed to the membrane pore 115 volume and capable of serving as the protein affinity tag-binding ligands 220. In the bottom embodiment of FIG. 1C, a membrane 100 (e.g., which need not be previously functionalized) can be functionalized in a single step by contacting the substrate 110 with an aqueous fluid mixture 122 including a polyacid polymer itself containing metal-binding ligand groups and having a low pH value suitable for forming a high-capacity adsorbed polyacid layer 200 with pendent metal-binding ligand groups or protein affinity tag-binding ligand groups 220 (e.g., after further contact with metallic ions to form the metal-ligand complex with tag-binding affinity).

Figure 1D:
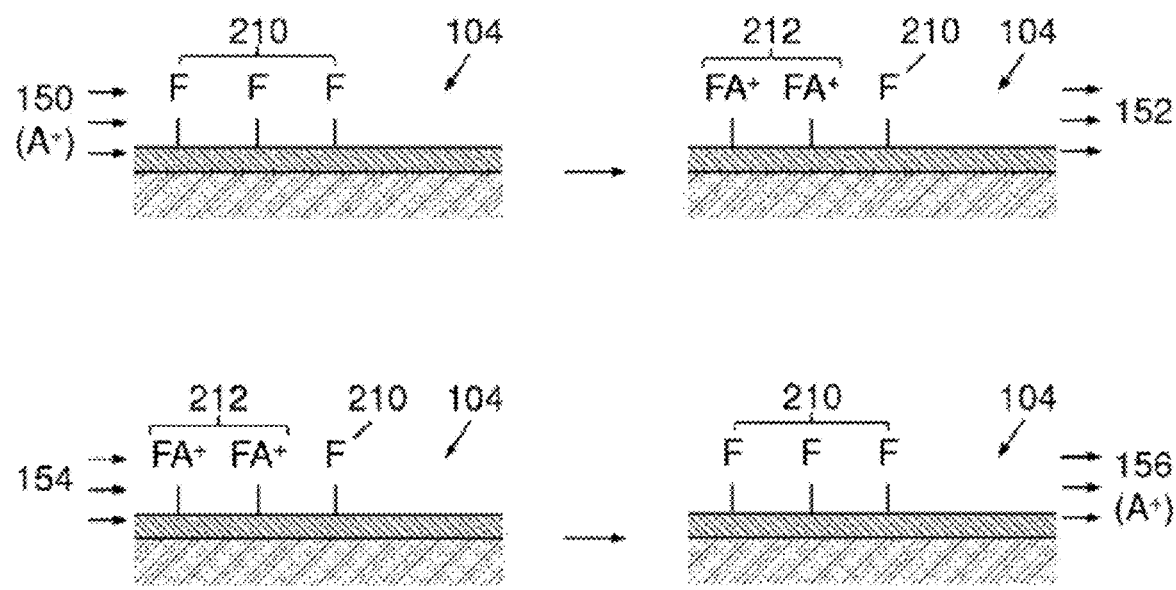
FIGS. 1D-1E illustrate methods of binding and recovering analytes from a sample using functionalized membranes according to the disclosure, including positively charged analytes (FIG. 1D) and protein analytes (FIG. 1E).

FIG. 1D illustrates a method of binding, capturing, and/or recovering an analyte from a fluid sample, for example a positively charged analyte such as a metallic ion or a polyatomic cation (e.g., whether metal-containing or otherwise) or a positively charged protein (e.g., lysozyme). As shown in FIG. 1D, a feed fluid 150 containing or suspected of containing a positively charged analyte ($A^+$) is fed through the functionalized membrane 104. While not particularly limited, suitable positively charged analytes can include metals in various positive oxidation states (e.g., Al, Sb, As, Ba, Be, Cd, Ca, Cr, Co, Cu, Fe, Pb, Li, Mg, Mo, Mn, Ni, K, Se, Ag, Na, Sr, Sn, Ti, TI, V, Zn, such as might be present in a water/wastewater stream to be purified). As the feed fluid 150 passes through the membrane 104, the free acid groups 210 can bind at least some of the analyte $A^+$, thus forming some at least some analyte-bound free acid groups ($FA^+$) 212 (e.g., where some unbound free acid groups 210 also can remain). The feed fluid 150 is removed from the membrane 104 as a permeate fluid 152 in which at least some of the analyte $A^+$ has been removed from the feed 150 (e.g., complete or substantially complete removal of the analyte $A^+$ provided that the membrane 104 binding capacity is not exceeded). Optionally, the analyte $A^+$ can be recovered/removed from the membrane 104 (e.g., when the analyte $A^+$ has value as a product or to regenerate the membrane 104 for further use). An elution/wash fluid 154 is fed to the membrane, removing at least some (or all) of the analyte $A^+$ from the analyte-bound free acid groups ($FA^+$) 212 to provide an eluate/purified permeate fluid 156 including the positively charged analyte ($A^+$).

Figure 1E:
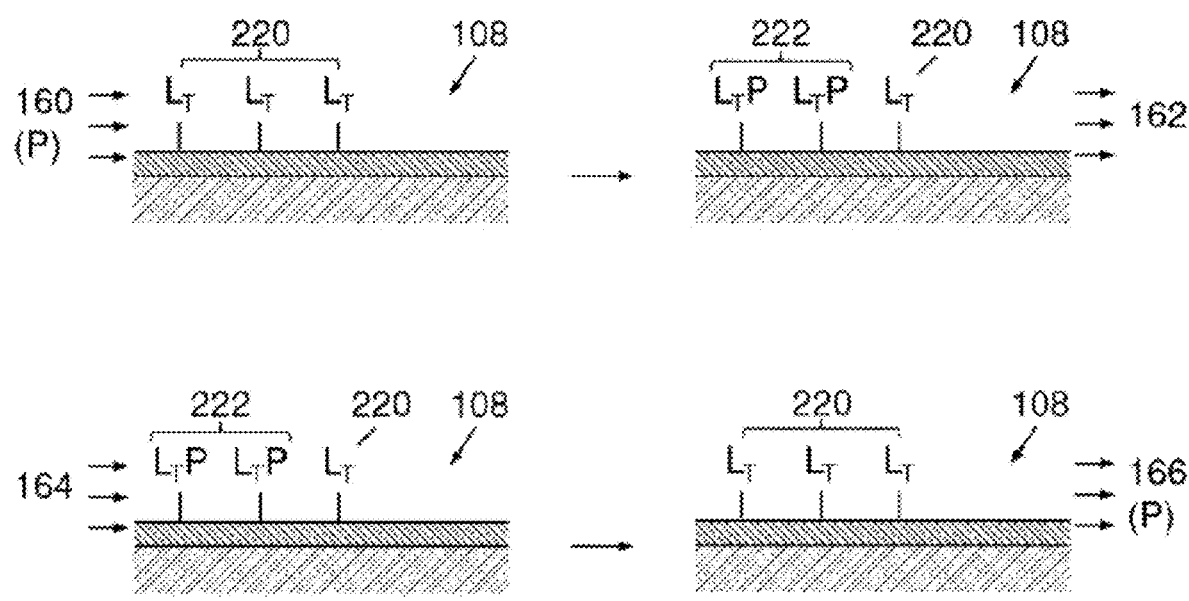

Similar to FIG. 1D, FIG. 1E illustrates a method of binding, capturing, and/or recovering an affinity-tagged target protein analyte from a fluid sample. As shown in FIG. 1E, a feed fluid 160 containing or suspected of containing an affinity-tagged target protein analyte (P) is fed through the functionalized membrane 108. While not particularly limited, suitable affinity tags include polyhistidine (His) tags (e.g., which can bind tightly with $Ni^{2+}$ or $Co^{2+}$ metal ions complexed with a pendent metal-binding ligand of the polyacid polymer), glutathione-S-transferase (GST) tags, maltose binding protein (MBP) tags, and chitin binding protein (CBP) tags. As the feed fluid 160 passes through the membrane 108, the affinity tag-binding ligands 220 can bind at least some of the protein analyte P, thus forming some at least some analyte-bound ligand groups ($L_TP$) 222 (e.g., where some unbound ligands 220 also can remain). The feed fluid 160 is removed from the membrane 108 as a permeate fluid 162 in which at least some of the protein analyte P has been removed from the feed 160 (e.g., complete or substantially complete removal of the protein analyte P provided that the membrane 108 binding capacity is not exceeded). Optionally, the protein analyte P can be recovered/removed from the membrane 108 (e.g., to recover the protein analyte P as a product and/or to regenerate the membrane 108 for further use). An elution/wash fluid 164 is fed to the membrane, removing at least some (or all) of the protein analyte P from the analyte-bound ligand groups ($L_TP$) 222 to provide an eluate/purified permeate fluid 166 including the protein analyte P.

EXAMPLES

The following examples illustrate the disclosed processes and compositions, but are not intended to limit the scope of any claims thereto.

The polyacid polymer CMPEI of Example 1 was synthesized and adsorbed on a membrane to promote swelling by protonation of amine groups at neutral pH, for example the amino nitrogen atoms along the polymer backbone. Control over pH permits high swelling and creates membranes that capture large amounts of protein. Membranes containing protonated poly(allylamine)/CMPEI-$Cu^{2+}$ complexes bind 60 mg of protein per mL of membrane. If $Ni^{2+}$ is present, such membranes capture His-tagged protein from cell extracts.

The polyacid copolymer of Example 4 includes acrylic acid and optionally acrylamide comonomers along with monomer repeat units having pendent metal-binding NTA ligands. The acrylic acid repeat units should promote swelling when deprotonated, and the units containing NTA will bind $Ni^{2+}$ to capture His-tagged protein. PAH/poly(NTA-co-AA-ACM) films can be formed with high thicknesses.

Example 5 describes a new method for making a polyacid polymer or copolymer with monomer repeat units having pendent metal-binding NTA ligands and optionally acrylic acid monomer units. The synthetic method greatly simplifies preparation, and metal leaching appears to be lower with this system. The acrylic acid comonomers can help control swelling. Films (4 to 5 bilayers) of this polymer on solid substrates swell well (~400-600%) and bind large amounts of $Cu^{2+}$ (2.0 mmol/cm$^3$). Membranes modified with these polymers also bind large amounts of metal ions. Preliminary studies of absorption of His-tagged protein *Pantoea agglomerans* (phenylalanine aminomutase (PaPAM), MW 55-60k) shows films containing two bilayers of poly(allylamine)/poly(NTA-Am)—$Ni^{2+}$ complexes bind 4 multilayers of protein. Membranes with $Cu^{2+}$ complexes capture 45 mg/mL of Con A.

Example 6 describes star polyacid polymers. Layer-by-layer deposition of these star polyacid polymers alternating with a corresponding star polycation polymer gives unique porous structures that may be especially valuable for sorption. These films show high swelling (~300-500%) and membranes containing star PAA/PDMAEMA bind 90-105 mg of Lysozyme per mL of membrane. The porous structure may facilitate protein transport into the film for subsequent binding.

Example 7 describes polyethylene oxide-based polyacid polymers. Polymers with polyethylene glycol backbones can be synthesized as shown in the example. Ideally, a more hydrophilic, oxygen-rich backbone can introduce more swelling to the polyelectrolyte films. Also, these polyethylene glycol polymer backbones are widely used in protein purification systems to reduce nonspecific binding. Since both polymer-backbones (cationic and anionic) contain polyethylene glycol backbone, more swelling could be possible with these polyelectrolytes.

Example 1

CMPEI-Functionalized Membranes

Membrane adsorbers rapidly capture tagged proteins because convective mass transport through membrane pores efficiently conveys proteins to binding sites. Fabrication of effective adsorbers, however, involves modification of membrane pores with thin films that swell in water and bind multilayers of proteins. This example demonstrates membrane modification via adsorption of polyelectrolytes that chelate metal ions, and these modified membranes selectively capture polyhistidine-tagged proteins with capacities higher than those of commercial beads. Direct adsorption of functional polyelectrolytes is simpler than prior modification strategies such as growth of polymer brushes or derivatization of adsorbed layers with chelating moieties. Sequential adsorption of protonated poly(allylamine) (PAH) and carboxymethylated branched polyethyleneimine (CMPEI) leads to membranes that bind $Ni^{2+}$ and capture 60±6 mg of his-tagged ubiquitin per mL of membrane. Moreover, the membrane enables isolation of his-tagged protein from cell lysates in as little as 20 min. Although it contains both cationic and anionic groups, CMPEI acts as a polyanion during polyelectrolyte adsorption. The cationic groups in CMPEI potentially increase swelling in water compared to films composed of PAH and the chelating polymer poly[(N,N-dicarboxymethyl) allylamine](PDCMAA), which has a hydrocarbon backbone. Consistent with higher swelling, PAH/CMPEI-$Cu^{2+}$ films capture almost twice as much protein as PAH/PDCMAA-$Cu^{2+}$ films. Metal leaching from PAH/CMPEI- and PAH/PDCMAA-modified membranes is similar to that from GE HITRAP FF columns, presumably because of related chelating groups in the three materials. Eluates with 0.5 M imidazole contain<10 ppm $Ni^{2+}$.

In most studies of overexpressed proteins, purification employs engineered affinity tags. Hexahistidine is the most common affinity tag because it is relatively small and enables convenient capture by binding to beads containing $Ni^{2+}$ or $Co^{2+}$ complexes. Nevertheless, bead-based separations suffer from slow diffusion of large macromolecule into nanopores, which necessitates long separation times that may harm sensitive proteins. Separations are especially time consuming when capturing proteins from large volumes of dilute solutions. Porous membranes modified with affinity ligands are an attractive alternative purification platform because convection through the membrane pores and short radial diffusion distances provide rapid protein transport to binding sites. Moreover, membrane pressure drops are low because of small thicknesses. Nevertheless, membranes have a lower specific surface area than nanoporous beads, which often leads to a low binding capacity.

To increase protein-binding capacities of membranes, several groups modified membrane pores with thin polymer films. Both surface-initiated growth of polymer brushes and layer-by-layer polyelectrolyte adsorption can provide highly swollen films that capture multiple layers of proteins. Compared to the synthesis of polymer brushes, which is a relatively cumbersome process that frequently requires initiator immobilization and subsequent polymerization under anaerobic conditions, layer-by-layer deposition is quite simple. Layer-by-layer adsorption of (polyacrylic acid) PAA/(polyethyleneimine) (PEI) films and subsequent derivatization with aminobutyl nitrilotriacetate (NTA) to immobilize NTA-$Ni^{2+}$ complexes on a membrane surface can be used to capture his-tagged proteins. However, derivatization represents more than 95% of the cost of chemicals and materials for creating protein-binding membranes, and most of the aminobutyl NTA does not couple to the membrane. In addition to NTA these membranes contain other —COOH groups that bind $Ni^{2+}$ only weakly, which leads to significant metal-ion leaching and loss of the complexed metallic ions from the membrane.

Figure 2:
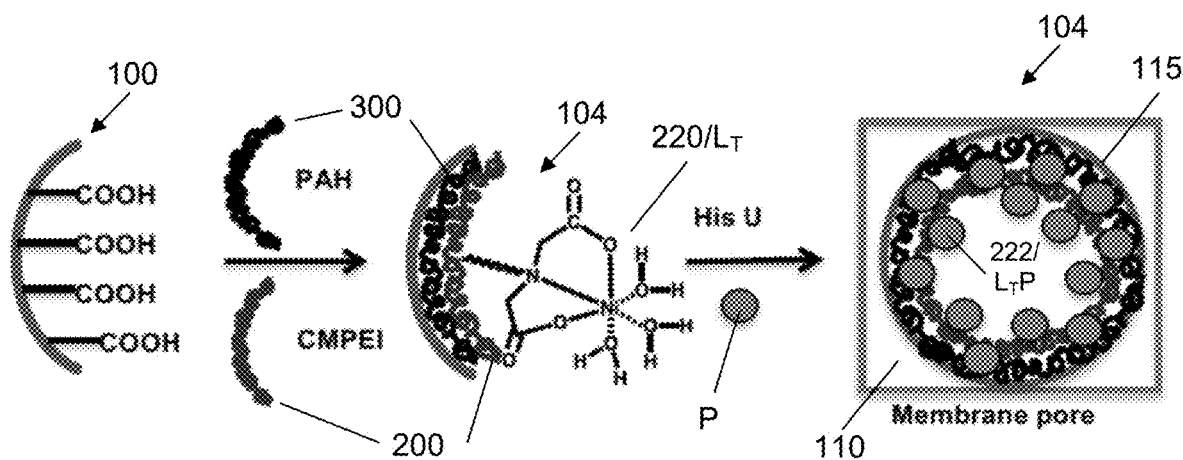
FIG. 2 illustrates the assembly of a (PAH/CMPEI)—$Ni^{2+}$ film in a carboxymethylated nylon pore and capture of a his-tagged protein.

This illustrates the direct adsorption of relatively inexpensive polyelectrolytes with chelating groups (Scheme 1.1) that can effectively create functionalized membranes 104 that bind metal ions and capture his-tagged protein P (FIG. 2). Specifically, PAH/(poly[(N,N-dicarboxymethyl) allylamine]) (PDCMAA) (not illustrated) and PAH 300/(carboxymethylated branched polyethyleneimine) 200 (CMPEI) films are adsorbed in membrane 100 pores 115 in a few minutes. Both PDCMAA and CMPEI contain iminodiacetic acid groups 220/$L_T$ that formed during reaction of commercial polymers, PAH and PEI, with chloroacetic acid (Scheme 1.1). Thus, these polymers are readily accessible. Previous studies examined layer-by-layer adsorption of (PAH/PDCMAA)n films and showed that they can capture up to 2.5 M of metal ions or facilitate selective metal-ion transport. Linear CMPEI is commercially available, but branched PEI is used because it may provide thicker, highly swollen films for protein capture. Protein binding to PAH/PDCMAA and PAH/CMPEI films (illustrated as analyte-bound ligand groups 222/$L_T$P in the functionalized membrane 104 of FIG. 2) are compared to illustrate whether amine groups in the PEI backbone will increase swelling and enhance protein capture. Membranes modified with PAH/CMPEI rapidly capture as much as 60 mg of protein per mL of membrane, which is comparable to the capacities of commercial beads.

Materials: PCDMAA was synthesized as described in Wijeratne (2013) and in Example 2. CMPEI was synthesized as illustrated in Scheme 1.1 and described in Example 3. Aqueous solutions containing 0.02 M PAH, 0.01 M CMPEI or 0.01 M PDCMAA were prepared in deionized water (18.2 MΩcm, Milli-Q) or 0.5 M aqueous NaCl, and solution pH values were adjusted by drop-wise addition of 0.1 M NaOH or HCl. Polymer concentrations are given with respect to the repeating unit. Au-coated silicon wafers (200 nm of sputtered Au on 20 nm of Cr on Si (100) wafers) were cleaned in a UV/O$_3$ chamber for 15 min prior to use. Other materials include hydroxylated nylon (LOPRODYNE LP, Pall, 1.2 μm pore size, 110 μm thick), conconavalinA (Con A) from Canavalia ensiformis (Jack bean), coomassie protein assay reagent (Thermo Scientific), histidine 6-tagged ubiquitin (His-U, human recombinant, Bostonbiochem), polyethyleneimine (PEI, branched, Mw=25 000), poly(allylamine hydrochloride) (PAH, molecular weight 120,000-200,000 Da, Alfa Aesar), and poly(acrylic acid) (PAA, Mw=90 000, 25% aqueous solution, Polysciences). Cupric sulfate, nickel sulfate, sodium phosphate, sodium phosphate dibasic, ethylenediaminetetraacetic acid disodium salt (EDTA), sodium chloroacetate (98%), 3-mercaptopropionic acid (MPA, 99%) and imidazole (>99%) were received from Aldrich and used without further purification. Buffers include: Binding buffer 1:20 mM phosphate buffer, pH 6; Binding buffer 2:20 mM phosphate buffer, pH 7.4; Washing buffer 1:20 mM phosphate buffer, 150 mM NaCl, 1% TWEEN 20, pH 7.4; Washing buffer 2:20 mM phosphate buffer, 45 mM imidazole, 150 mM NaCl, pH 7.4; Elution buffer: 20 mM phosphate buffer, 500 mM NaCl, 500 mM imidazole, pH 7.4; Stripping buffer: 20 mM phosphate buffer, 500 mM NaCl, 50 mM EDTA, pH 7.4; All experiments were repeated two or three times, and uncertainty values are standard deviation of three experiments with independent membranes.

Scheme1.1: Synthesis of PDCMAA and CMPEI

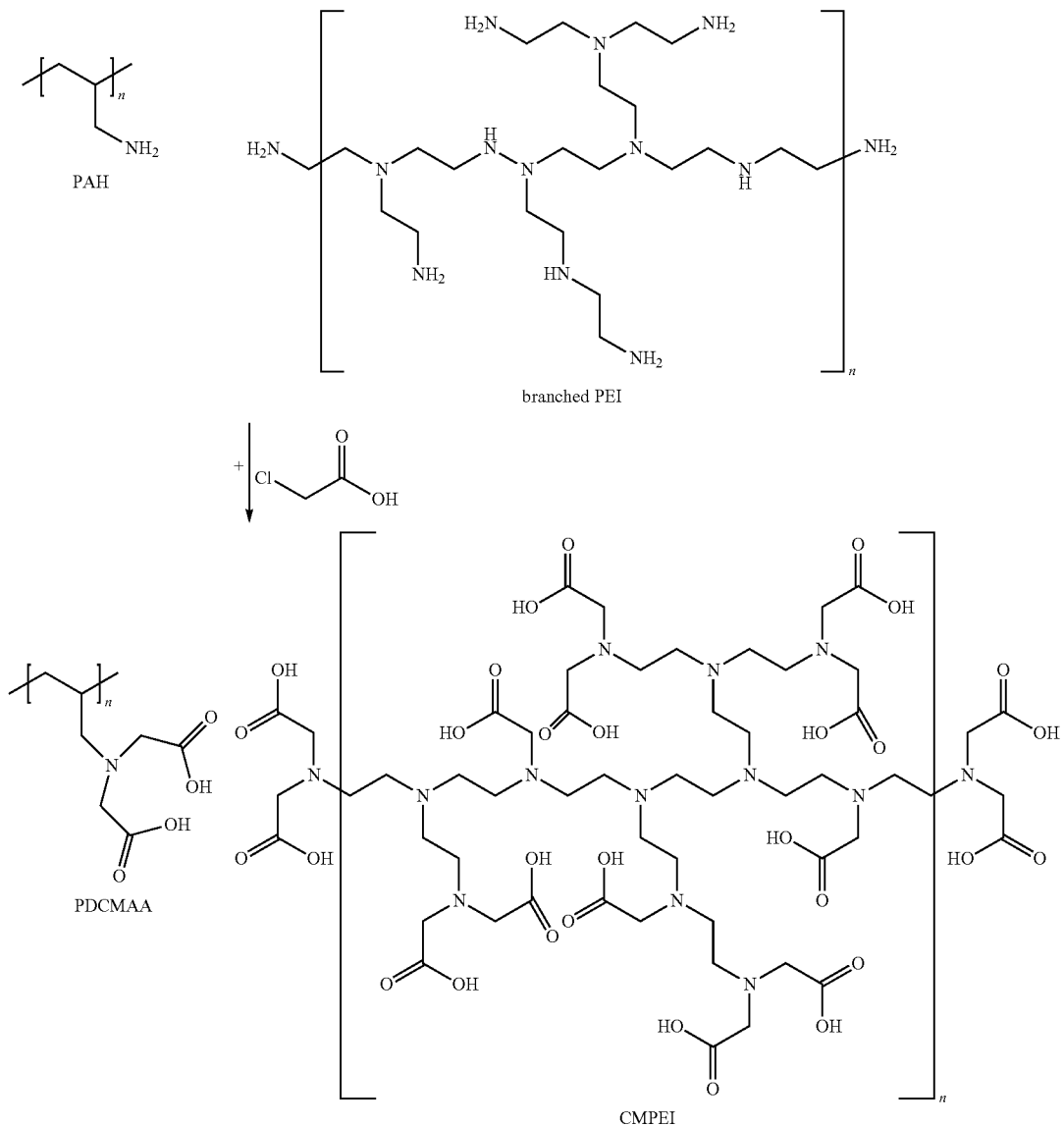

Adsorption of polyelectrolyte multilayers (PEMs): Au-coated Si substrates (24 mm×11 mm) were immersed in 5 mM MPA in ethanol for 16 h, rinsed with ethanol, and dried with $N_2$ to form a monolayer of MPA for adsorption of PAH. These substrates were immersed in 0.02 M PAH (adjusted to the desired pH) for 15 min and subsequently rinsed with 10 mL of deionized water and blown dry with $N_2$. Substrates were then immersed in a 0.01 M CMPEI or PDCMAA solution (adjusted to the desired pH value) for 15 min followed by the same rinsing and drying procedures. In some cases, the polyelectrolyte solution also contained 0.5 M NaCl. The process was repeated to form multilayer films.

In some cases, nylon membranes were immersed in 0.1 M sodium chloroacetate in 3 M NaOH for 16 h and subsequently washed with water and dried with $N_2$. The resulting carboxymethylated membrane disks were cleaned for 10 min with $UV/O_3$ and placed in a homemade TEFLON (PTFE) holder (similar to an AMICON cell) that exposed 3.1 $cm^2$ of external membrane surface area. Subsequently, a 5 mL solution containing 0.02 M PAH and 0.5 M NaCl was circulated through the membrane for 15 min at a flow rate of 1 mL/min using a peristaltic pump. A CMPEI or PDCMAA layer was deposited similarly using 0.01 M CMPEI or 0.01 M PDCMAA solutions containing 0.5 M NaCl. After deposition of each polyelectrolyte layer, 20 mL of water was passed through the membrane at the same flow rate. Nylon membranes without carboxymethylation were modified with PEMs similarly, starting with the $UV/O_3$ cleaning.

Characterization of polyelectrolyte film on gold wafers: Spectroscopic ellipsometry (model M-44; J. A. Woollam) was used to determine the thicknesses of PEMs on gold-coated wafers, assuming a film refractive index of 1.5. Film thickness in aqueous solutions was measured in a home-built cell. In that case, the software determines the refractive index of swollen films. Reflectance FTIR spectra were obtained with a Thermo Nicolet 6700 FTIR spectrometer using a Pike grazing angle (80°) apparatus. A UV/ozone-cleaned Au-coated wafer served as a background.

Metal and protein binding in $(PAH/CMPEI)_n$- and $(PAH/PDCMAA)_n$-modified wafers and membranes: Bare carboxymethylated nylon and membranes containing (PAH/CMPEI)n and (PAH/PDCMAA)n were loaded with $Cu^{2+}$ or $Ni^{2+}$ by circulating 0.1 M $CuSO_4$ or $NiSO_4$ (pH around 3.8) through the membrane for 30 min, followed by rinsing with 20 mL water. Metal was eluted from the membranes by stripping buffer or 2% $HNO_3$ and subsequently analyzed by atomic absorption spectroscopy.

For protein capture on wafers coated with PEMs, the modified substrates were immersed in solutions containing 0.3 mg/mL of Con A or His U in binding buffer 1 for Con A and binding buffer 2 for His U for 1 h at room temperature. Subsequently, using a Pasteur pipette these substrates were rinsed with 10 mL of washing buffer 1 and 10 mL of water for 1 min each and dried with $N_2$. The amount of protein binding was determined by reflectance FTIR spectroscopy and expressed as the equivalent thickness of spin-coated protein that would give the same absorbance. The equivalent thickness d is calculated from the difference in absorbance ($\Delta A$) at 1680 $cm^{-1}$ (amide band I of protein) before and after binding, using the equation $d(nm)=\Delta A/0.0017$. Some of these thicknesses were confirmed using ellipsometry. Assuming a protein density of 1 $g/cm^3$, each nm of equivalent thickness corresponds to approximately 1 $mg/m^2$ of surface coverage.

Breakthrough curves for capture in membranes were obtaining by passing protein solution (0.3 mg/mL) in binding buffer 1 or binding buffer 2 through the membranes. For Con A and lysozyme binding, these studies employed the homemade TEFLON holder that exposed 3.1 $cm^2$ of external membrane surface area. Because of the high cost of his-tagged protein, TEFLON holder was used that exposed a surface area of 0.78 $cm^2$ (1.0-cm exposed diameter) to test the protein binding capacity for His-U. Bradford assays (using calibration with the protein of interest) were employed to quantify the concentration of proteins in the membrane effluent or eluate.

Protein separation from a cell extract: His-tagged small ubiquitin modifier (His-SUMO) was over-expressed in *E. coli* cells. The cells were lysed with sonication in binding buffer 2 and centrifuged. Supernatant (2 mL) was pumped thorough the (PAH/CMPEI)-modified membrane at room temperature at a flow rate of 1 mL/min. Subsequently the membrane was rinsed with 5 mL of binding buffer 2 and 5 mL of washing buffer 2, and the bound protein was eluted with 2 mL of elution buffer. The purity of the eluted protein was determined by sodium dodecyl sulfate-polyacrylamide gel electrophoresis (SDS-PAGE).

Metal leaching and film stability: To examine film stability under purification conditions, $(PAH/CMPEI)_2$-modified gold wafers were soaked in binding buffer 2 for 20 hours. Film thickness values and FTIR spectra were obtained before after immersion in the buffer for different times. TOC analysis was used to quantify the amount of polyelectrolyte leaching from membranes in binding buffer 2. Polyelectrolyte solutions with concentration of 0 ppm, 10 ppm, 20 ppm, 30 ppm, 40 ppm and 50 ppm were used for TOC calibration. The effluent and washing solutions were diluted with water before analysis.

To test the metal leaching in different buffers, (PAH/PDCMAA)-, $(PAH/PDCMAA)_2$-, (PAH/CMPEI)- and $(PAH/CMPEI)_2$-modified carboxymethylated nylon membranes were loaded with $Ni^{2+}$ using the above procedure and washed with 160 bed volumes (5 mL) each of binding buffer 2, wash 1, wash 2, elution buffer, stripping buffer, and 2% $HNO_3$. As a comparison, a GE Healthcare HITRAP IMAC FF column (1 mL) was washed with 160 bed volumes (160 mL) of the same buffers. All the samples were diluted 1:5 with deionized water and analyzed by atomic absorption Healthcare HITRAP spectrometry. The GE IMAC FF column was loaded with $Ni^{2+}$ following the manufacture procedure with little modification: loading with 2 mL of 0.1 M $NiSO_4$ followed by washing with 20 mL deionized water.

Layer-by-layer adsorption of films containing CMPEI: CMPEI contains both weakly basic (amine) and weakly acidic (carboxylic acid) groups and thus can potentially form salt bridges with both cations and anions on a surface. An acid titration of CMPEI suggests nearly complete protonation of amine groups below pH 7, whereas protonation of the carboxylate groups begins below pH 4, which is similar to the titration of PDCMAA. This is reasonably consistent with the pKa values for iminodiacetic acid, which are 9.4, 2.6, and 1.8. The ratio of carboxylic acid groups to amines is around 1:1 in CMPEI but 2:1 in iminodiacetic acid and PDCMAA.

Figure 3:
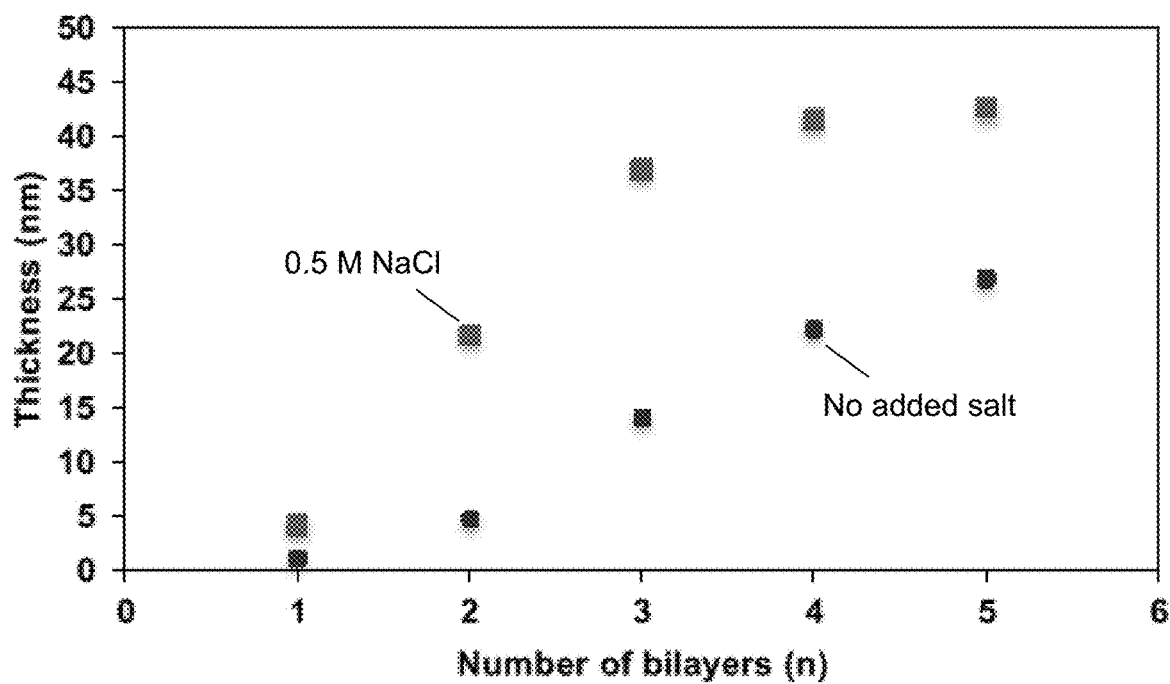
FIG. 3 is a graph illustrating ellipsometric thicknesses of (PAH/CMPEI)$_n$ films as a function of the numbers of adsorbed bilayers, n. Films were deposited from pH 3 solutions containing 0.5 M NaCl (squares) or no added salt (circles). The substrates were Au-coated Si wafers modified with a monolayer of MPA, and error bars are smaller than the symbols.

Based on the polymer titration and 1:1 ratio of amine to carboxylic acid groups, CMPEI might serve as a polyanion in films formed at basic pH and as a polycation in films formed at acidic pH. With branched CMPEI, adsorption of (polycation/CMPEI)n coatings also occurs at low pH. FIG. 3 shows the ellipsometric thicknesses of (PAH/CMPEI)n films deposited at pH 3. In the absence of salt in adsorption solutions (circles), after deposition of the initial bilayer, which is ~1 nm thick, adsorption of each subsequent bilayer adds ~5 nm of thickness. Addition of 0.5 M NaCl to adsorption solutions increases the thicknesses of layers 2- to 3-fold. At low pH, CMPEI has a net positive charge, so electrostatic repulsion between the positive ammonium groups should make the polymer partially extend. Addition of salt increases thickness by screening charges in the polymer to create loops and tails and by increasing surface roughness.

Figure 5:
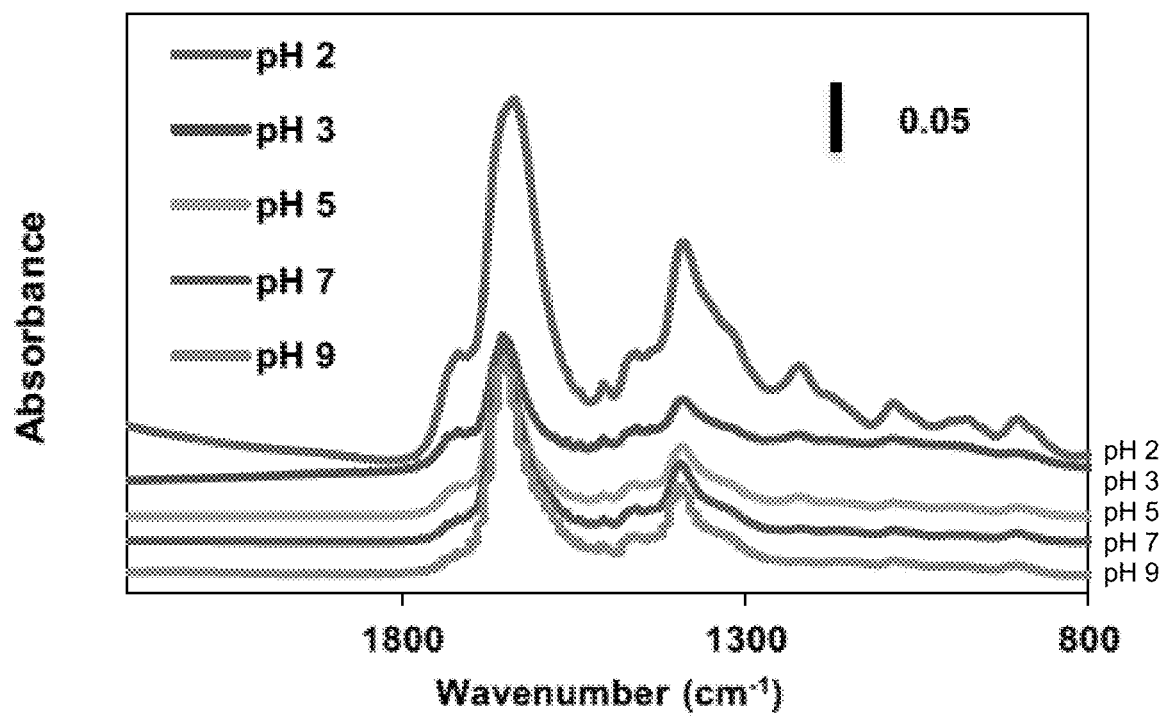
FIG. 5 is a graph illustrating reflectance IR spectra (2200-800 $cm^{-1}$) of (PAH/CMPEI)$_5$ films deposited on MPA-modified gold wafers at pH 2, 3, 5, 7 and 9 (from top to bottom).

During adsorption, carboxylate groups on CMPEI most likely bind to ammonium groups of PAH with displacement of counterions from these groups. Reflectance IR spectroscopy confirms that most of the carboxylate groups in these films are deprotonated (FIG. 5). The formation of films by adsorption of CMPEI and PAH, which both possess a net positive charge in solution, likely occurs due to polarization-induced attraction, a typical force involved in the complexation between the polyelectrolyte and polyampholyte. (PAH/CMPEI) growth reaches a plateau at 4-5 double layers for adsorption in the presence of salt, perhaps because of the net positive charge on both polymers and less polarization-induced attraction in thicker films.

Figure 4:
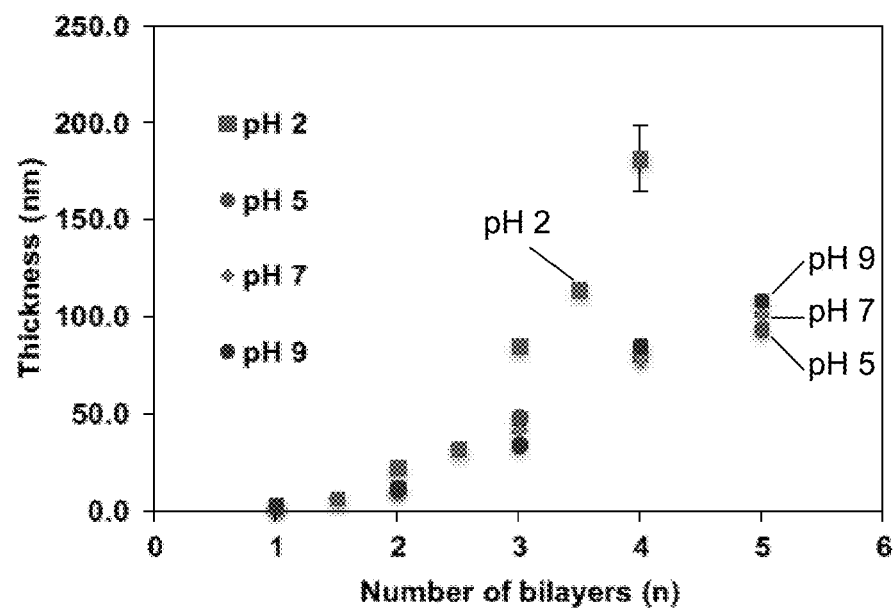
FIG. 4 is a graph illustrating ellipsometric thicknesses of (PAH/CMPEI)$_5$ films as a function of deposition pH (squares: pH 2; lighter circle: pH 5; diamond: pH 7; and darker circle: pH 9). Films were adsorbed from 0.5 M NaCl solutions onto Au-coated Si wafers modified with a monolayer of MPA, and error bars are smaller than the symbols. For coatings adsorbed at pH 2, non-integer bilayer numbers indicate films terminated with PAH.

FIG. 4 shows the thicknesses of $(PAH/CMPEI)_5$ films as a function of the deposition pH. Similar to other films with weak-acid polyelectrolytes, the highest thicknesses occur with films deposited at the lowest pH. In this case, films formed at pH 2 are more than twice as thick as films adsorbed at pH 3-9. Due to the relatively low pK values of the —COOH groups in CMPEI, thickness only increases at the lowest pH value. At the deposition pH of 2, the thickness increase due to adsorption of both PAH and CMPEI also was determined. As FIG. 4 shows (squares), the thickness increase upon adsorption of PAH is about half that for adsorption of CMPEI, suggesting the films contain more CMPEI than PAH, which is likely necessary for charge compensation. After deposition of the fifth (PAH/CMPEI) double layer at pH 2, the surface was not uniform enough for an accurate thickness determination by ellipsometry.

The reflectance IR spectra of (PAH/CMPEI)5 films deposited at different pH values show that most of the carboxylic groups are deprotonated. However, the ratio of the absorbances of the —COO— symmetric stretch (~1650 $cm^{-1}$) and the —COOH peak (1720 $cm^{-1}$) decreases as the deposition pH decreases.

CMPEI gives very thin films when serving as a polycation in layer-by-layer adsorption. $(CMPEI/PSS)_5$ films deposited at pH 3 in 0.5 M salt have thicknesses of only 10±2 nm. The positive charges of CMPEI reside mostly in or near the backbone and may be less available for adsorption than —COO— groups on the side chains. Using a cyclic analogue of linear CMPEI, Hoffman and Tieke (2009) also found minimal growth during layer-by-layer deposition with PSS.

Film Swelling: For thin films that selectively bind proteins in platforms such as porous membranes, film swelling in water is important for extensive protein capture. To examine swelling, in situ ellipsometry was performed with $(PAH/CMPEI)_5$ films (deposited at pH 3 from 0.5 M NaCl) immersed in deionized water or binding buffer 2 (pH 7.4). After a 20-minute immersion, swelling of the film was 160±30% in deionized water and 680±260% in buffer. Consistent with the approximately 62% and 88% water in the immersed coatings, the film refractive indices decrease from 1.50 to 1.39 and 1.35 after swelling in water and buffer, respectively. The refractive index of water at the wavelengths of the spectroscopic ellipsometer is about 1.333. Deprotonation of —COOH groups in pH 7.4 buffer likely enhances the swelling, which should provide the space for binding multilayers of protein in the film. IR spectra confirm the deprotonation after immersing the film in buffer. As a comparison, the swelling of $(PAH/PDCMAA)_5$ films (deposited at pH 3 from 0.5 M NaCl) was 52±16% in deionized water and 220±20% in binding buffer 2. The high swelling of $(PAH/CMPEI)_5$ relative to $(PAH/PDCMAA)_5$ suggests that the charged backbone and branched structure of CMPEI facilitate swelling.

Modification of porous membranes to bind proteins can involve adsorption of only a few polyelectrolyte bilayers to simplify the process and avoid plugging of pores. Moreover the films should contain metal-ion complexes for capture of proteins through metal-ion affinity interactions. Thus swelling of $(PAH/CMPEI)_2$ and $(PAH/PDCMAA)_2$ films containing $Cu^{2+}$ complexes also was examined. These studies employed binding buffer 1 (pH 6.0) to match subsequent Con A-binding studies, as Con A solutions are not stable at pH 7.4.

Figure 6:
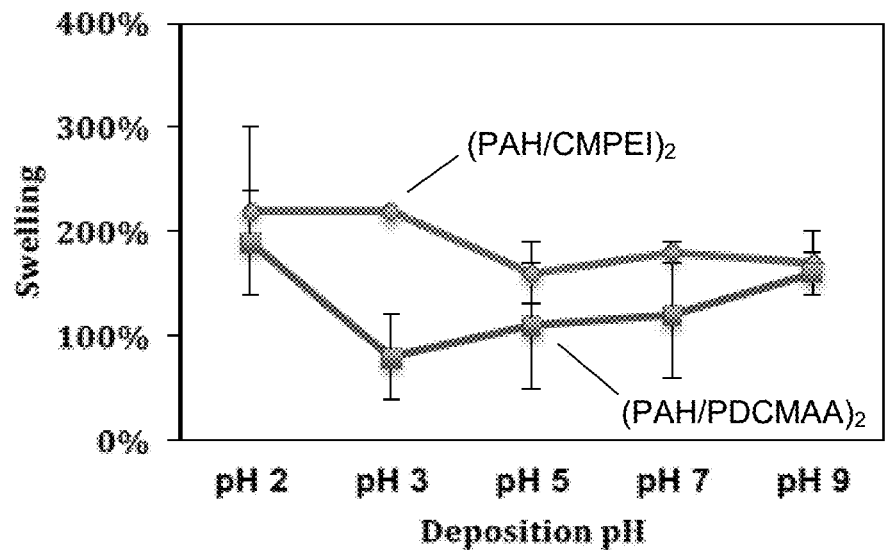
FIG. 6 is a graph illustrating swelling of (PAH/CMPEI)$_2$ (circles) and (PAH/PDCMAA)$_2$ (squares) multilayers after complexation of $Cu^{2+}$ and subsequent immersion in binding buffer 1 (pH 6.0) for 20 min. Polyelectrolytes were adsorbed at pH 3 from solutions containing 0.5 M NaCl.

FIG. 6 shows that for all film-adsorption pH values, the $(PAH/CMPEI)_2$—$Cu^{2+}$ swelling is around 200%. Formation of the metal-ion complex decreases film swelling, potentially due to formation of neutral $Cu^{2+}$-iminodiacetate complexes. The $(PAH/PDCMAA)_2$-$Cu^{2+}$ films show average swellings of only 100% when deposited at pH 3, 5, and 7. Although both CMPEI and PDCMAA contain iminodiacetate moieties, the ammonium groups in the backbone of CMPEI films could increase swelling compared to films with PDCMAA, which contains an ethylenic hydrocarbon backbone.

Protein Binding to $(PAH/CMPEI)_2$—$Cu^{2+}$ and $(PAH/PDCMAA)_2$-$Cu^{2+}$ films: In initial studies of protein binding, Con A was captured in $(PAH/CMPEI)_2$—$Cu^{2+}$ and $(PAH/PDCMAA)_2$-$Cu^{2+}$ films on Au-coated Si wafers modified with MPA. Binding likely occurs when histidine groups on the protein coordinate with immobilized $Cu^{2+}$. Using reflectance IR spectroscopy, the amount of protein binding was determined based on the amide absorbance, which is compared to the absorbance in spin-coated films with different thicknesses. $(PAH/PDCMAA)_2$-$Cu^{2+}$ films have average thicknesses ranging from 7-25 nm, depending on the deposition pH (see FIG. 7), but these coatings bind the equivalent of <3 nm of protein, or less than a monolayer. Such low binding will lead to low capacities in membranes modified with these films. In contrast, $(PAH/CMPEI)_2$—$Cu^{2+}$ films adsorbed at pH 2 have an average thickness of 48 nm and capture 18 nm of protein (FIG. 8), which is the equivalent of 2-3 monolayers of protein (Con A size is around 6.7 nm). In a membrane with 1.2 μm pores, such binding could lead to capture of ~35 mg protein/$cm^3$.

Figure 7:
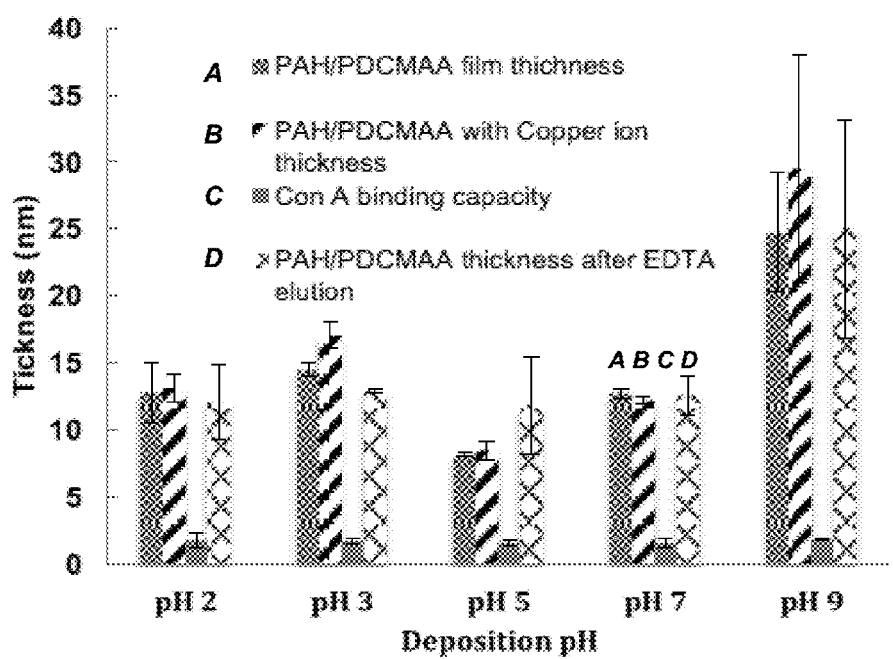
FIG. 7 is a graph illustrating thicknesses of (PAH/PDCMAA)$_2$ multilayers before and after complexation of $Cu^{2+}$ and the equivalent thicknesses of Con A adsorbed in these films. (PAH/PDCMAA)$_2$ multilayers were deposited from polyelectrolyte solutions containing 0.5 M NaCl at various pH values and film thicknesses are also given after protein elution with 50 mM EDTA.
Figure 8:
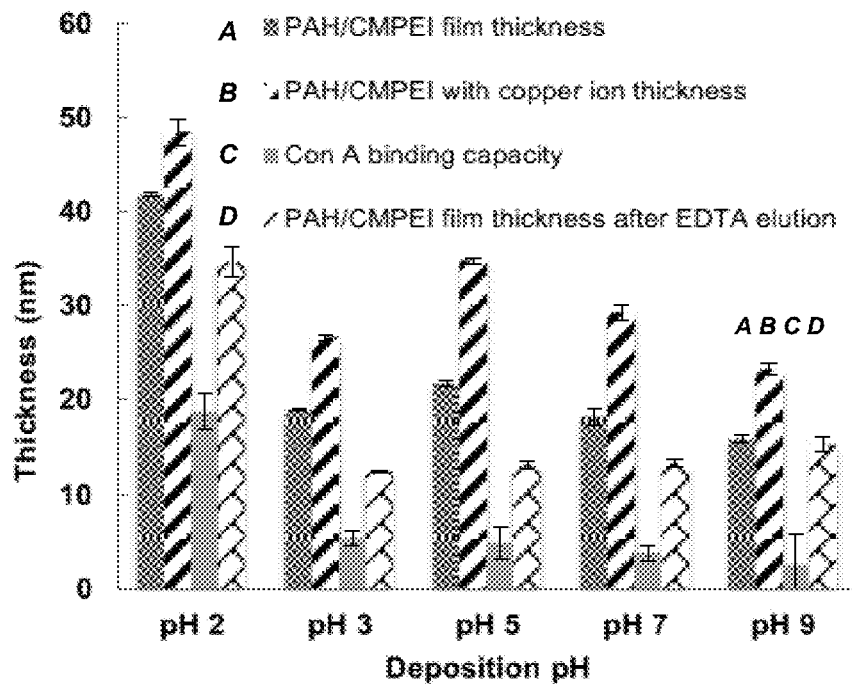
FIG. 8 is a graph illustrating film thicknesses of (PAH/CMPEI)$_2$ multilayers before and after complexation with $Cu^{2+}$ and the equivalent thicknesses of Con A adsorbed in these films. (PAH/CMPEI)$_2$ multilayers were deposited from polyelectrolyte solutions containing 0.5 M NaCl at various pH values and film thicknesses are also given after protein elution with 50 mM EDTA.

Adsorption of $(PAH/CMPEI)_2$ at deposition pH values from 3-7 leads to thinner films than adsorption at pH 2 and binding of only 5 nm or less of protein (FIG. 8). Thus, adsorption at low pH to achieve relatively thick CMPEI films and high swelling is important to achieving high binding capacities. FIGS. 7 and 8 also show that after elution of $Cu^{2+}$ with EDTA, the film thickness has a decrease less than 20%.

Figure 9:
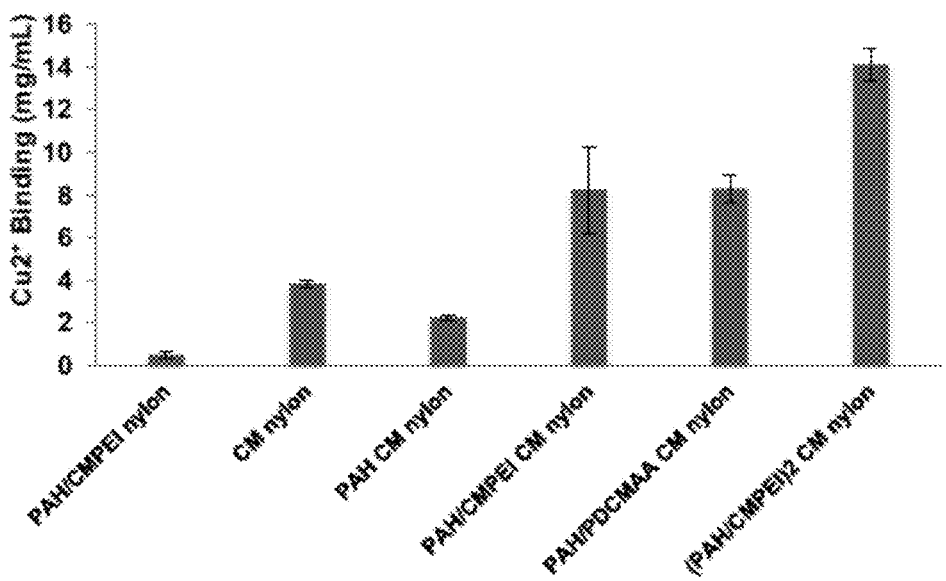
FIG. 9 is a graph illustrating $Cu^{2+}$ binding capacity in PAH/CMPEI-modified nylon, carboxymethylated (CM) nylon, PAH-modified CM nylon, PAH/CMPEI-modified CM nylon, PAH/PDCMAA-modified CM nylon, and (PAH/CMPEI)$_2$-modified CM nylon. All polyelectrolytes were adsorbed at pH 2 from solutions containing 0.5 M NaCl.

Adsorption of $(PAH/CMPEI)_n$ and $(PAH/PDCMAA)_n$ films within membrane pores is difficult to quantify. To qualitatively assess the amount of adsorbed polymer, the $Cu^{2+}$ binding in membranes modified with polyelectrolyte films was examined. As FIG. 9 shows, a nylon membrane modified with PAH/CMPEI (far left data) binds<1 mg of $Cu^{2+}$ per mL of membrane. This suggests minimal adsorption of PAH/CMPEI, so nylon was treated with 0.1 M sodium chloroacetate in 3 M NaOH to increase the number of —COOH groups on pore surfaces and enhance sorption. Unfortunately, $Cu^{2+}$ binds to carboxymethylated nylon, and a control experiment showed capture of 4 mg of $Cu^{2+}$ per mL of a membrane modified only by carboxymethylation. However, adsorption of PAH in the membrane decreases the $Cu^{2+}$ capture to about 2 mg/mL, presumably because PAH forms electrostatic interactions with some —COO⁻ groups to prevent binding. Protonation of the amine groups likely prevents them from binding $Cu^{2+}$. The pH of the $Cu^{2+}$ loading solution is ~4. Subsequent adsorption of a CMPEI layer leads to capture of 8 mg of $Cu^{2+}$ per mL of membrane, and CM nylon membranes modified with PAH/CMPEI and PAH/PDCMAA show similar $Cu^{2+}$ binding. (PAH/CMPEI)$_2$-modified film shows a $Cu^{2+}$ binding around 14 mg/mL membrane. Assuming that one repeat unit of PDCMAA binds to one $Cu^{2+}$ ion, capture of 8 mg of $Cu^{2+}$ implies adsorption of 20 mg of PDCMAA. If 4 mg of the $Cu^{2+}$ capture is due to —COOH groups on the CM nylon or PAH groups, the amount of PDCMAA in the membrane would be 10 mg. Although CMPEI and PDCMAA have different structures, the ratio of $Cu^{2+}$ to adsorbed polymer should be similar in the two cases (see scheme 1), so the modified membranes should contain similar amounts of PDCMAA and CMPEI.

The PAH/CMPEI CM nylon membrane binds 16 times the amount of $Cu^{2+}$ captured in a PAH/CMPEI nylon membrane. SEM images of bare nylon, CM nylon, (PAH/CMPEI)—$Cu^{2+}$ CM nylon and (PAH/CMPEI)$_2$—$Cu^{2+}$ CM nylon (not shown) indicated that the structures of the nylon membranes exhibit no obvious change after carboxymethylation, so the primary effect of this treatment is the formation of —COOH groups that facilitate adsorption of the initial PAH layer.

Figure 10:
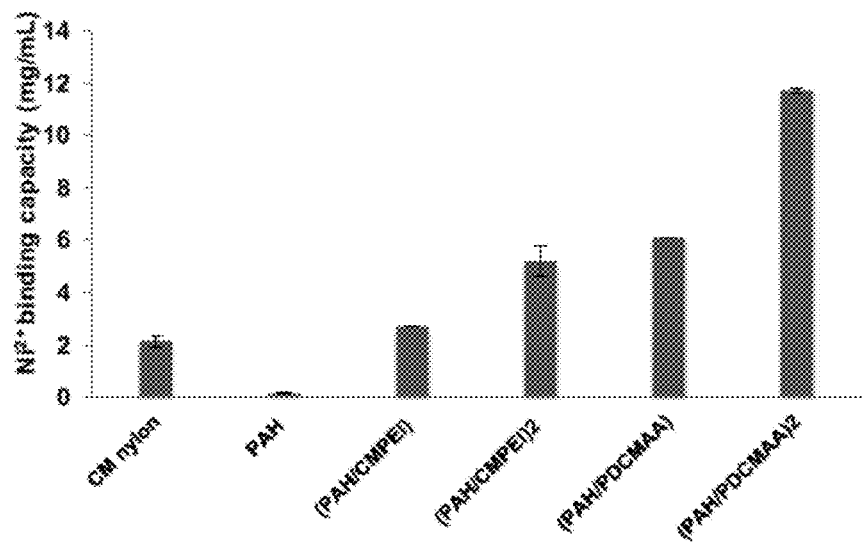
FIG. 10 is a graph illustrating $Ni^{2+}$ binding capacity in bare CM nylon and CM nylon membranes coated with PAH/CMPEI, (PAH/CMPEI)$_2$, (PAH/PDCMAA), and (PAH/PDCMAA)$_2$. All the polyelectrolytes were deposited at pH 2 from solutions containing 0.5 M NaCl.

Selective capture of his-tagged proteins typically employs immobilized $Ni^{2+}$ or $Co^{2+}$ complexes, not $Cu^{2+}$. Histidine binding to $Ni^{2+}$ and $Co^{2+}$ is weaker than to $Cu^{2+}$ and thus requires multiple histidines for protein capture, which affords selective capture of his-tagged species. As FIG. 10 shows, CM nylon membranes modified with PAH/CMPEI and (PAH/CMPEI)$_2$ films bind 2 mg/mL and 5 mg/mL of $Ni^{2+}$, respectively. This is considerably less than the $Cu^{2+}$ binding capacity (FIG. 9), perhaps because $Ni^{2+}$ only binds strongly to sites with the full iminodiacetic acid functionality. Amines modified with a single carboxylic acid group may not give stable complexes with $Ni^{2+}$. The unmodified CM nylon also has a lower $Ni^{2+}$ binding than $Cu^{2+}$ binding, and CM membranes modified with only PAH show minimal $Ni^{2+}$ binding. PDCMAA contains only IDA binding groups, so there is not a large difference between $Ni^{2+}$ and $Cu^{2+}$ binding to membranes containing PAH/PDCMAA films. Thus, the membranes modified with PAH/PDCMAA and (PAH/PDCMAA)$_2$ capture more $Ni^{2+}$ than corresponding membranes modified with PAH/CMPEI and (PAH/CMPEI) 2. Nevertheless, the ratio of $Ni^{2+}$ to captured protein in membranes is often more than 10, so the $Ni^{2+}$ binding capacity in (PAH/CMPEI)$_n$ films may be sufficient for high-capacity protein capture.

Figure 11:
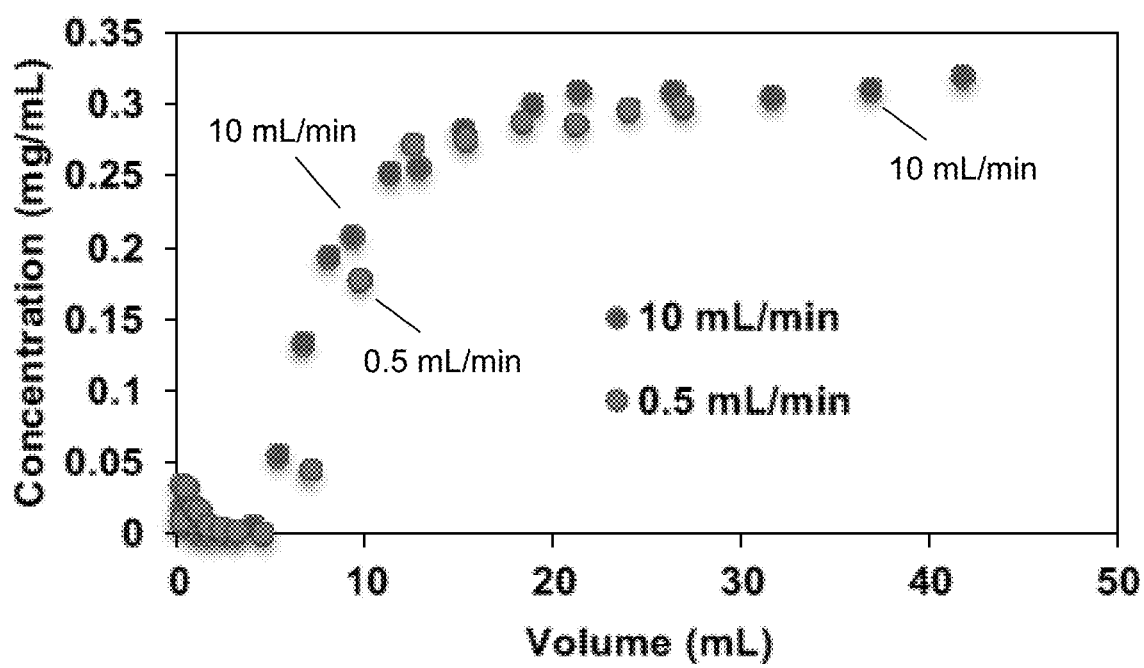
FIG. 11 is a graph illustrating breakthrough curves for lysozyme capture in (PAH/CMPEI)-modified membranes (2.0-cm diameter) at flow rates of 0.5 mL/min (10 cm/h; bottom curve with lighter symbols) and 10 mL/min (200 cm/h; top curve with darker symbols). Polyelectrolytes were deposited at pH 2 from solutions containing 0.5 M NaCl.

Lysozyme binding in (PAH/CMPEI)-modified membranes as a function of flow rate: Capture rates are important when purifying sensitive proteins or when processing purification large volume of dilute samples. To assess mass-transport limitations on binding, the capture of lysozyme at two different flow rates was examined. The —COOH groups in (PAH/CMPEI) can serve as cation-exchange sites for rapid adsorption of lysozyme (pI ~11), so binding kinetics likely will not limit the capture rate. FIG. 11 shows breakthrough curves for lysozyme capture in PAH/CMPEI-modified CM nylon membranes using linear flow rates of both 10 cm/h and 200 cm/h. The breakthrough curves are similar even with the 20-fold greater flow rate. As with previous membranes, this suggests that the shape of the breakthrough curve reflects a distribution of pore sizes in the membrane, and not mass transport of kinetic limitations. Breakthrough will occur faster in large pores due to relative high flow rates and low surface areas. Equilibrium binding capacities were similar for the two flow rates (67±8 mg/mL at a 0.5 mL/min and 61±3 mg/mL at 10 mL/min).

The small non-zero concentration at the beginning of the breakthrough curve is likely due to a small amount of polymer that leaches from the membrane and interferes with the Bradford assay.

Figure 12:
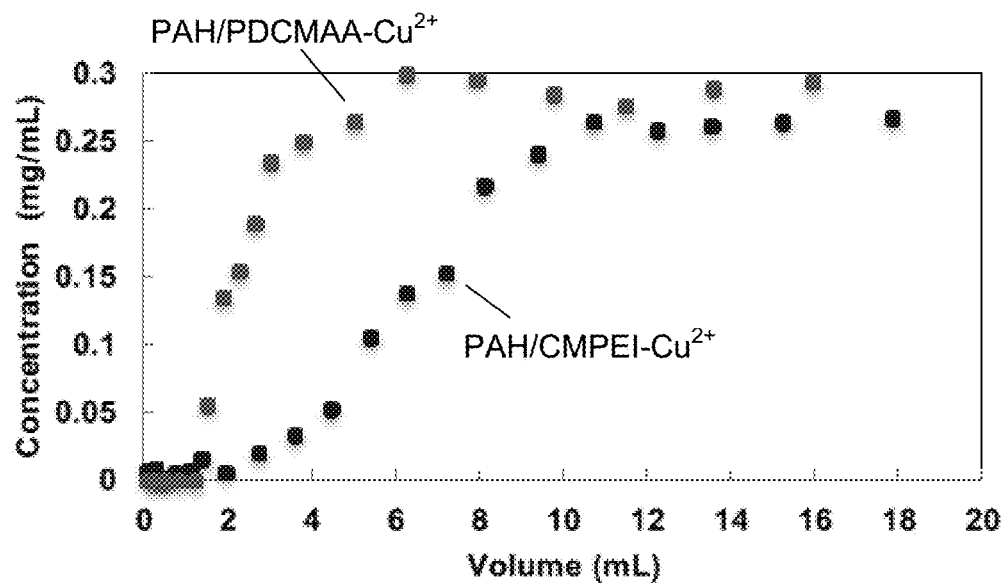
FIG. 12 is a graph illustrating breakthrough curves of Con A capture in CM nylon membranes (2.0-cm diameter) modified with PAH/CMPEI (darker symbols) and PAH/PDC-MAA (lighter symbols) (diameter 2.0 cm). Both films were deposited at pH 2 with 0.5 M NaCl. The feed Con A concentration was 0.3 mg/mL, and the flow rate was 10 cm/h.

Con A Binding to Membranes Modified with PAH/PDCMAA-$Cu^{2+}$ and PAH/CMPEI-$Cu^{2+}$ films: Due to the high cost of his-tagged proteins, Con A binding to $Cu^{2+}$ complexes was first used to evaluate the protein-binding capacity of membranes containing PAH/CMPEI and PAH/PDCMAA films. FIG. 12 shows the breakthrough curves for Con A binding to CM nylon membranes modified with PAH/CMPEI-$Cu^{2+}$ and PAH/PDCMAA-$Cu^{2+}$ films. Even though both films show similar $Cu^{2+}$ binding, the total Con A binding to the membrane with PAH/CMPEI-$Cu^{2+}$ is 59 ±5 mg/mL, whereas the membrane with PAH/PDCMAA-$Cu^{2+}$ captures just 30 ±5 mg/mL. Binding capacities determined from Con A elution with 50 mM EDTA are similar to those from the breakthrough curves. The higher binding capacity with PAH/CMPEI-$Cu^{2+}$ than PAH/PDCMAA-$Cu^{2+}$ is consistent with the trends in Con A binding capacities of PEM films on gold-coating Si wafers (FIGS. 7 and 8), but the amount of binding in the PAH/CMPEI-$Cu^{2+}$-modified membrane is higher than expected based on the amount captured in the film on the Au wafer (assuming a membrane pore size of 1.2 μm and 50% porosity). This suggests a higher film thickness or swelling in the membrane compared to the wafer.

Figure 14:
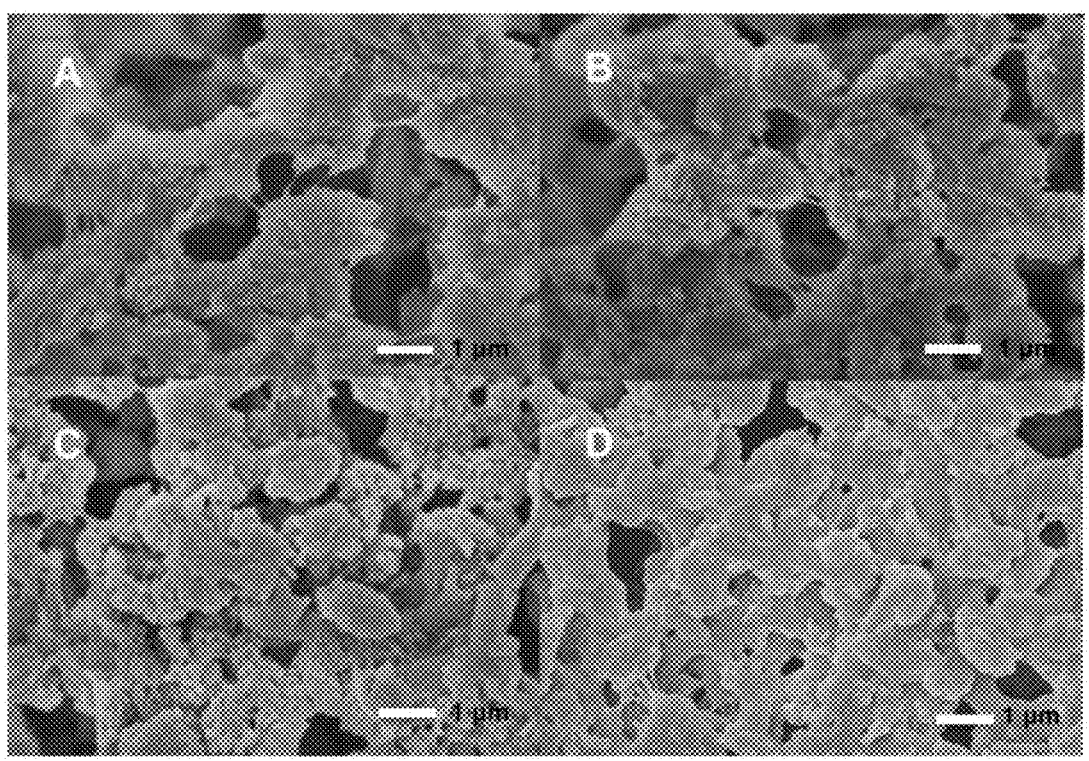
FIG. 14 includes SEM images of (A) nylon, (B) carboxymethylated nylon, (C) PAH/CMPEI-$Cu^{2+}$-modified carboxymethylated nylon and (D) $(PAH/CMPEI)_2$—$Cu^{2+}$-modified nylon membranes.

Con A binding in (PAH/CMPEI)$_2$—$Cu^{2+}$-modified CM nylon also was tested. Based on breakthrough curves, the Con A binding capacity in these membranes is 39±5 mg/mL, or less than in membranes with PAH/CMPEI—$Cu^{2+}$ films. The unexpected decrease in binding compared to a film with a single bilayer might reflect decreased swelling with more bilayers or limited access to some small pores after coating the spongy membrane structure (see FIG. 14) with two bilayers.

Figure 15:
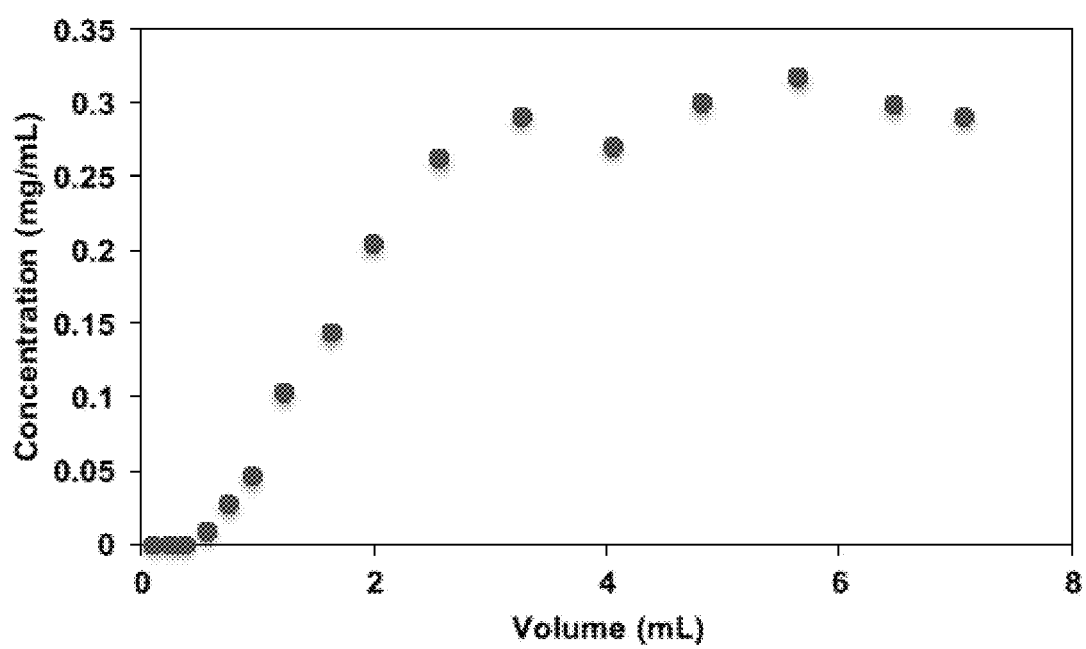
FIG. 15 is a graph illustrating the breakthrough curve for his-tagged ubiquitin capture in a (PAH/CMPEI)-modified membrane. The flow rate was 10 cm/h, and the membrane had a diameter of 1.0 cm. The his-tagged ubiquitin binding capacity is 60±6 mg/mL.

Capture of his-tagged protein using Membranes containing PAH/CMPEI-$Ni^{2+}$ films: Because it showed the highest binding capacity for Con A, the binding capacity for his-tagged ubiquitin using a CM nylon membrane modified with a PAH—CMPEI film was measured. However, in this case, the $Ni^{2+}$ complex was used, which is necessary for selective capture of his-tagged protein. Based on both the breakthrough curve and the amount of protein eluted from the membrane, the binding capacity is 60±6 mg/mL (FIG. 15). Even though the his-U binding to the (PAH/CMPEI)-modified membrane is about ⅔ of what was obtained using polymer brush- or (PAA/PEI/PAA)-NTA-$Ni^{2+}$-modified membranes (~90 mg/mL membrane), this new strategy avoids the challenge of growing polymer brushes or expensive functionalization of PAA/PEI/PAA with NTA.

Figure 16:
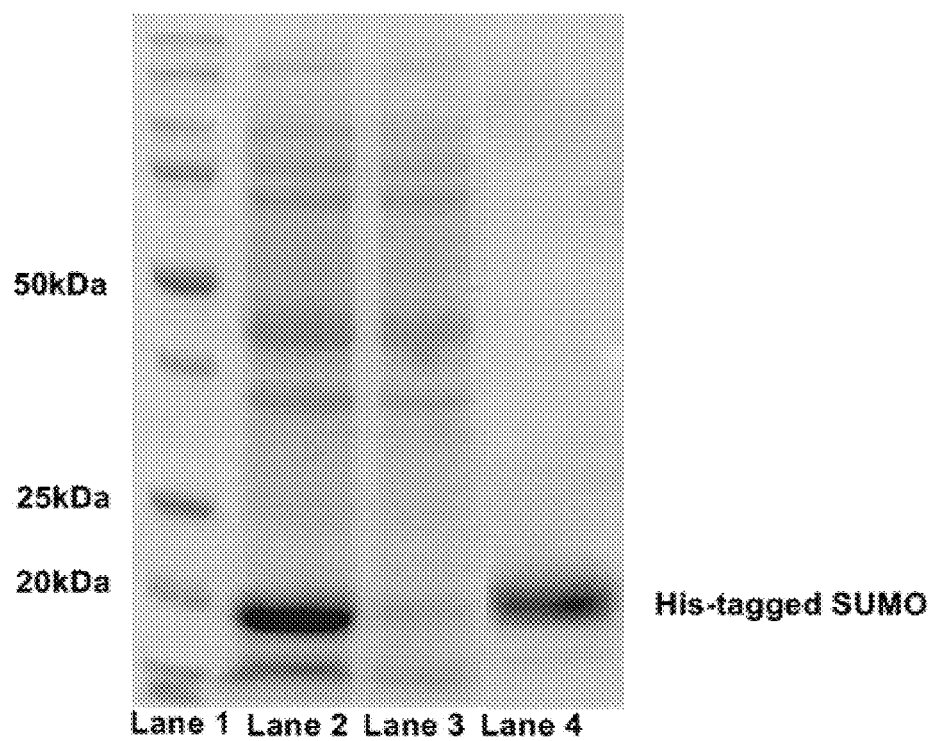
FIG. 16 is an SDS-PAGE analysis of purification of overexpressed his-tagged SUMO protein from an E. coli. lysate. Lane 1: molecular marker; Lane 2: cell lysate containing his-tagged SUMO protein; Lane 3: the effluent from loading the membrane; Lane 4: the eluate of the loaded membrane.

To demonstrate that membranes can isolate his-tagged protein directly from cell extracts, his-tagged SUMO protein that was over-expressed in *E. coli.* was purified. FIG. 16 shows the SDS-PAGE analysis of a cell extract that contained his-tagged SUMO (lane 2), the effluent of the loading solution (lane 3), and the eluate (lane 4) from the membrane loaded with the cell extract containing his-tagged SUMO protein. Notably, the effluent of the loading solution contains minimal his-tagged SUMO protein, and the only detectable band from the eluate stems from the his-tagged SUMO protein. Thus the membranes are highly selective for his-tagged protein.

Film stability: The stability of CMPEI-containing films both on wafers and in membranes was evaluated. For (PAH/CMPEI)$_2$ films on gold-coated Si wafers (deposited at pH 2 in 0.5 M NaCl) immersion for 20 h in binding buffer 2 (pH 7.4) led to only a 10% decrease in thickness, most of which occurred in the first 4 h (see FIG. S13). Absorbances in reflectance IR spectroscopy also decreased about 10%, suggesting that the change in thickness results from loss of film and not simply deswelling or a change in conformation.

Membranes offer a high surface area for film formation, so even a small amount of polyelectrolyte leaching might affect a Bradford assay. Using TOC analysis, the amount of the polyelectrolyte film lost during passage of binding buffer 2 (pH 7.4) through a membrane immediately after forming a (PAH/CMPEI) film and rinsing with only water was determined. The first 20 mL of washing buffer contained around 4 ppm of polymer (assuming that the leaching was only due to CMPEI and using 1-10 ppm CMPEI solutions as standards). Subsequent buffer washes contained<0.1 ppm of polymer. Additionally, wash solutions were added to the Bradford dye and tested the absorbance at 595 nm as in a typical Bradford assay. The first mL of washing solution gave an absorbance of 0.02, which is equivalent to the absorbance given by 0.03 mg/mL Con A. This absorbance rapidly declines and was only 0.002 after passing 20 mL of washing buffer through the membrane.

Figure 13:
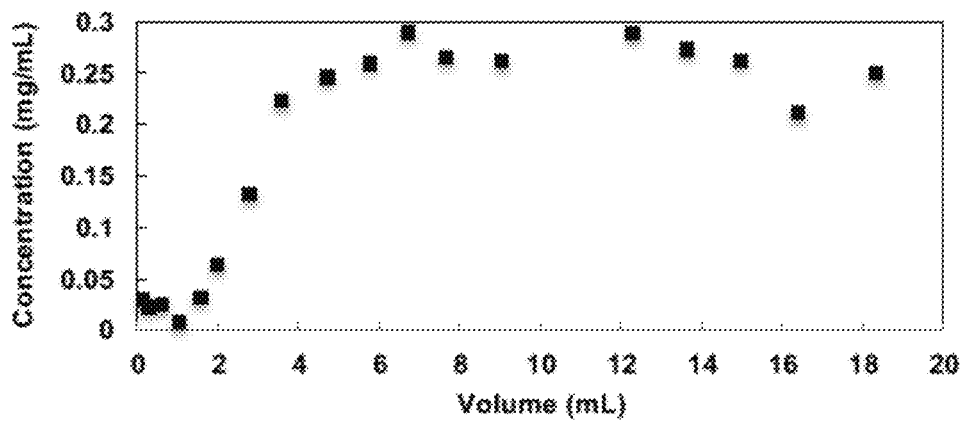
FIG. 13 is a graph illustrating the breakthrough curve for Con A capture in a $(PAH/CMPEI)_2$—$Cu^{2+}$-modified membrane (2.0-cm diameter). The film was deposited from a pH 2 solution containing 0.5 M NaCl. The feed Con A concentration was 0.3 mg/mL, and the flow rate was 10 cm/h.

In a typical protein-binding test, the membranes are washed with 40 mL of binding buffer prior to loading protein. However, breakthrough curves such as those in FIGS. 11 and 13 show a small and decreasing Bradford assay signal over the first 1-2 mL. This may indicate that protein replaces a small amount of polyelectrolyte, i.e., the initial loading solution might contain 5 ppm of polyelectrolyte after passing through the membrane. This was not observed in binding of His U.

As a further test of membrane stability, 5 cycles of loading and elution of Con A in (PAH/CMPEI)—Cu$^{2+}$-modified membrane were performed with Con A. Based on either breakthrough curves or elution, the Con A binding decreased by<20% over five cycles of loading and elution.

Metal Leaching: Low metal-ion leaching is sometimes important to avoid contaminating protein solutions. Thus, metal leaching was examined from a common commercial Ni$^{2+}$ column and several modified membranes. Membranes modified with one and two bilayers of PAH/CMPEI or PAH/PDCMAA (deposited at pH 2 in 0.5 M NaCl) were washed with 5 mL each (160 bed volumes) of binding buffer 2, washing buffer 1, and washing buffer 2, stripping buffer and 2% HNO$_3$. The GE HITRAP FF Ni column with 1-mL bed volume was washed with 160 bed volumes each of binding buffer 2 and washing buffers 1 and 2 and 15 mL of stripping buffer. All the solutions were analyzed by the atomic absorption spectroscopy.

Figure 17:
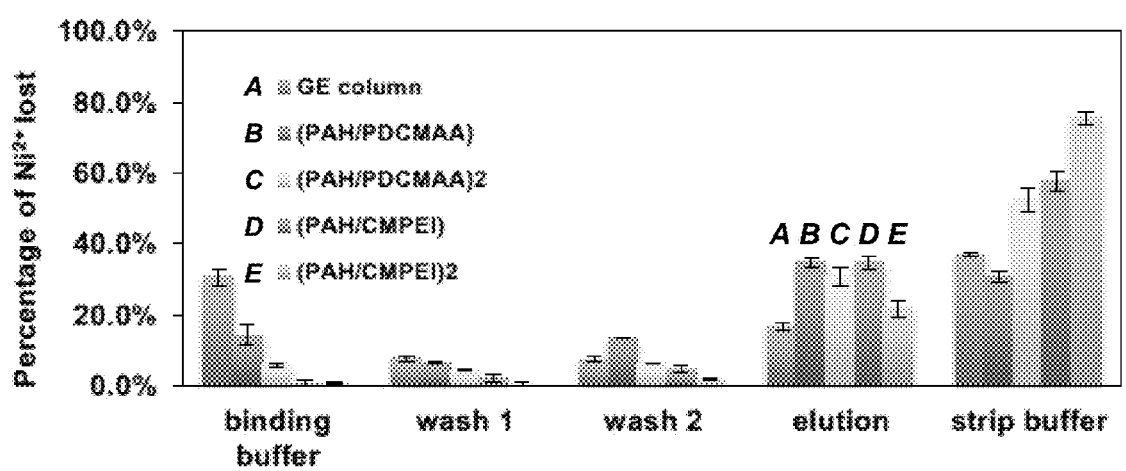
FIG. 17 is a graph illustrating $Ni^{2+}$ leaching from a GE HITRAP FF Ni column and CM nylon membranes modified with (PAH/PDCMAA), $(PAH/PDCMAA)_2$, (PAH/CMPEI) and $(PAH/CMPEI)_2$. All the substrates were washed with 160 bed volumes (each) of binding buffer 2, washing buffers 1 and 2, elution buffer, and stripping buffer. The experiment was repeated twice for all membrane substrates and three times for the column.

FIG. 17 shows the leaching from the GE HITRAP FF Ni column and different membranes as a percentage of the total Ni$^{2+}$ binding. The (PAH/CMPEI)- and (PAH/CMPEI)$_2$-modified membranes show the least leaching in the binding and washing buffers, and the amount of leaching in the elution buffer is within a factor of two for all systems, although the GE column shows the lowest leaching. The low leaching in the elution buffer for the GE column may partly reflect the high leaching in the binding buffer. For all systems, the higher leaching in the elution buffer (0.5 M imidazole) than in the washing buffers probably stems from the formation of imidazole-Ni$^{2+}$ complexes. Nevertheless, all the membrane substrates had less than 10 ppm Ni$^{2+}$ in the elution buffer except the membrane modified with (PAH/PDCMAA)2, which had 12.9±1.1 ppm Ni$^{2+}$. The values in FIG. 17 are percentages of the total Ni$^{2+}$ loaded and not concentrations. Overall, the metal leaching from all the substrates is similar.

Summary: This example illustrates a facile method, layer-by-layer adsorption of functional polyelectrolytes, to modify membranes with metal-ion complexes that selectively capture his-tagged proteins. PAH/CMPEI adsorption yields a membrane with a his-tagged ubiquitin binding capacity of 60±6 mg/mL, which is higher than related commercial affinity membranes and most commercial beads. Moreover, these (PAH/CMPEI)-modified membranes show less than 10 ppm of Ni$^{2+}$ in the elution buffer (0.5 M imidazole). Membranes and wafers modified with PAH/CMPEI show about twice the protein binding of corresponding substrates modified with PAH/PDCMAA, presumably because of more swelling with PAH/CMPEI. The his-tagged protein binding capacity of the (PAH/PEI)-modified membranes is only ⅔ of that of membranes modified through growth polymer brushes of layer-by-layer adsorption of PAA/PEI/PAA followed by derivatization. However, direct adsorption of PAH and CMPEI in membranes is much simpler and less expensive than previous membrane modification methods.

Example 2

Synthesis of PDCMAA

The following example describes the synthesis of poly-acid polymers having pendent metal binding ligands according to the disclosure.

Synthesis of poly[(N,N-dicarboxymethyl)allylamine]: Synthesis of poly[(N,N-dicarboxymethyl)allylamine](PDC-MAA) was carried out according to the procedure of Naka (1995) with slight modifications. Under a nitrogen (N$_2$) atmosphere, chloroacetic acid (6.69 g, 0.07 mol), NaOH (2.80 g, 0.07 mol) and 25 ml of water were added to a two-neck round-bottomed flask, and the mixture was stirred at 30° C. for 10 min. This solution was added drop-wise with stirring to an aqueous solution (100 mL) containing poly (allyamine hydrochloride) (PAH, Mn~5.8×10$^4$ Da, 1.0 g, 0.011 mol) at 50° C. The reaction mixture was kept at 50° C. for 1 h and then held at 90° C. for 2 h with occasional addition of 30% NaOH to maintain the pH at 10.0. The reaction mixture was stored at room temperature for 12 h, and then the pH was adjusted to 1 by adding concentrated HCl. The supernatant was decanted, the remaining precipitate was dissolved by addition of 30% NaOH, and the solution was again adjusted to pH 1.0 with concentrated HCl. This process was repeated 2 times, and the precipitate was filtered and dried in vacuo for 12 h. The procedure is illustrated in Scheme 2.1. The resulting white poly[(N,N-dicarboxymethyl)allylamine](PDCMAA) solid (70% yield) was characterized by $^1$H-NMR and FTIR spectroscopy. IR (KBr): 1631, 1735 and 1400 cm$^{-1}$; $^1$H-NMR 0.50-2.00 (br, s, 3H), 2.00-2.75 (br s, 2H), 2.80-3.50 and (br s, 4H).

Scheme 2.1: Synthesis of PDCMAA

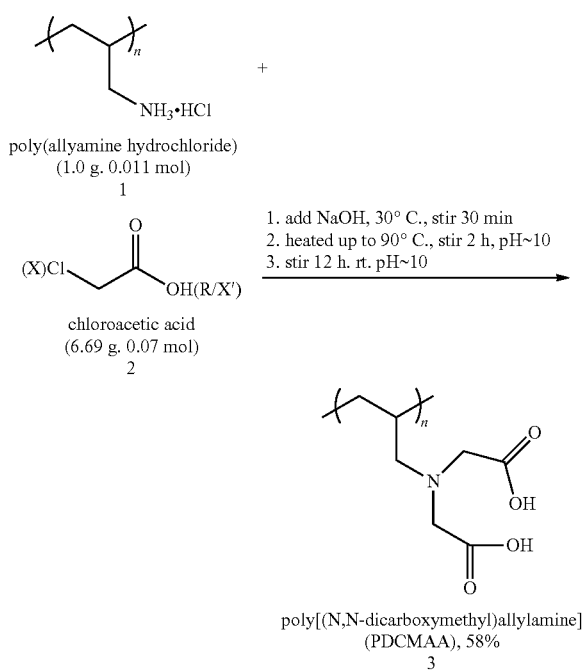

Example 3

Synthesis of CMPEI

The following example describes the synthesis of polyacid polymers having pendent metal binding ligands according to the disclosure, in particular those having backbone nitrogen atoms.

Synthesis of carboxymethylated polyethyleneimine (CMPEI): Synthesis of CMPEI was carried out according to the procedure described above and illustrated in Scheme 1.1. Under a nitrogen ($N_2$) atmosphere, sodium chloroacetate (20.0 g, 0.25 mol) and 25 ml of water were added to a two-neck round-bottomed flask, and the mixture was stirred at 30° C. for 10 min. This solution was added drop-wise with stirring to an aqueous solution (100 mL) containing poly(ethyleneimine) (PEI, $M_n$~6.0×10$^4$ Da, 5.0 g, 10.6 mmol) at 50° C. The reaction mixture was kept at 50° C. for 1 h and then held at 90° C. for 2 h with occasional addition of 30% NaOH to maintain the pH at 10.0. The reaction mixture was stored at room temperature for 12 h, and then the pH was adjusted to 1 by adding concentrated HCl. The supernatant was decanted, the remaining precipitate was dissolved by addition of 30% NaOH, and the solution was again adjusted to pH 1.0 with concentrated HCl. This process was repeated 3 times, and the precipitate was filtered and dried in vacuo for 12 h. The resulting white carboxymethylated polyethyleneimine (CMPEI) solid (63% yield) was characterized by FTIR spectroscopy IR (KBr): 1655 (COO$^-$) and 1733 (COOH) cm$^{-1}$; and Elemental analysis (%) calculated for $C_{42}H_{72}N_{10}O_{24}$: C, 45.82; H, 6.59; N, 12.72. Found: C, 40.26; H, 6.65; N, 11.93. The difference between the experimental and calculated elemental analysis stems from the presence of HCl salts in the actual structure.

Example 4

Synthesis of Poly(NTA)-Based Polyacid Copolymers

The following example describes the synthesis of polyacid polymers having pendent metal binding ligands according to the disclosure, in particular those having an ethylenic polymer backbone and pendent nitrilotriacetic free acid groups as metal binding ligands linked to the backbone via an amide group and copolymerized with other acidic comonomers.

Synthesis of 2,2'—((1-carboxy-4-methacrylamidobutyl)azanediyl)diacetic acid (NTA-MAm): 2,2'—((1-carboxy-4-methacrylamidobutyl)azanediyl)diacetic acid (NTA-MAm) was synthesized according to the procedure of Ehrbar (2008) with slight modifications. First, Na',Na-bis(carboxymethyl)-L-lysine (2.0 g, 7.2 mmol) was dissolved in a 0.4 M NaOH solution (50 ml) and cold the mixture to 0° C. using a ice bath. Then, ice-cold methacryloyl chloride (8.0 mmol, 0.90 ml) in 50 ml toluene was added to the abovementioned solution. Reaction was carried out at 0° C. to room temperature for 24 h. The reaction was monitored with $^1$HNMR and additional addition of methacryloyl chloride needed for completion of this reaction. Toluene was decanted and an aqueous layer was concentrated to get the final 2,2'-((1-carboxy-4-methacrylamidobutyl)azanediyl)diacetic acid with 1.8 g (Yield 76%). The procedure is illustrated in Scheme 4.1. The resulting compound was characterized using $^1$HNMR (D20, d ppm): 1.39 (m, 2H, $CH_2$), 1.47 (m, 2H, $CH_2$), 1.78 (s, 3H, CH3), 1.82-1.88 (m, 2H, CH2), 3.14 (t, 2H, $CH_2$), 4.0 (t, 2H, $CH_2$), 4.0 (s, 2H, 2×$CH_2$), 5.29 (s, 1H, CH=CCH3[trans]), 5.52 (d, 1H, CH=CCH3[cis]).

Scheme 4.1: Synthesis of NTA-MAm

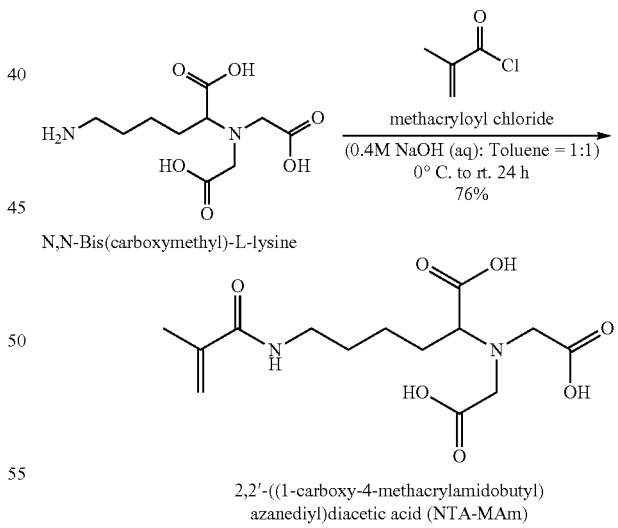

Synthesis of poly(NTA-MAm-co-AA): First, 2,2'-((1-carboxy-4-methacrylamidobutyl)azanediyl)diacetic acid (NTA-MAm) (0.15 mmol, 0.42 g) and acrylic acid (AA) (0.85 mmol, 0.62 g) were dissolved in 50 ml of 50 mM Tris/HCl buffer, previously adjusted to pH 8.5. Then, five freeze/thaw cycles were performed. Polymerization was initiated by the addition of 150 µl ammonium peroxodisulphate (10%, w/v) and 24 µl of N,N,N,N-tetramethylethylenediamine. Reaction was carried out for 48 h at room temperature. At the end, the solution pH was adjusted to a value of 1.0 by adding concentrated HCl to eliminate low-molecular-weight compounds such as residual acrylic acid. The supernatant was decanted, the remaining precipitate was dissolved by addition of 30% NaOH, and the solution was again adjusted to pH 1.0 with concentrated HCl. This process was repeated 2 times, and the precipitate was filtered and dried in vacuo for 12 h. The procedure is illustrated in Scheme 4.2. The resulting white poly(2,2'-((1-carboxy-4-methacrylamidobutyl)azanediyl)diacetic acid-co-acrylic acid) solid, 0.85 g (Yield 85%) was characterized using $^1$HNMR (D$_2$O, d ppm): 0.89 (br, 3H), 1.19-1.31 (br, 2H, CH2), 1.42 (br, 2H, CH2), 1.84 (br, 4H, 2×CH2), 1.90-1.98 (br, 2H, CH2), 2.10 (br, 1H, CH), 2.93 (br, 2H, CH2), 3.50 (br, 5H, 2×CH2 and CH), 7.87 (br, 1H, CONH).

adjusted to pH 8.5. Then, five freeze/thaw cycles were performed. Polymerization was initiated by the addition of 150 µl ammonium peroxodisulphate (10%, w/v) and 24 µl N,N,N,N-tetramethylethylenediamine. Reaction was carried out for 48 h at room temperature. At the end, the solution pH was adjusted to a value of 1.0 by adding concentrated HCl to eliminate low-molecular-weight compounds such as residual acrylic acid and acrylamide. The supernatant was decanted, the remaining precipitate was dissolved by addition of 30% NaOH, and the solution was again adjusted to pH 1.0 with concentrated HCl. This process was repeated 2 times, and the precipitate was filtered and dried in vacuo for 12 h. The procedure is illustrated in Scheme 4.3. The resulting white poly(2,2'—((1-carboxy-4-methacrylami- Scheme 4.2: Synthesis of poly(NTA-MAm-co-AA)

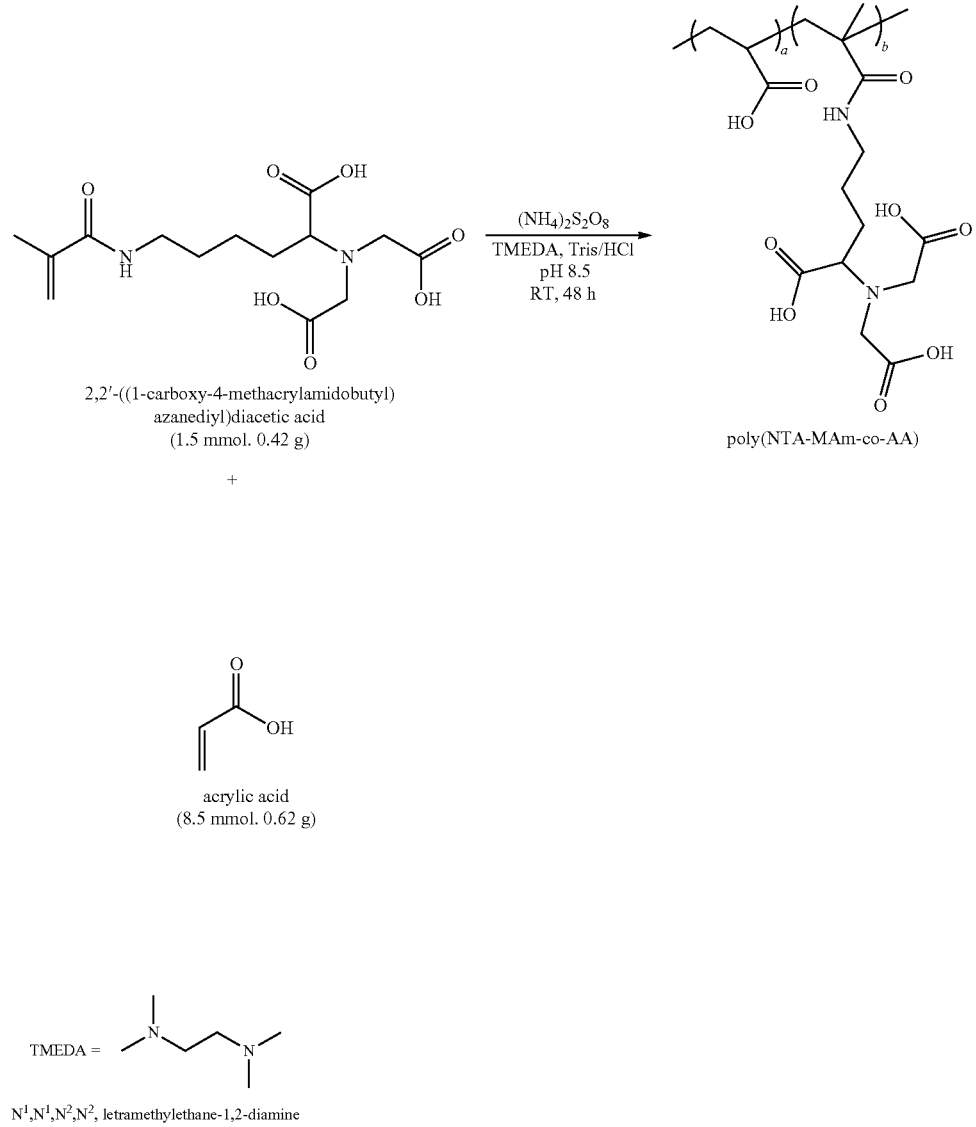

Synthesis of poly(NTA-MAm-co-AA-ACM): 2,2'-((1-carboxy-4-methacrylamidobutyl)azanediyl)diacetic acid (NTA-MAm) (0.15 mmol, 0.42 g), acrylic acid (0.65 mmol, 0.47 g), and acrylamide (2.0 mmol, 0.14 mmol) were dissolved in 50 ml of 50 mM Tris/HCl buffer, previously dobutyl)azanediyl)diacetic acid-co-acrylic acid, acrylamide) solid, 0.50 g (Yield 50%) was characterized using $^1$ HNMR (D2O, d ppm): 0.95 (br, 3H), 1.41 (br, 4H, 2× CH2), 1.59 (br, 6H, 3× CH2), 2.1 (br, 2H, 2× CH), 2.95 (br, 2H, CH2), 3.62 (br, 5H, 2× CH2 and CH).

Scheme 4.3: Synthesis of poly(NTA-MAm-co-AA-ACM)

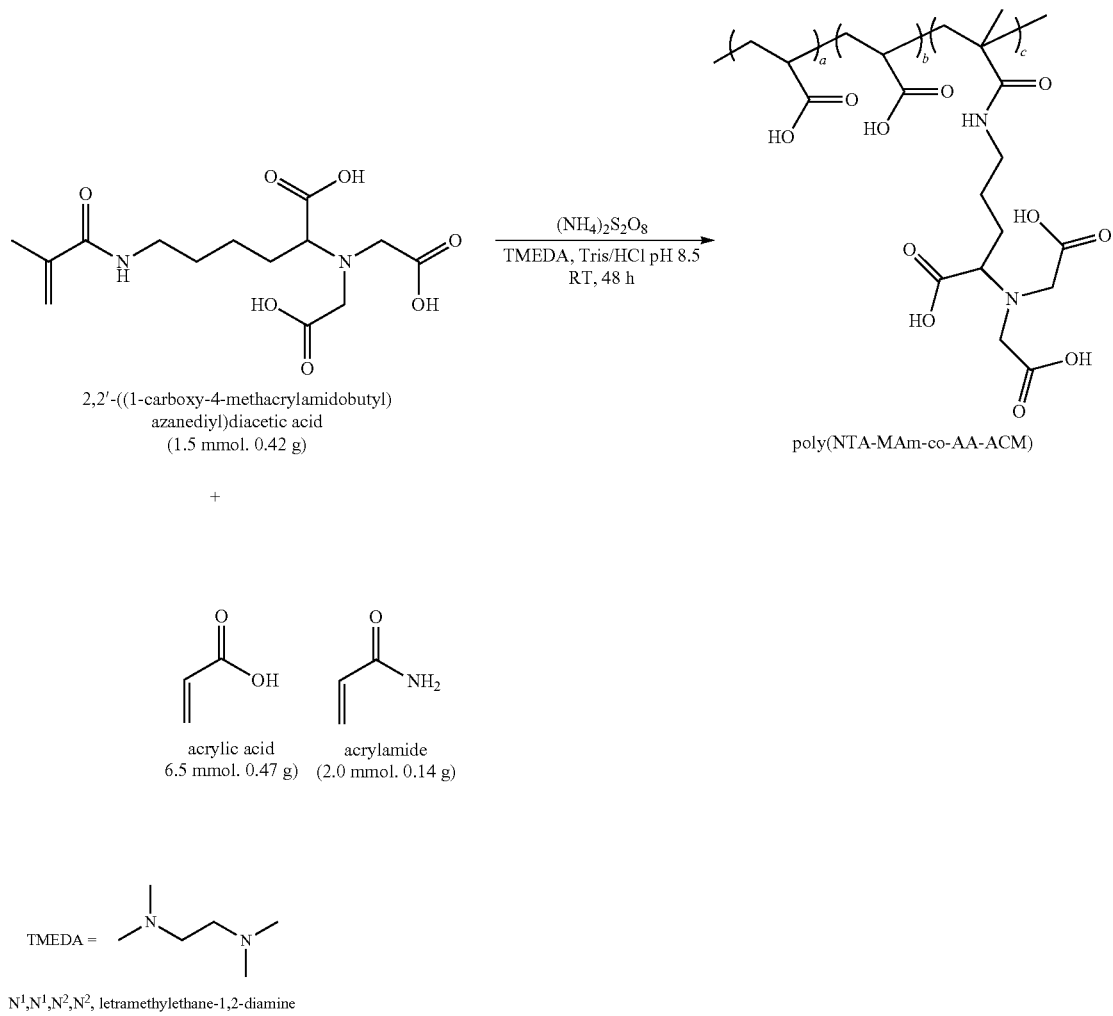

Example 5: Synthesis of Poly(NTA)-Based Polyacid Copolymers

The following example describes the synthesis of polyacid polymers having pendent metal binding ligands according to the disclosure, in particular those having an ethylenic polymer backbone and pendent nitrilotriacetic free acid groups as metal binding ligands linked to the backbone via an amide group and optionally copolymerized with other acidic comonomers.

ε-Acryloyl L-Lysine Copper Complex: L-Lysine hydrochloride (20 g, 109.5 mmol) was dissolved in water (250 ml) at 90° C. Basic cupric carbonate (13.3 g, 60.2 mmol) was added slowly to the solution and stirred for 10 min. After cooling and filtering the insoluble residue, 120 ml of acetone was added. After 55 ml of 2.0 M KOH aqueous solution were added into solution of the copper complex of the L-lysine, acryloyl chloride (1.38 ml, 17.1 mmol) and 7.7 ml of 2.0 M KOH aqueous solution were added every 5 min at 0° C. This procedure was repeated eight times. After stirring for 12 h at room temperature, the precipitates of the acrylamide cupric complex of the L-lysine were filtered and washed successively with water, methanol, and ether. The yield was 18 g (71%). This structure was confirmed by their IR spectra. IR (cm$^{-1}$): 3000-3500, nN-H (amide, amine); 2890-2900, nC-H; 1660, C=O (amide I); 1630, N—H (amide II); Elemental analysis (%) calculated for $C_{18}$ $H_{30}$ $N_4$ $O_6$ Cu: C, 46.80; H, 6.55; N, 12.13. Found: C, 45.82; H, 6.76; N, 12.03.

ε-Acryloyl L-Lysine (LysAm): The solid of ε-Acryloyl L-Lysine Copper Complex (5.0 g, 11 mmol) was dispersed in water (100 ml), and a chloroform solution (100 ml) of 8-hydroxyquinolinol (2.0 g, 13.6 mmol) was added. After stirring the solution for 12 h in a Erlenmeyer flask, a green precipitate in the chloroform layer was removed by filtration. Then, the chloroform layer was discarded, and three washing cycles with chloroform (50 ml×3) were performed to remove traces of 8-hydroxyquinoline. The water layer was concentrated to 50 ml and a white-color ε-Acryloyl L-Lysine was precipitated upon addition of tetrahydrofuran. The procedure is illustrated in Scheme 5.1. The yield was 4.1 g (93%). This structure was confirmed by $^1$ HNMR ($D_2O$, d.ppm): 1.43 (m, 2H, $CH_2$), 1.61 (m, 2H, $CH_2$), 1.84 (m, 2H, $CH_2$), 3.25 (t, 2H, $CH_2$), 3.75 (t, 2H, $CH_2$), 5.70 (d, 1H, $CH_2$=CH[trans]), 6.19 (d, 1H, $CH_2$=CH[cis]), 6.21 (dd, 1H, $CH_2$=CH).

Scheme 5.1: Synthesis of ε-acryloyl L-lysine

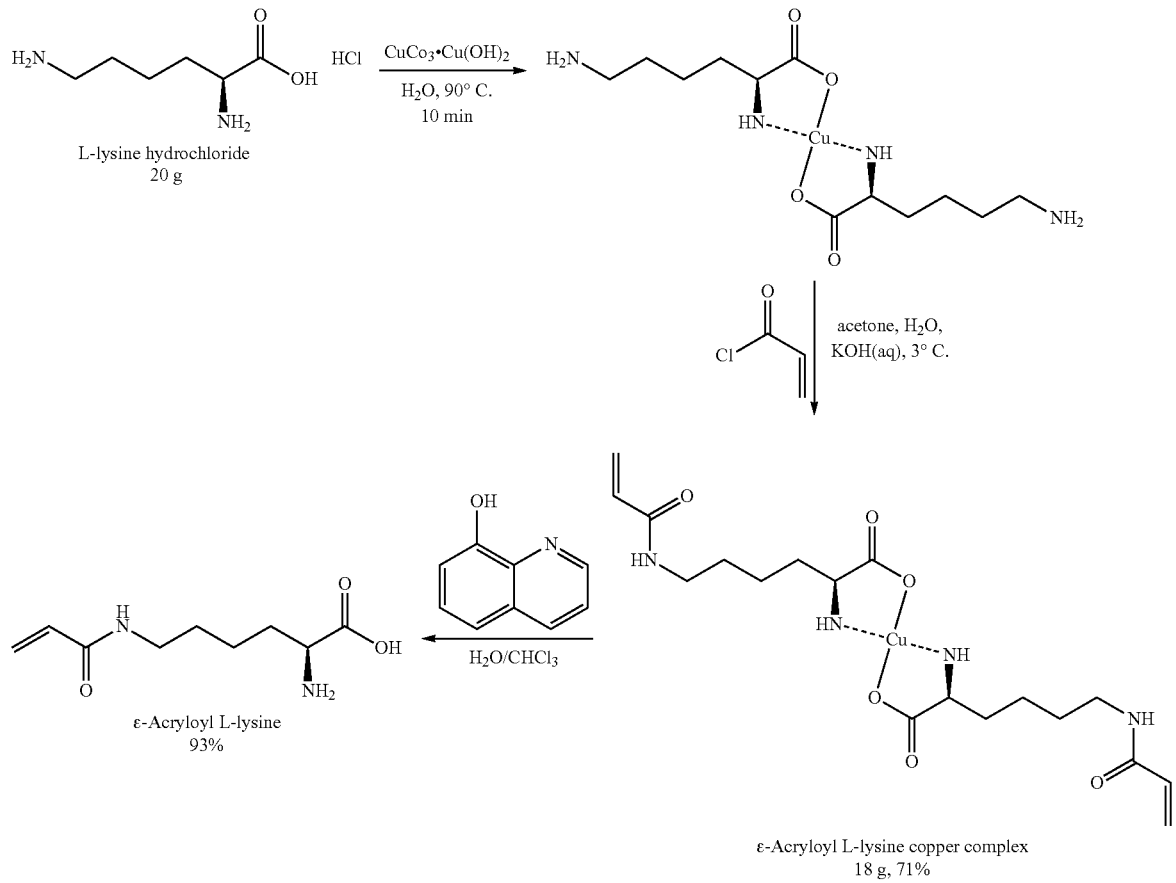

Synthesis of Poly(ε-acryloyl-L-lysine): The initiator 4,4-azobis-4-cyano valeric acid (12.5 mg, 45×10⁻³ mmol=0.4 mol % with respect to monomer) was dissolved in water (40 mL) and added to the monomer (2.5 g, 0.0125 mmol). Then, the reaction mixture was stirred at room temperature and the pH was adjusted to a value of about 6 to 7. Then, the resulting mixture was degassed by five freeze-pump cycles and subsequently polymerized at 75° C. for 24 h. The reaction was monitored using HNMR and, at 100% conversion, the polymer was precipitated using tetrahydrofuran and acetone. The procedure is illustrated in Scheme 5.2 and generally follows the procedure of Weller (2013). After vacuum-drying, a colorless solid was obtained and yield was 2.5 g (100%). This structure was confirmed by $^1$HNMR (D$_2$O, d ppm): 1.26-1.30 (br, 2H, CH2), 1.35-139 (br, 2H, CH2), 1.54 (br, 2H, CH2), 1.76 (br, 2H, CH2), 1.99 (br, 1H, CH), 2.99 (br, 2H, CH2), 3.71 (bm, 1H, CH), 7.88 (br, 1H, CONH).

Scheme 5.2: Synthesis of poly(ε-acryloyl-L-lysine)

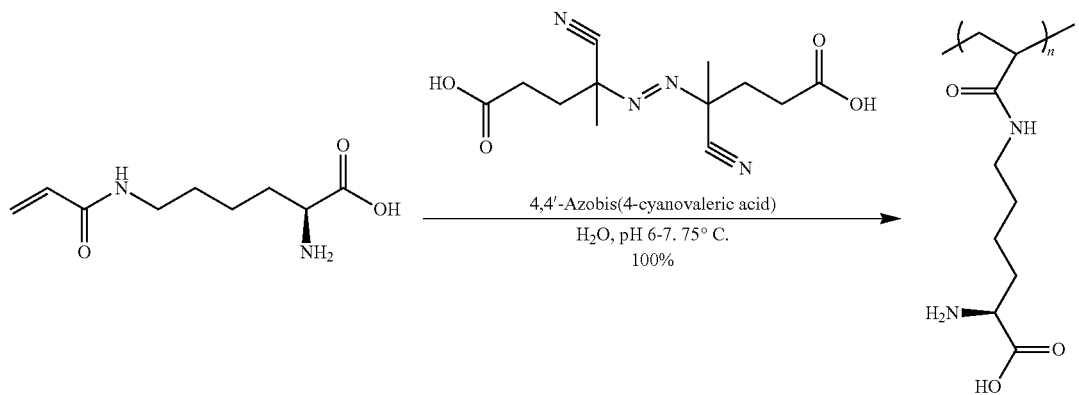

Synthesis of poly(2,2-(5-acrylamido-1-carboxypentylazanediyl) diacetic acid), poly(NTA-Am-100): Under a nitrogen (N$_2$) atmosphere, bromoacetic acid (12.5 g, 0.09 mol), NaOH (3.5 g, 0.09 mol) and 50 ml of water were added to a two-neck round-bottomed flask, and the mixture was stirred at room temperature for 10 min. This solution was added drop-wise with stirring to an aqueous solution (100 mL) containing poly(ε-acryloyl-L-lysine) (2.5 g, 0.0125 mol) at 50° C. The reaction mixture was kept at 50° C. for 24 h with occasional addition of 30% NaOH to maintain the pH at 10.0. Then the pH was adjusted to a value of 1.0 by adding concentrated HCl. The supernatant was decanted, the remaining precipitate was dissolved by addition of 30% NaOH, and the solution was again adjusted to pH 1.0 with concentrated HCl. This process was repeated 2 times, and the precipitate was filtered and dried in vacuo for 12 h. The procedure is illustrated in Scheme 5.3. The resulting white poly(2,2-(5-acrylamido-1-carboxypentylazanediyl) diacetic acid) solid, 2.8 g (70% yield, degree of functionalization is 81%). This structure was confirmed by $^1$HNMR (D$_2$O, d ppm): 1.33 (bm, 2H, CH2), 1.43 (br, 2H, CH2), 1.53 (br, 2H, CH2), 1.78 (br, 2H, CH2), 2.0 (br, 1H, CH), 3.0 (br, 2H, CH2), 3.49 (br, 1H, CH), 3.59 (br, 4H, 2×CH2), 7.86 (br, 1H, CONH).

Scheme 5.3: Synthesis of poly(2,2-(5-acrylamido-1-carboxypentylazanediyl) diacetic acid)

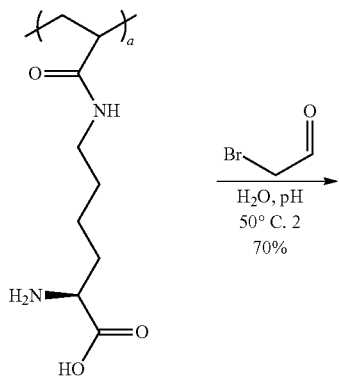

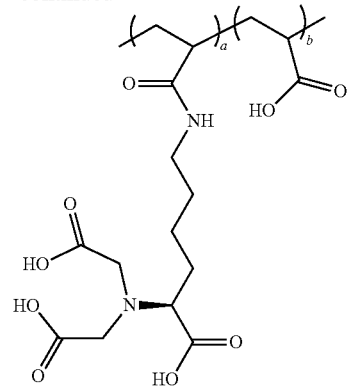

Synthesis of Poly(ε-acryloyl-L-lysine-co-acrylic acid), poly(Lys-50-co-AA-50): As described above, the initiator 4,4-azobis-4-cyano valeric acid (12.5 mg, 45×10$^{-3}$ mmol=0.4 mol % with respect to monomer) was dissolved in water (40 mL) and added to the monomers, ε-Acryloyl L-Lysine (1.25 g, 0.00625 mmol) and acrylic acid (0.44 g, 0.00625 mmol) (i.e., a 50:50 molar monomer ratio of Lys:AA). Then, the reaction mixture was stirred at room temperature for 10 min and the pH was adjusted to a value of about 6 to 7. Then, the mixture was degassed by five freeze-pump cycles and subsequently polymerized at 75° C. for 24 h. The reaction was monitored using HNMR. The polymer was precipitated using tetrahydrofuran and acetone. The procedure is illustrated in Scheme 5.4. After vacuum drying a colorless solid was obtained and yield was 1.38 g (82%, Only 77% of lysines are incorporated in to the polymer). This structure was confirmed by $^1$HNMR (D$_2$O, d ppm): 1.28 (br, 2H, CH2), 1.40 (br, 2H, CH2), 1.47-1.71 (br, 4H, 2×CH2), 1.76 (br, 2H, CH2), 1.90 (br, 2H, 2×CH), 2.44 (NH2), 2.99 (br, 2H, CH2), 3.41-3.48 (m, 1H, CH—NH2), 3.59 (br, 1H, CH—NH3+), 7.82 (br, 1H, CONH).

Scheme 5.4: Synthesis of poly(ε-acryloyo-L-lysine-co-acrylic acid)

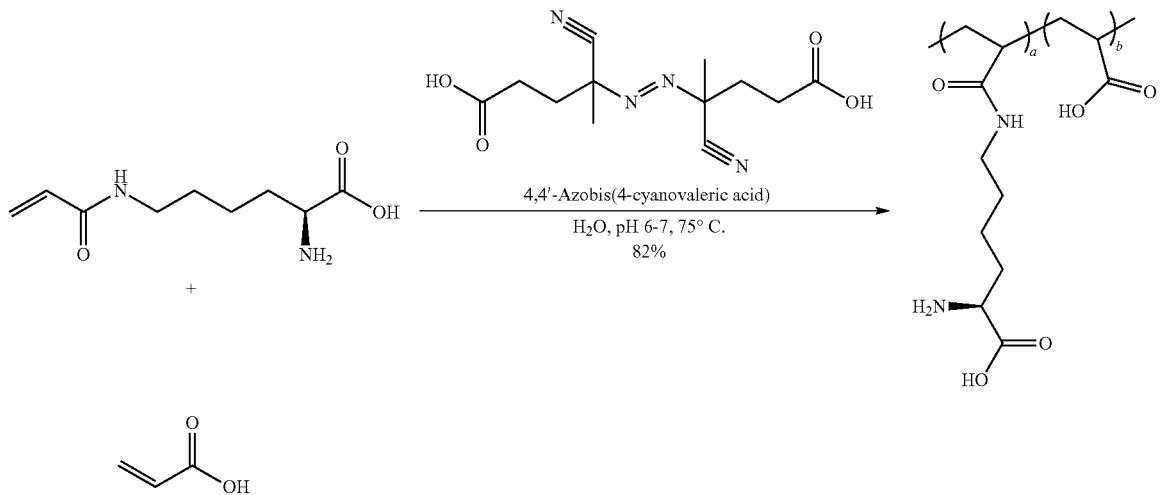

Synthesis of Poly(2,2-(5-acrylamido-1-carboxypentylazanediyl) diacetic acid-co-acrylic acid), poly(NTA-Am-50-co-AA-50): Under a nitrogen (N$_2$) atmosphere, bromoacetic acid (4.7 g, 0.034 mol), NaOH (1.35 g, 0.034 mol), and 50 ml of water were added to a two-neck round-bottomed flask, and the mixture was stirred at room temperature for 10 min. This solution was added drop-wise with stirring to an aqueous solution (50 mL) containing poly(Lys-50-co-AA-50) (1.38 g, 0.0048 mol of lysine repeating units) at 50° C. The reaction mixture was kept at 50° C. for 24 h with occasional addition of 30% NaOH to maintain the pH at 10.0. Then the pH was adjusted to a value of 1.0 by adding concentrated HCl. The supernatant was decanted, the remaining precipitate was dissolved by addition of 30% NaOH, and the solution was again adjusted to pH 1.0 with concentrated HCl. This process was repeated 2 times, and the precipitate was filtered and dried in vacuo for 12 h. The procedure is illustrated in Scheme 5.5. The resulting was white poly(2,2-(5-acrylamido-1-carboxypentylazanediyl) diacetic acid-co-acrylic acid) solid, 0.80 g (degree of functionalization is 87%). This structure was confirmed by $^1$HNMR (D$_2$O, d ppm): 1.31 (br, 2H, CH2), 1.41 (br, 2H, CH2), 1.53 (br, 4H, 2× CH2), 1.67-1.75 (br, 2H, CH2), 1.87-1.96 (br, 2H, 2×CH), 2.99 (br, 2H, CH2), 3.58 (br, 5H, 2×CH2 and CH), 7.85 (br, 1H, CONH).

Scheme 5.5: Synthesis of Poly(2,2-(5-acrylamido-1-carboxypentylazanediyl) diacetic acid-co-acrylic acid)

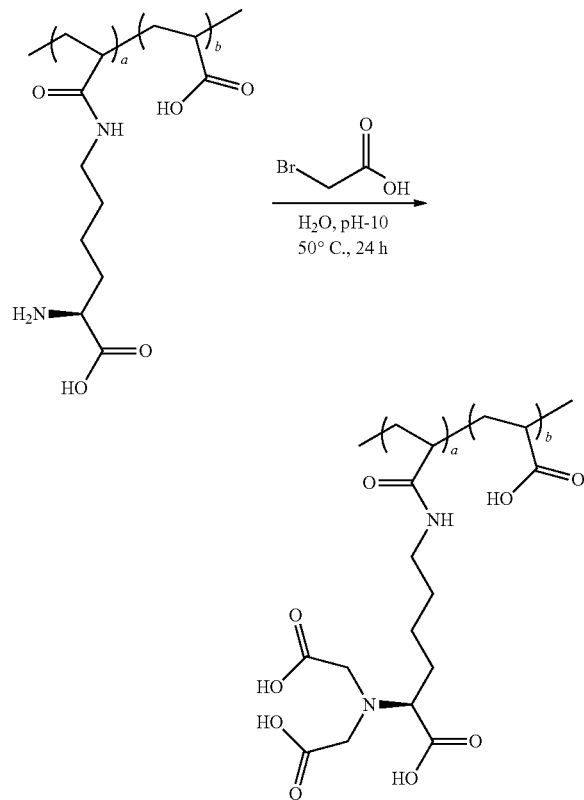

Synthesis of Poly(ε-acryloyl-L-lysine-co-acrylic acid), poly(Lys-25-co-AA-75): As described above, the initiator 4,4-azobis-4-cyano valeric acid (18.9 mg, 45×0$^{-3}$ mmol=0.4 mol % with respect to monomer) was dissolved in water (40 mL) and added to the monomers, ε-Acryloyl L-Lysine (0.945 g, 0.0047 mmol) and acrylic acid (1.0 g, 0.0142 mmol) (i.e., a 25:75 molar monomer ratio of Lys:AA). Then, the reaction mixture was stirred at room temperature for 10 min and pH was adjusted to a value of about 6 to 7. Then the mixture was degassed by five freeze-pump cycles and subsequently polymerized at 75° C. for 24 h. The reaction was monitored using HNMR. At the end, the polymer was precipitated using tetrahydrofuran and acetone. After vacuum drying a colorless solid was obtained and yield was 1.12 g (60%, Only 70% of lysines are incorporated in to the polymer). This structure was confirmed by$^1$ HNMR (D$_2$O, d ppm): 1.29 (br, 2H, CH2), 1.40 (br, 2H, CH2), 1.47-1.70 (br, 4H, 2×CH2), 1.71-1.78 (br, 2H, CH2), 1.96 (br, 2H, 2×CH), 2.45 (NH2), 3.02 (br, 2H, CH2), 3.41-3.48 (m, 1H, CH—NH2), 3.60 (br, 1H, CH—NH3+), 7.81 (br, 1H, CONH).

Synthesis of Poly(2,2-(5-acrylamido-1-carboxypentylazanediyl) diacetic acid-co-acrylic acid), poly(NTA-Am-25-co-M-75): Under a nitrogen (N$_2$) atmosphere, bromoacetic acid (4.7 g, 0.034 mol), NaOH (1.35 g, 0.034 mol) and 50 ml of water were added to a two-neck round-bottomed flask, and the mixture was stirred at room temperature for 10 min. This solution was added drop-wise with stirring to an aqueous solution (50 mL) containing poly(Lys-25-co-AA-75) (1.12 g) at 50° C. The reaction mixture was kept at 50° C. for 24 h with occasional addition of 30% NaOH to maintain the pH at 10.0. Then the pH was adjusted to a value of 1.0 by adding concentrated HCl. The supernatant was decanted, the remaining precipitate was dissolved by addition of 30% NaOH, and the solution was again adjusted to pH 1.0 with concentrated HCl. This process was repeated 2 times, and the precipitate was filtered and dried in vacuo for 12 h. The resulting white poly(2,2-(5-acrylamido-1-carboxypentylazanediyl) diacetic acid-co-acrylic acid) solid, 1.46 g (degree of functionalization is 81%). This structure was confirmed by 1HNMR (D20, d ppm): 1.32 (br, 2H, CH2), 1.42 (br, 2H, CH2), 1.50-1.52 (br, 4H, 2×CH2), 1.67-1.73 (br, 2H, CH2), 1.90-1.97 (br, 2H, 2×CH), 3.0 (br, 2H, CH2), 3.55 (br, 5H, 2×CH2 and CH), 7.83 (br, 1H, CONH).

Example 6

Synthesis of Star Polyacid Polymers

The following example describes the synthesis of star polymers, in particular star polyacid polymers having free acid groups according to the disclosure.

Synthesis of four-armed star-poly(tert-butyl acrylate): Tert-butyl acrylate (tBA) (29 ml, 0.2 mol) and N,N,N',N',N''-pentamethyldiethylenetriamine (PMDETA) (0.05 ml, 0.25 mmol) were dissolved in acetone (10% v/v) in a 100 ml Schlenk flask and the solution mixture was degassed by five freeze-thaw cycles. After three freeze-thaw cycles, the mixture was frozen under an N$_2$ atmosphere, CuBr (36 mg, 0.25 mmol) and tetra (2-bromoisobutyryl) pentaerythritol (0.3 g, 0.5 mmol) were added, and the mixture was degassed by two freeze-thaw cycles. The mixture was stirred over 24 h at 60° C. The polymer was then precipitated using distilled water-methanol mixture, and the resulting white-color poly(tert-butyl acrylate) was dried in vacuo. The star-poly(tert-butyl acrylate) was characterized by $^1$HNMR, gel permeation chromatography (GPC). Molecular weight (M$_n$, GPC) and molecular weight distribution were also determined. Similar to this procedure, star polymers with 3 and 6 arms were synthesized.

Synthesis of four arms star-poly(acrylic acid) [Star-PAA-4]: Star-poly(tert-butyl acrylate) (2.3 g) was dissolved in 20 ml dichloromethane. To this reaction mixture, trifluoroacetic acid (10 g) was added carefully. After 24 h of reaction time, the precipitated star poly(acrylic acid) was recovered and freeze dried (2.0 g). This procedure is shown in Scheme 6.1 for a four-armed star polyacid polymers, and structures of analogous three- and six-armed polymers are also shown.

Scheme 6.1: Synthesis of star polyacid polymers

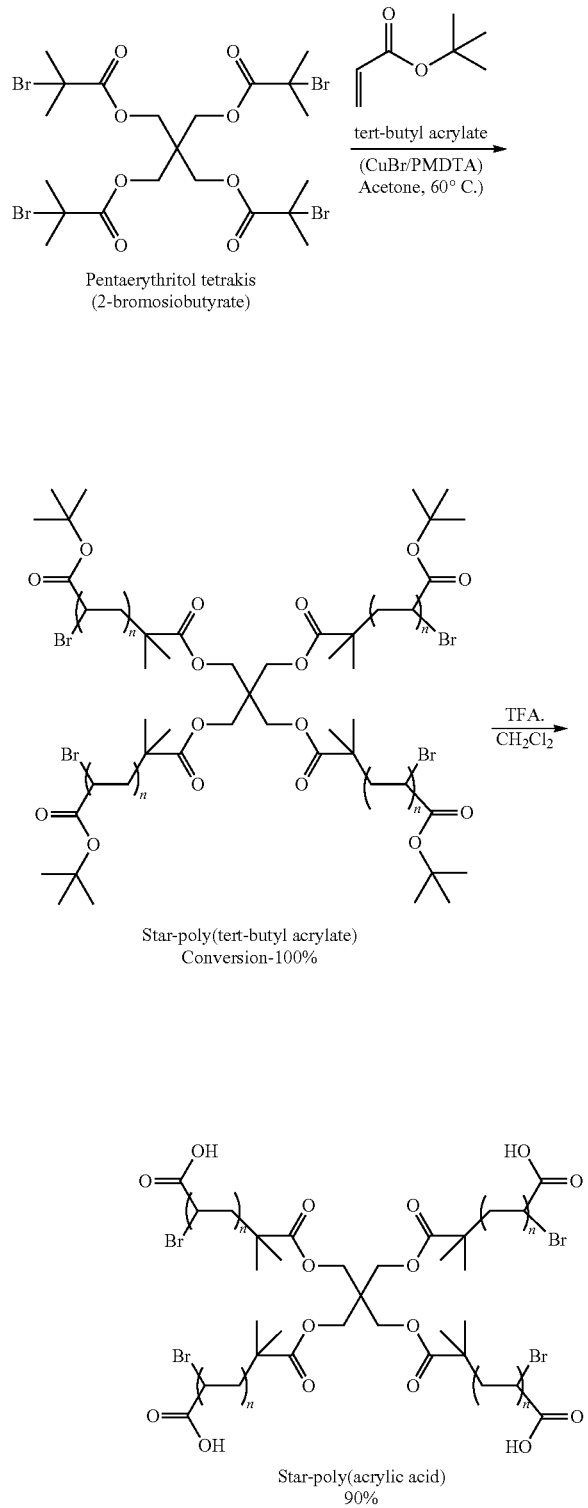

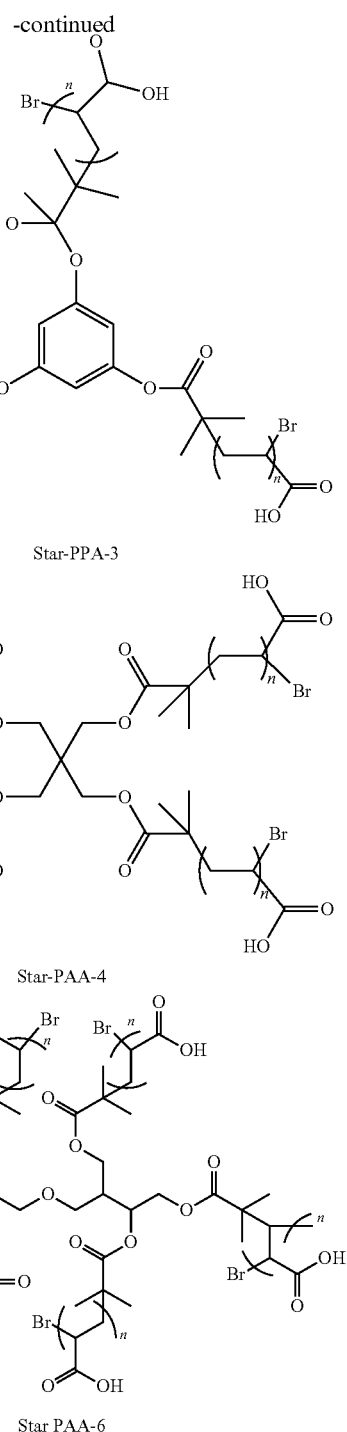

Synthesis of four arm star-poly(2-(dimethylamino)ethyl methacrylate) polycation [Star-(PDMAEMA-4)]: Similar to the previous procedure, N,N-dimethylaminoethyl methacrylate (DMAEMA) (25 ml, 0.15 mmol) and N,N,N',N",N"',N"'-hexamethyltriethylenetetraamine (HMTETA) (0.27 ml, 1.0 mmol) were dissolved in THF (10 ml) in a 100 ml Schlenk flask and the solution mixture was degassed by five freeze-thaw cycles. After three freeze-thaw cycles, mixture was frozen under an $N_2$ atmosphere, CuBr (72 mg, 0.5 mmol) and tetra (2-bromoisobutyryl) pentaerythritol (0.3 g, 0.5 mmol) were added and mixture was degassed by two freeze-thaw cycles. The mixture was stirred over 24 h at room temperature. The polymer was then precipitated using a heptane-ethylacetate mixture, and the resulting white-color star-poly(2-(dimethylamino)ethyl methacrylate) was dried in vacuo. The procedure is illustrated in Scheme 6.2. The star-poly(2-(dimethylamino)ethyl methacrylate) was characterized by $^1$HNMR, gel permeation chromatography (GPC). Molecular weight ($M_n$, GPC) and molecular weight distribution were also determined. Similar to this procedure, star polymers with 3 and 6 arms were synthesized.

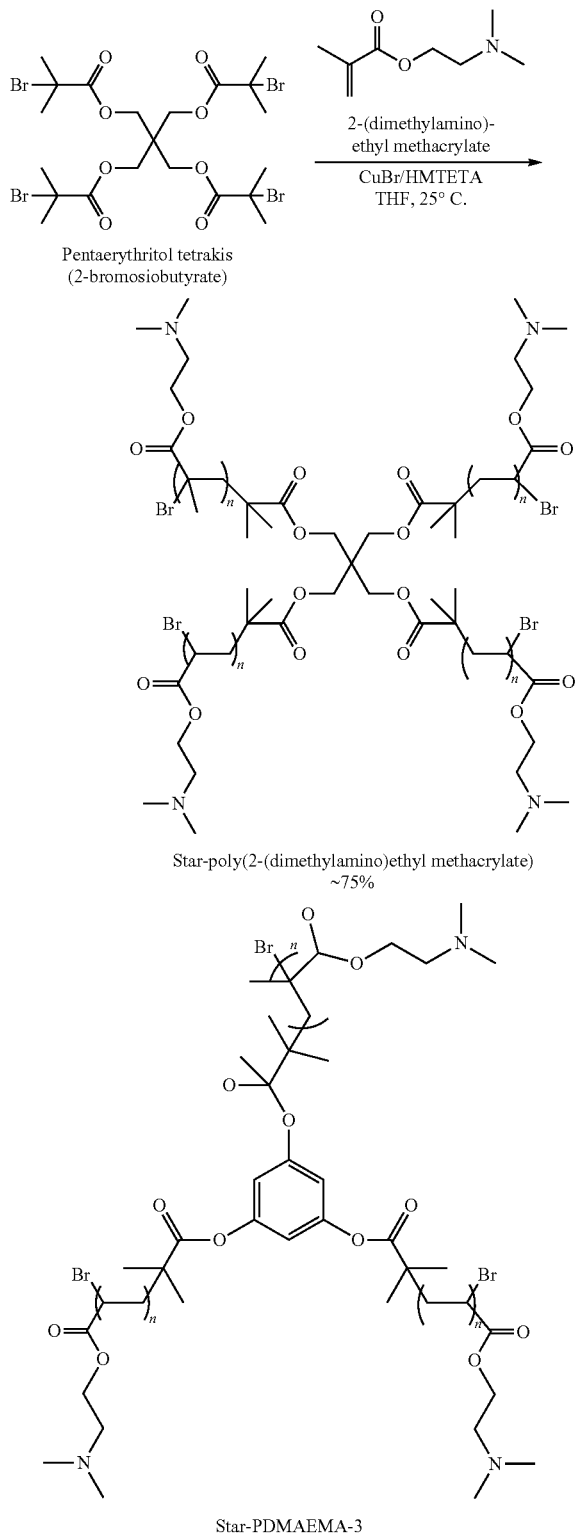

Scheme 6.2: Synthesis of star-poly(2-(dimethylamino)ethyl methacrylate)

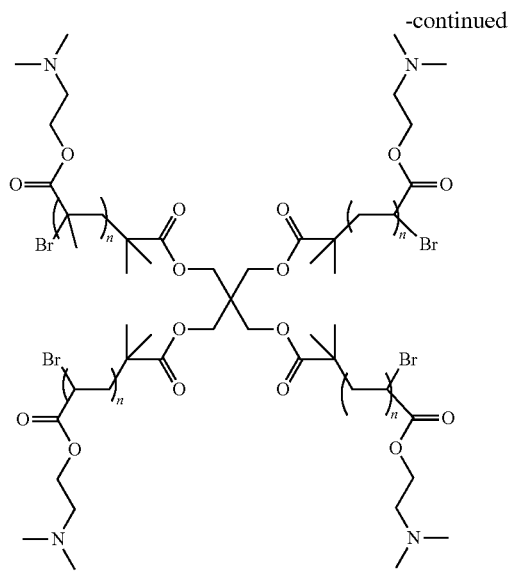

Star-PDMAEMA-4

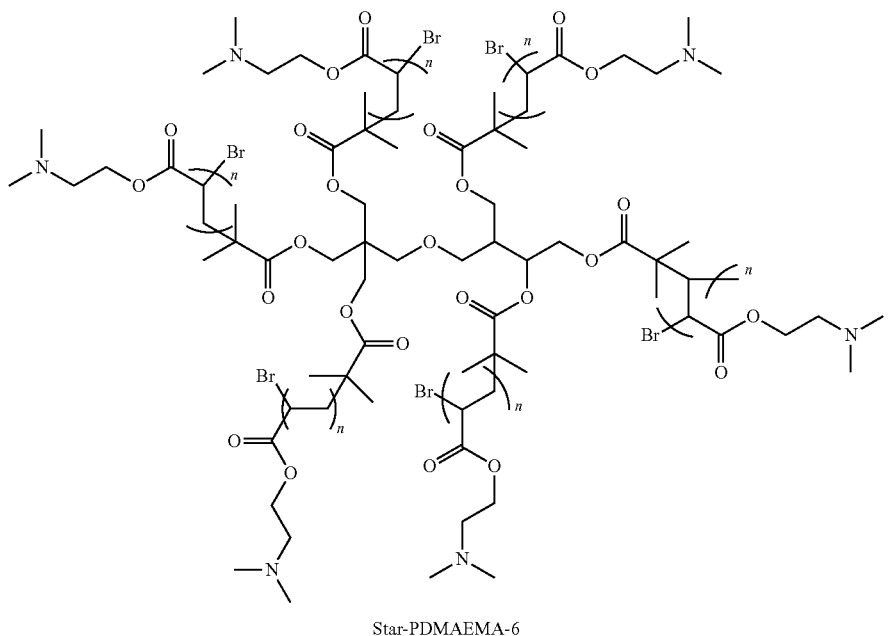

Star-PDMAEMA-6

Example 7: Synthesis of Polyethylene Oxide-Based Polyacid Polymers

The following example describes the synthesis of polyacid polymers having pendent metal binding ligands according to the disclosure, in particular those having a polyethylene oxide polymer backbone and pendent nitrilotriacetic free acid groups as metal binding ligands.

Synthesis of poly(epichlorohydrin) backbone: Synthesis of poly(epichlorohydrin) poly(EPCH) was carried out according to the procedure of Carlotti (2008) with some modifications (Scheme 7.1). First, dry epichlorohydrin (8.64 ml, 0.11 mol, [EPCH]=3M) was dissolved in dry Toluene (23 ml) in 200 ml Schlenk flask. To that reaction mixture initiator $NOct_4$ Br (0.17 g, 0.31 mmol) was added. The reaction was stirred under $N_2$ for 5 min and three freeze-thaw cycles were performed. Then reaction mixture was cooled with liquid nitrogen and catalyst i-$Bu_3Al$ (1.72 ml, 1.7 mmol) added using a syringe. Conversion was monitored using $^1$HNMR. At the end of the reaction, few drops of ethanol were added to quench the reaction. Toluene was removed by rotavap and resulted polymer was washed with 3% VN HCl in ethanol. Then the final product was dried under vacuum. The yield of resulted product was 9.0 g (88%). This product was characterized using $^1$HNMR ($CDCl_3$, d ppm), 3.58-3.67 (br, 1H), 3.69-3.79 (br, 4H).

Scheme 7.1: Synthesis of poly(epichlorohydrin)

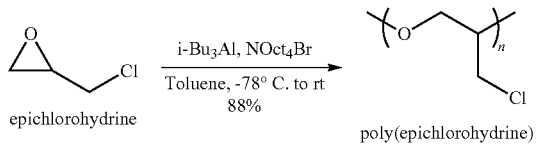

Synthesis of poly(epichlorohydrin-co-glycidyl methoxy-ethoxyethoxy-oxirane) backbone [poly(EPCH-co-GMEEO)]: Poly(EPCH-co-GMEEO) can be synthesized similarly to the procedure described above. Epichlorohydrin and 2-(2-(2-(2-methoxyethoxy)ethoxy)ethoxy)oxirane can be copolymerized under the condition shown in Scheme 7.2 to get the desired polymer backbone.

Scheme 7.2: Synthesis of poly(EPCH-co-GMEEO)

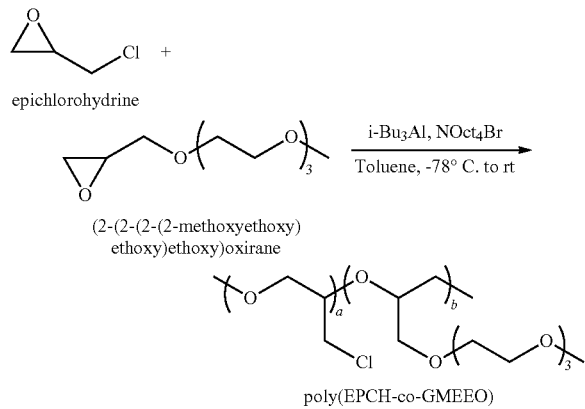

Synthesis of poly(glycidyl-N,N bis-(carboxymethyl)-L-Lysine) [poly(GNTA)]: Poly(GNTA) can be synthesized as shown the scheme by reacting poly(epichlorohydrin) with N,N bis-(carboxymethyl)-L-Lysine (Aminobutyl NTA) under basic condition (Scheme 7.3).

Scheme 7.3: Synthesis of poly(GNTA)

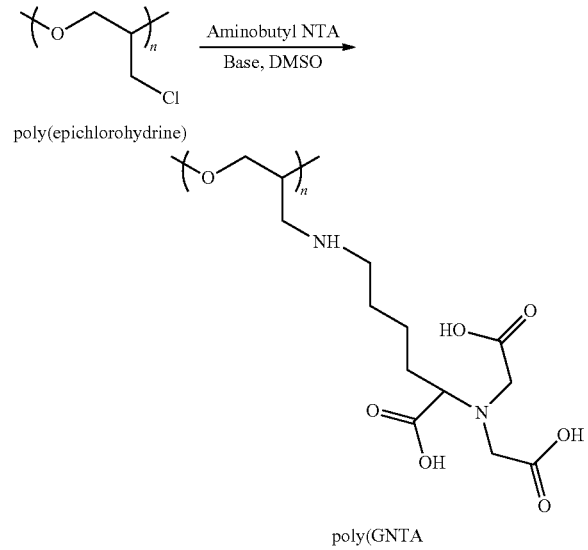

Synthesis poly(glycidyl amine) [poly(GAm)]: Poly(GAm) can be synthesized according to the procedure of Meyer (2011), which is essentially a two-step synthesis. First, poly(glycidyl azide) (poly(GAz)) is synthesized as shown in Scheme 7.4. The resulting poly(GAz) polymer is then reacted with triphenyl-phosphine and water to get the final product poly(GAm).

Scheme 7.4: Synthesis of poly(GAm)

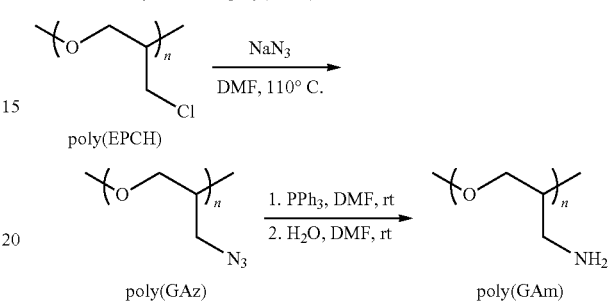

Synthesis of poly(glycidyl-N,N bis-(carboxymethyl)-L-Lysine-co-glycidyl methoxyethoxyethoxyoxirane) [poly(GNTA-co-GMEEO)]: Poly(GNTA-co-GMEEO) can be synthesized as shown Scheme 7.5 by reacting poly(EPCH-co-GMEEO) with RN bis-(carboxymethyl)-L-Lysine (Aminobutyl NTA) under basic conditions.

Scheme 7.5: Synthesis of poly(GNTA-co-GMEEO)

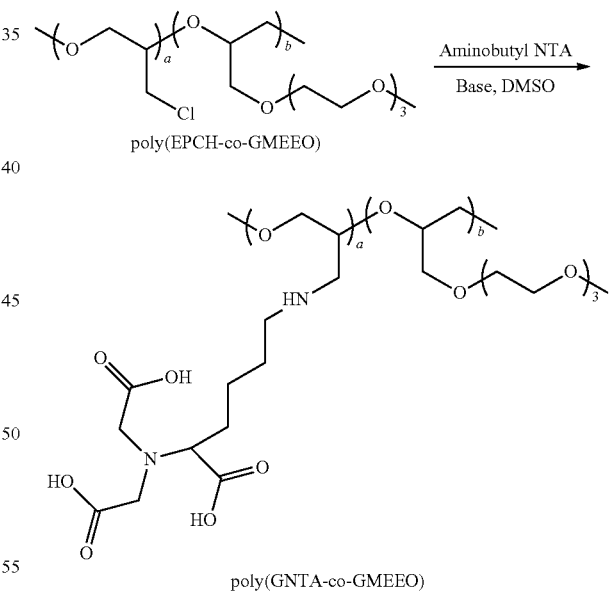

Synthesis of poly(glycidyl amine-co-glycidyl methoxyethoxyethoxyoxirane) [poly(GAm-co-GMEEO)]: Poly(GAm-co-GMEEO) can be synthesized similarly to the procedure described above. First, a corresponding azide intermediate can be synthesized by reacting poly(EPCH-co-GMEEO) and sodium azide under the conditions shown in Scheme 7.6. Then, the resulting poly(GAz-co-GMEEO) can be reacted under the conditions shown in the scheme to obtain the poly(GAm-co-GMEEO) product.

Scheme 7.6: Synthesis of poly(GAm-co-GMEEO)

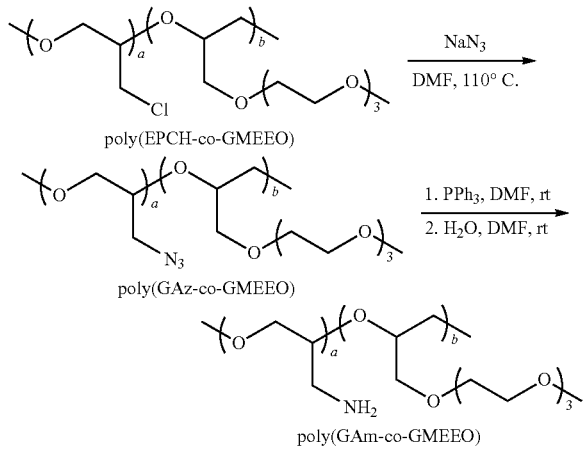

Example 8: PNTA-Functionalized Membranes

This example describes a convenient synthesis of nitrilotriacetate (NTA)-containing polymers and subsequent layer-by-layer adsorption of these polymers in membrane pores. The resulting films form NTA-metal-ion complexes isolate multilayers of polyhistidine-tagged proteins that bind to the metal-ion complexes. Moreover, adsorption of films in porous nylon membranes gives materials that capture 45 mg of His-tagged ubiquitin per cm$^3$. However, the binding capacity decreases with the protein molecular weight. Due to the high affinity of NTA for metal ions, these membranes show modest leaching of Ni$^{2+}$ in binding and rinsing buffers. Adsorption of NTA-containing polymers is a simple method to create metal- and protein-binding films and may facilitate development of disposable membranes that rapidly purify tagged proteins.

Figure 18:
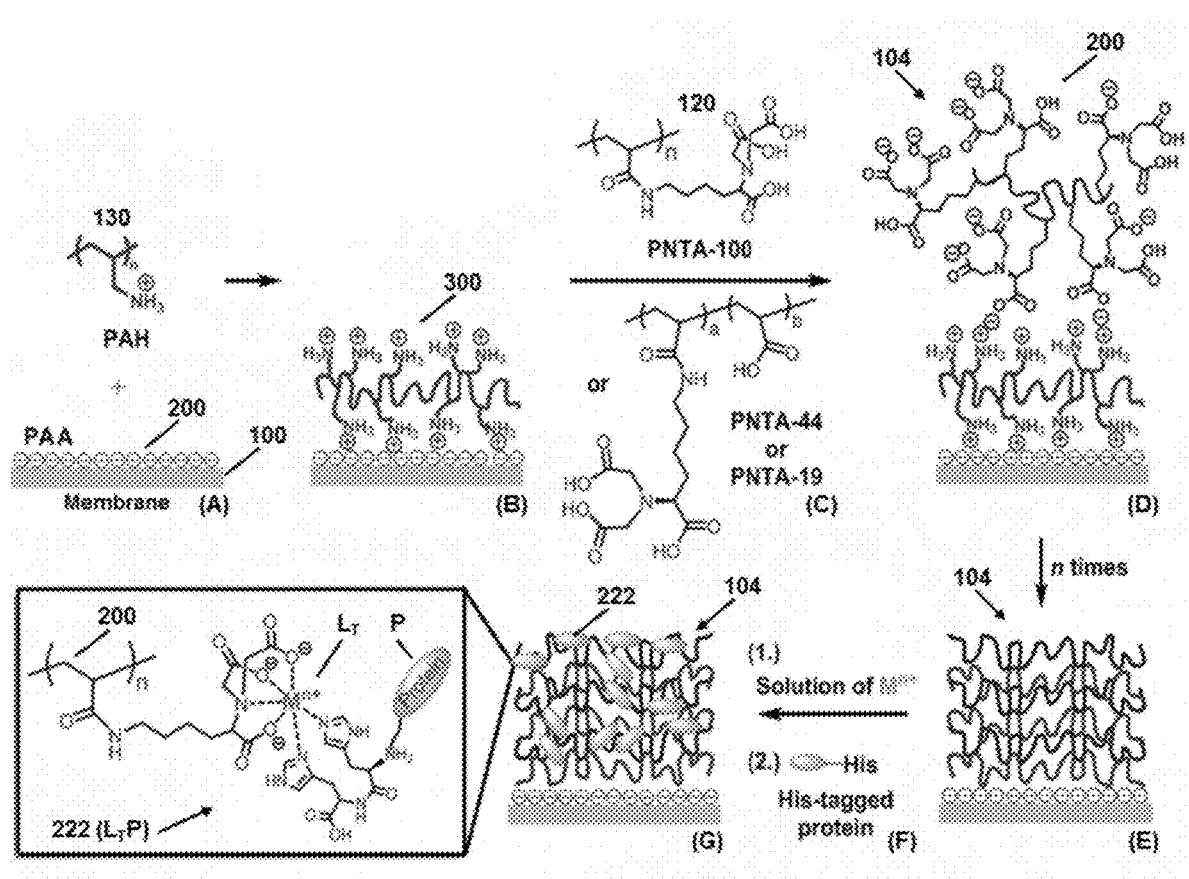
FIG. 18 is a schematic representation of the assembly of $(PAH/PNTA-X)_n$ films on membranes, and metal-ion and protein binding to these films.

Synthesis of poly(2,2-(5-acrylamido-1-carboxypentylazanediyl) diacetic acid) [PNTA-100 or PNTA], an NTA-containing polymer, and incorporation of this polymer into polyelectrolyte multilayers in functionalized porous membranes 104 to capture metal ions as well as proteins that bind to these immobilized ions is described (FIG. 18). Copolymers with both NTA ligands and acrylic acid polymer are examined to determine whether they promote swelling to increase protein binding to NTA-metal-ion complexes. Direct adsorption of NTA-containing polymers to construct protein-binding films is more convenient and should be less expensive than post-deposition functionalization of coatings by reaction with an NTA derivative. Membranes modified with LBL films containing PNTA-100 capture as much as 48 mg of His-tagged protein per mL of membrane, and coatings prepared with copolymers that contain acrylic acid bind multilayers of proteins despite a relatively low density of NTA groups.

Materials: Poly(allylamine hydrochloride) (PAH, M$_w$=120,000-210,000, Alfa-Aesar), branched polyethyleneimine (BPEI, M$_w$=25,000, Sigma-Aldrich), and poly(acrylic acid) (PAA, M$_w$=90,000, 25% aqueous solution, Polysciences) were employed for LBL deposition. Hydroxylated nylon membranes (LOPRODYNE LP, Pall, 1.2 µm pore size, 110 µm thick) were cut into 25 mm-diameter discs prior to use. Synthesis and characterization of PNTA-100, PNTA-44 and PNTA-19 are described below. N-(3-dimethylaminopropyl)-N'-ethylcarbodiimide hydrochloride (EDC), N-hydroxysuccinimide (NHS), N$_a$, N$_a$-bis(carboxymethyl)-L-lysine hydrate (aminobutyl NTA), 3-mercaptopropionic acid (MPA, 99%), L-lysine monohydrochloride (98%), acryloyl chloride (97%, contains<210 ppm MEHQ as stabilizer), copper(II) carbonate basic (95%), 8-hydroxyquinoline and bromoacetic acid (≥97%) were purchased from Sigma-Aldrich. Coomassie protein assay reagent (Thermo Scientific), Histidine$_6$-tagged ubiquitin (HisU, human recombinant, Enzo Life Sciences), and conconavalin A (Sigma-Aldrich, Con A) from Canavaliaensiformis (Jack bean) were used as received. Phenylalanine amminomutase (PaPAM) and L-threonine aldolase were prepared as described previously. Aqueous solutions containing 1 mg/mL of PAH or 1 mg/mL of PNTA-X were prepared in deionized water (18.2 MΩcm, Milli-Q). PNTA-containing solutions were obtained by first dissolving the polymer with the addition of 6 M NaOH to achieve a pH 9.0 solution and when desired adjusting the pH to 3.0 with 6 M HCl.

Membrane Modification with (PAH/PNTA-X)$_n$ Films: With reference to FIG. 18, hydroxylated nylon 6,6 membrane 100 discs were cleaned for 10 min with UV/ozone and placed in a homemade PTFE (TEFLON) holder (similar to an Amicon cell) connected to a peristaltic pump. The membrane holder exposes 3.1 cm$^2$ of external membrane 100 surface area. Subsequently, a 5-mL solution containing 0.5 M NaCl and 20 mM PAA was circulated through the membrane for 20 min at a flow rate of 1 mL/min to deposit a PAA layer 200 adsorbed on the membrane 100 pore substrate surface (FIG. 18, panel A). Additional polycation 130 (PAH) and polyanion 120 (PNTA-X) layers 300, 200 (respectively) were deposited similarly using 1 mg/mL solutions containing 0.5 M NaCl to form a functionalized membrane 104 (FIG. 18, panels B-D). Panel D of FIG. 18 illustrates a functionalized membrane 104 with a single PAH layer 300 and single PNTA-X layer 200. Repetition of the of the polycation 130 (PAH) and polyanion 120 (PNTA-X) deposition process (e.g., n times in total) forms a functionalized membrane 104 multiple alternating PAH layers 300 and PNTA-X layer 200 (FIG. 18, panel E; denoted as (PAH/PNTA-X)$_n$ in this example). After deposition of each polyelectrolyte, 20 mL of water was passed through the membrane at the same flow rate. The pH of PAA and PNTA solutions was 3, while the pH of the PAH solutions was adjusted to pH 3 or pH 9 with 1 M NaOH or 1 M HCl. To improve film stability during protein binding to membranes modified with PNTA-19, these films were crosslinked using a modified literature procedure. In this procedure, 0.007 mol of Ni$^{2+}$ (to protect NTA groups on the polymer chain) was added to 5-mL solutions of 1 mg/mL PNTA-19 in 0.5 M NaCl. Subsequently, membrane modification was carried out according to the protocol above, and aqueous 0.1 M EDC/NHS was circulated through the PAA/PAH/PNTA-19-Ni$^{2+}$-modified membrane for 2 h to form crosslinks between amines and carboxylic acids. Subsequent washing with ~pH 9 buffer solution was performed to hydrolyze unreacted NHS esters. The films were loaded with 0.1 M NiSO$_4$ (FIG. 18, panel F with Ni$^{2+}$ as the specific metal for M$^{n+}$) as described below and used for protein binding.

Figure 19:
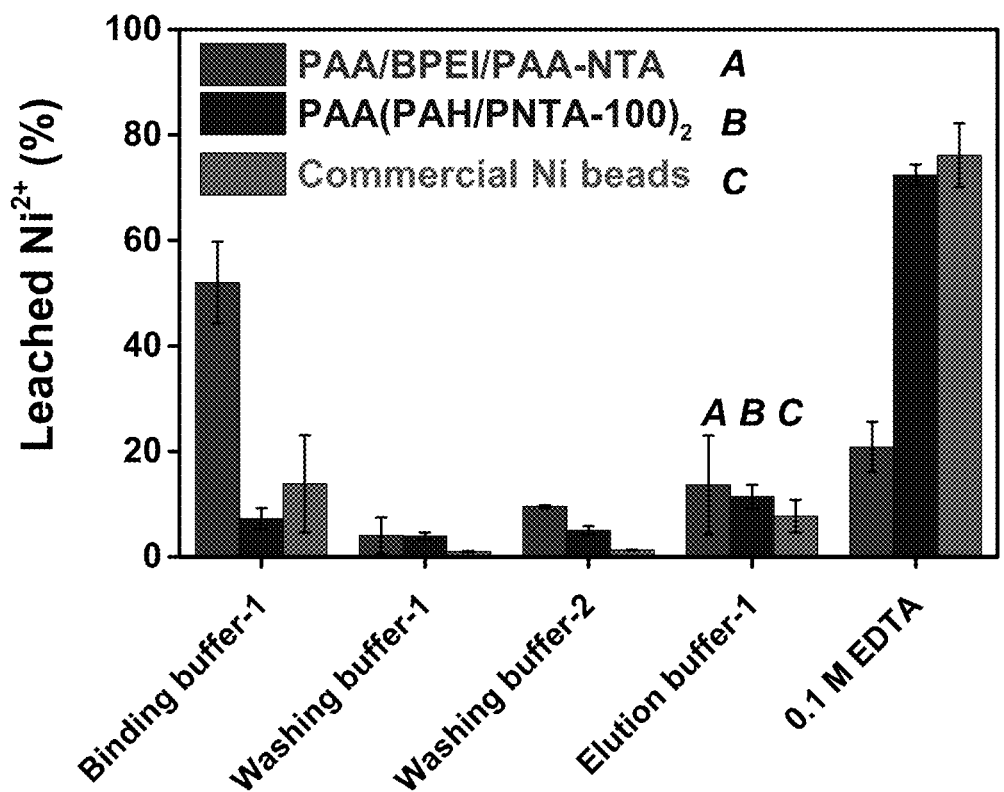
FIG. 19 illustrates the percentage of the bound $Ni^{2+}$ leached from PAA/BPEI/PAA-NTA- and $PAA(PAH/PNTA-100)_2$-modified membranes and HITRAP IMAC FF Ni beads when passing buffers sequentially through the membranes. The buffer compositions were: binding buffer 1-20 mM phosphate buffer with 0.3 M NaCl and 10 mM imidazole; washing buffer 1-20 mM phosphate buffer with 0.15 M NaCl and 0.1% TWEEN-20; washing buffer 2-20 mM phosphate buffer with 0.15 M NaCl and 45 mM imidazole; and elution buffer 1-20 mM phosphate buffer with 0.5 M NaCl and 0.3 M imidazole. Buffer volumes were 2.5 mL for membranes and 75 mL for beads (~75 bed volumes for both beads and membranes).

Metal-ion Binding and Leaching in (PAH/PNTA-X)$_n$-modified Membranes: After membrane modification with polyelectrolyte multilayers, 0.1 M CuSO$_4$ or NiSO$_4$ solutions were circulated through the membrane for 1 h, followed by a 20-mL water wash. The bound metal ions were eluted with two 5-mL aliquots of 0.1 M EDTA (pH 7.6) or 2% HNO$_3$, and the concentrations of metal ions in these solutions were determined using atomic absorption spectroscopy with calibration curves. Standard solutions contained 0 to 10 ppm metal ions in 0.1 M EDTA or in 2% $HNO_3$. The metal-ion binding capacity was calculated by dividing the mass of eluted metal ion by the volume of membrane, which is about 0.035 $cm^3$ (the membranes are 110 µm thick). A GE Healthcare HITRAP IMAC FF column was used as a comparison and loaded with $Ni^{2+}$ by passing 2 mL of 0.1 M $NiSO_4$ through the syringe column (flow rate of 1 mL/min) followed by 75 mL of deionized water. To study metal-ion leaching, $Cu^{2+}$ leaching values from membranes modified with (PAH/PNTA-100)$_2$ and PAA/BPEI/ PAA-NTA were compared. After $Cu^{2+}$ loading and rinsing with water, the membranes were washed sequentially with 2.5 mL (70-75 membrane bed volumes) of four different buffers (pH 7.4) and then 0.1 M EDTA. This protocol was also followed to determine the amount of $Ni^{2+}$ binding/ leaching in (PAH/PNTA-100)$_2$- or PAA/BPEI/PAA-NTA- modified membranes. For comparison, a GE Healthcare HITRAP IMAC FF column (1 mL) was washed with 75 bed volumes (75 mL) of the same buffers (FIG. 19).

His-tagged Protein Binding in Nylon Membranes: Functionalized membranes 104 with an exposed diameter of 1 cm were used for all protein-binding studies. Solutions for His-tagged protein P binding to $Ni^{2+}$-containing membranes 104 included 0.3 mg of protein P per mL in 20 mM phosphate buffer at pH 7.4. The membranes 104 were loaded with buffered protein P (FIG. 18, panel F) solution to form protein-bound ligand groups 222 ($L_T$P) in which the His- tagged protein P is bound to the $Ni^{2+}$ in the NTA ligand $L_T$ of the polyacid polymer 200 (FIG. 18, panel G). The protein-loaded membranes 104 were rinsed with 5 mL of 20 mM phosphate buffer with 0.15 M NaCl and 0.1% TWEEN- 20 followed by 5 mL of phosphate buffer at 7.4, bound protein was eluted in two 4 mL aliquots of elution buffer- 1-20 mM phosphate buffer with 0.5 M NaCl and 0.3 M imidazole. The concentrations of proteins in the feed, permeate and eluate solutions were determined using a Bradford assay (the protein of interest was used to prepare the calibration curve). The binding capacity was calculated from the amount of bound protein divided by the volume of the membrane.

Synthesis of Homo-polymer PNTA-100 and Co-polymers PNTA-44 and PNTA-19: This example includes a synthesis of a polymer that contains metal-ion-binding NTA groups. Other syntheses of NTA-containing polymers derivatize a polymer with aminobutyl NTA, which is expensive to purchase or prepare due to protection and deprotection steps. Schemes 5.1 and 5.2 above outline the synthesis of poly(2, 2-(5-acrylamido-1-carboxypentylazanediyl) diacetic acid) [PNTA-100]. The strategy includes a modified literature procedure to prepare ε-acryloyl L-lysine. The $Cu^{2+}$-protection strategy in this monomer synthesis bypasses the cumbersome protection/deprotection steps in other protocols. Also, the procedure avoids lengthy column purification. Subsequent initiation of free radical polymerization with 4,4'-azobis(4-cyanovaleric acid) yields the intermediate polymer, poly(ε-acryloyl L-lysine) [PLys-100], with 92% conversion, and the product $^1$H NMR spectrum is consistent with polymerization. Based on $^1$H NMR end-group analysis, the PLys-100 has an average degree of polymerization ($DP_n$) of 340, which is close to the monomer-to-initiator ratio of 280. Finally, carboxymethylation of PLys-100 using bromoacetic acid leads to PNTA-100 with 70% yield, and the $^1$H NMR spectrum of the product confirms the formation of the desired polymer. Integration of the spectrum signals suggests addition of 1.6 carboxymethyl groups per repeat unit of PLys-100, and elemental analysis implies slightly greater derivatization.

Relatively low aqueous swelling of (PAH/PNTA-100)$_n$ films containing bound metal ions may limit protein access to metal-ion complexes. Thus, to increase swelling, acrylic acid (AA) comonomers are incorporated into PNTA. Deprotonation of the AA repeat units after film formation should increase swelling in water to facilitate protein capture. The synthesis of these materials includes copolymerization of AA and ε-acryloyl L-lysine and reaction of the resulting polymers with 2-bromoacetic acid. Specifically, poly(NTA- co-AA) was prepared aiming to achieve polymers with 25% or 50% of the repeating units containing NTA ligands along with the corresponding 75% or 50% AA units, respectively. NMR analysis suggests that these polymers have about 19% and 44% NTA-containing units, respectively, so they are denoted as PNTA-19 and PNTA-44.

LBL Deposition of (PAH/PNTA-X)$_n$ Films: This example creates thin films that selectively bind metal ions and proteins and to tune the binding properties of these films through varying composition and deposition conditions. Alternating adsorption of PAH and PNTA-X is a simple technique for preparing films with metal-ion-binding groups, and because PAH and PNTA-X are weak polyelectrolytes, the deposition pH will affect the film thickness and structure. The pH of the polyelectrolyte solution controls the degree of protonation and hence the charge density of the polymer, which influences both the polymer conformation and the degree of ionic cross-linking in layer-by-layer films. In aqueous solutions, the $pK_a$ values of free NTA (analog of the metal-binding group in PNTA-100 repeating units) are around 9.7 for the ammonium group and below 3 for the —COOH groups. Titration of PNTA-100 with 0.1 M HCl shows the presence of fully protonated tertiary amines in the polymer below pH 9, whereas the three carboxylic acid groups protonate below pH 3. In addition, on going from pH 3.0 to 9.0, the fraction of protonated amines in PAH decreases from 96 to 30%.

LBL adsorption of (PAH/PNTA-100)$_5$ films at pH 3 yields a thickness of ~20 nm. Deposition at pH 9 also gives a thickness of 20 nm for these films. In contrast, adsorption of PNTA-100 at pH 3 and PAH at pH 9 leads to much greater thicknesses. Ellipsometry and AFM data indicate that such (PAH/PNTA-100)$_5$ films are 400-500 nm thick. At pH 9, PAH likely adsorbs with a significant degree of deprotonation, and protonation of the adsorbed PAH at pH 3 during PNTA-100 deposition leads to excess positive surface charge that enhances PNTA-100 adsorption. Subsequent deprotonation of the adsorbed PNTA-100 likely increases the net negative charge density in the film and augments PAH deposition at pH 9. Surprisingly, addition of NaCl to deposition solutions decreases film thickness significantly (see FIG. S9a) when depositing PNTA-100 at pH 3 and PAH at pH 9, but a similar effect with other metal binding polymers was seen. The NaCl may screen excess surface charge to limit adsorption.

Although adsorption of PNTA-100 at pH 3 and PAH at pH 9 without added supporting electrolyte leads to thick coatings, these films show low protein binding, which may suggest significant electrostatic cross-linking. In contrast films prepared with the same deposition pH values from solutions containing 0.5 M NaCl show multilayer protein binding. Thus, adsorption of $(PAH/PNTA-X)_n$ films from polymer solutions containing 0.5 M NaCl is a focus of the following results. $(PAH/PNTA-44)_5$ and $(PAH/PNTA-19)_5$ films are thicker than the corresponding $(PAH/PNTA-100)_5$ coatings when both films are deposited from solutions containing 0.5 M NaCl (adsorption at pH 9 for PAH and pH 3 for PNTA-X). Because PNTA-44-containing polymer films bind approximately the same amount of protein as PNTA-100-containing films, hereafter only films containing PNTA-100 and PNTA-19 are compared.

Metal-ion Binding and Leaching from Membranes Modified with NTA-Containing Films: The composition of the initial polyelectrolyte adsorbed to a membrane is important to create a stable, charged surface for further film growth, and PAA adsorbs strongly to nylon membranes. Thus, a membrane modification with PAA/PAH/PNTA-X films was used. Adsorption of PAA/PAH/PNTA-100 does not cause major changes to the membrane morphology, whereas deposition of a $PAA(PAH/PNTA-100)_2$ film begins to decrease porosity. Swelling in buffer will further decrease porosity and limit flow.

Metal-ion-binding capacities for several modified membranes: For both $Cu^{2+}$ and $Ni^{2+}$, the binding capacities more than double on going from PAA/PAH/PNTA-100 to $PAA/(PAH/PNTA-100)_2$ films. Notably, the $Cu^{2+}$ binding capacity is 60-80% higher than that for $Ni^{2+}$ (a membrane with a $PAA/(PAH/PNTA-100)_2$ film binds 8.9 mg of $Ni^{2+}$ per $cm^3$). Because free —COOH groups in PAA likely bind some $Cu^{2+}$, the $Cu^{2+}$ capture by membranes modified with a PAA/PAH film was determined. Such membranes bind only 1.7 mg of $Cu^{2+}$ per $cm^3$ of membrane, which is not sufficient to account for the difference in $Cu^{2+}$ and $Ni^{2+}$ binding. Thus the higher $Cu^{2+}$ binding capacity likely reflects stronger affinity for NTA sites in the film. Because of electrostatic interactions between NTA and protonated amines, the NTA ligands may exhibit a range of affinities for metal ions, and low affinity sites may not capture $Ni^{2+}$ under the loading conditions.

In addition to metal-ion-binding capacity, leaching of bound metal ions may also affect protein purification. Initially, leaching values of $Ni^{2+}$ from PAA/BPEI/PAA-NTA- and $PAA(PAH/PNTA-100)_2$-modified membranes were compared. In the PAA/BPEI/PAA-NTA-modified membrane, the binding buffer, which contains only 10 mM imidazole, elutes about 50% of the bound $Ni^{2+}$ (FIG. 19). Again, some metal ions likely bind to free PAA—COOH groups, which have a lower affinity for $Cu^{2+}$ and $Ni^{2+}$ than NTA groups.

The PNTA-100-containing films show much less leaching than membranes with PAA/BPEI/PAA-NTA (FIG. 19). Even after washing with the elution buffer containing 0.5 M imidazole, >70% of the $Ni^{2+}$ remained on the $PAA(PAH/PNTA-100)_2$-modified membrane as the subsequent elution with 0.1 M EDTA shows. Leaching from membranes containing $PAA(PAH/PNTA-100)_2$ is similar to that from commercial beads that contain NTA. Furthermore, leaching values from different PNTA-X systems were compared. PAA/PAH/PNTA-100 and PAA/PAH/PNTA-19 films in membranes both retain 70-80% of their $Ni^{2+}$ after treatment with several binding and elution buffers.

Protein Binding to $Cu^{2+}/Ni^{2+}$-containing Membranes: Based on experiments with polyelectrolyte multilayers on Au-coated wafers, $(PAH/PNTA-19)_n$ binds more protein than $(PAH/PNTA-100)_n$. However, passage of a 0.3 mg/mL Con A solution through membranes modified with either PAA/PAH/PNTA-100—$Cu^{2+}$ or PAA/PAH/PNTA-19—$Cu^{2+}$ gave similar binding capacities of only 20-25 mg of Con A per $cm^3$ of membrane. Thus the acrylic acid groups in PNTA-19 did not increase protein binding in membranes containing only one PAH/PNTA-X—$Cu^{2+}$ bilayer. The effect of the additional acrylic acid groups on protein binding may prove more important in $PAA(PAH/PNTA-19)_n$—$Cu^{2+}$ films, but adsorption of a second PAH/PNTA-19 bilayer plugged membrane pores.

Because $PAA(PAH/PNTA-100)_2$ films do not plug membrane pores, binding of HisU to membranes modified with $PAA(PAH/PNTA-100)_2$—$Ni^{2+}$ coatings was investigated. The binding capacity of these membranes is 18±1 mg/mL. Interestingly, for a PAA/PAH/PNTA-100-$Ni^{2+}$-modified membrane, the His-U binding capacity is 47±5 mg/mL based on breakthrough curves, and elution gives a binding capacity of 40±3 mg/mL.

Adsorption of a second PAH/PNTA-100 bilayer leads to less protein capture. Plugging of pores may block some binding sites, and the SEM investigation suggests that highly water-swollen $(PAA/PAH/PNTA-100)_2$—$Ni^{2+}$ films may block pores.

Membranes containing PAA/PAH/PNTA-19-$Ni^{2+}$ bind the same amount of protein (46 mg of His U per mL) as membranes with PAA/PAH/PNTA-100-$Ni^{2+}$. Thus, the acrylic acid groups in PNTA-19 again do not enhance binding. As Table 1 shows, membranes with PAA/BPEI/PAA-NTA films bind 89 mg of His U/mL of membrane, or approximately twice the amount of His U captured in membranes modified with PAA/PAH/PNTA-19-$Ni^{2+}$ or PAA/PAH/PNTA-100-$Ni^{2+}$. The PAA/BPEI/PAA-NTA-$Ni^{2+}$ films apparently present the most protein-accessible $Ni^{2+}$ binding sites.

Finally, proteins were used with four different molecular masses (Table 1, bottom two rows) to study the effect of the protein size on the binding capacity of modified membranes. PAA/PAH/PNTA-19 coatings were examined, because on a flat substrate films containing PNTA-19 exhibit binding that varies with molecular mass. Both PAA/BPEI/PAA-NTA- and PAA/PAH/PNTA-19-modified membranes show their highest binding capacities of 89 and 46 mg/ml respectively, with the smallest protein, His U. Unfortunately, the binding drops to around 10 mg/mL for His-tagged PaPAM which has a molecular weight of 59 kDa. Nevertheless, we do not know if this trend is protein-dependent. In most cases membranes with PAA/PAH/PNTA-19 bind around ⅓ to ½ of the protein captured in membranes with PAA/BPEI/PAA-NTA. However, even the capacity of PAA/PAH/PNTA-modified membranes is comparable to that of commercial beads. Moreover, this new modification strategy is easy to apply and minimizes metal-ion leaching compared to membranes with PAA/BPEI/PAA-NTA.

TABLE 1

Protein-binding capacities of membranes modified with PAA/BPEI/PAA-NTA-$Ni^{2+}$ and PAA/PAH/PNTA-X-$Ni^{2+}$ films.

| | Binding capacity (mg/mL)$^a$ | | | | | | | |
|---|---|---|---|---|---|---|---|---|
| | His U | | Con A | | | | PaPAM | |
| | From | | From | | Aldolase | | From | |
| Membrane modification | break through curve | From elution | break through curve | From elution | From break through curve | From elution | break through curve | From elution |
| PAA/PAH/PNTA-100 | 47 | 40 | 25 | 28 | — | — | — | — |
| PAA(PAH/PNTA-100)$_2$ | — | — | 33 | 43 | — | — | — | — |
| PAA/PAH/PNTA-19 | 46 | 34 | 25 | 30 | 22 | 18 | 7.8 | — |
| PAA/BPEI/PAA-NTA | 89 | 85 | 73 | 70 | 55 | 56 | 11 | 14 |

$^a$Protein binding occurred from solutions containing 0.3 mg of protein per mL in pH 7.4 buffer, or pH 6.0 buffer for Con A. The Con A binding employed $Cu^{2+}$ complexes rather than $Ni^{2+}$. These experiments were performed only once.

Summary: This example shows a simple approach, LBL adsorption with polymers containing NTA groups, to create films for strong metal-ion binding and selective capture of His-tagged proteins. Reaction of poly(ε-acryloyl L-lysine) with chloroacetic acid provides a convenient route to NTA-containing polymers, and adsorption of a PAA/PAH/PNTA-100-$Ni^{2+}$ film in a porous membrane yields a His-tagged ubiquitin binding capacity of 47±5 mg/mL, which is comparable to the capacity of commercial beads. Films with PNTA-100 show less metal-ion leaching than coatings containing PAA derivatized with aminobutyl NTA, probably because weak binding to residual acid groups of PAA acid promotes leaching. The His-tagged protein-binding capacity of (PAH/PNTA-X)—$Ni^{2+}$-modified membranes is half of that for membranes modified through adsorption of PAA/BPEI/PAA followed by aminobutyl NTA derivatization. However, direct adsorption of PAH and PNTA-X in membranes is simpler than previous membrane modification methods and may lead to inexpensive, disposable membranes for rapid purification of His-tagged protein.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the articles, compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

REFERENCES

1. Carlotti, S.; Labbe, A.; Rejsek, V.; Doutaz, S.; Gervais, M.; Deffieux, A. Living/Controlled Anionic Polymerization and Copolymerization of Epichlorohydrin with Tetraoctylammonium Bromide-Triisobutylaluminum Initiating Systems; Macromolecules 2008, 41, 7058-7062.
2. Ehrbar, M.; Schoenmakers, R.; Christen, E; Fussenegger, M.; Weber, W. Drug-sensing hydrogels for the inducible release of biopharmaceuticals; 2008, 7, 800-804.
3. Hoffmann, K. and B. Tieke, Layer-by-layer assembled membranes containing hexacyclen-hexaacetic acid and polyethyleneimine N-acetic acid and their ion selective permeation behaviour. Journal of Membrane Science, 2009. 341(1-2): p. 261-267.
4. Meyer, J.; Keul, H.; and Moller, M. Poly(glycidyl amine) and Copolymers with Glycidol and Glycidyl Amine Repeating Units: Synthesis and Characterization; Macromolecules 2011, 44, 4082-4091.
5. Nagaoka, S., Shundo, A.; Satoh, T.; Nagira, K.; Kishi, R.; Ueno, K.; Iio, K.; Ihara, H. Method for a Convenient and Efficient Synthesis of Amino Acid Acrylic Monomers with Zwitterionic Structure; Synthetic Communications, 2005, 35, 2529-2534.
6. Naka, K.; Tachiyama, Y.; Hagihara, K.; Tanaka, Y.; Yoshimoto, M.; Ohki, A.; Maeda, S. Synthesis and Chelating Properties of Poly (N,N-Dicarboxymethyl)Allylamine Derived from Poly(Allylamine). Polym. Bull. 1995, 35, 659-663.
7. Plamper, F.; Becker, H.; Lanzendorfer, M.; Patel, M.; Wittemann, A.; Ballauff, M.; Muller, A.; Synthesis, Characterization and Behavior in Aqueous Solution of Star-Shaped Poly(acrylic acid), Macromol. Chem. Phys. 2005, 206, 1813-1825.
8. Shim, Y. H.; Bougard, F.; Coulembier, O.; Lazzaroni, R.; Dubois, P. Synthesis and characterization of original 2-(dimethylamino)ethyl methacrylate/ poly(ethylene-glycol) star-copolymers, European Polymer Journal, 2008, 44, 3715-3723.
9. Weller, D.; Medina-Oliva, A.; Claus, H.; Gietzen, S.; Mohr, K.; Reuter, A.; Schaffel, D.; Schottler, S.; Koynov, K.; Bros, M.; Grabbe, S.; Fischer, K.; Schmidtt, M. Solution Properties and Potential Biological Applications of Zwitterionic Poly(ε-N-methacryloyl-L-lysine); Macromolecules 2013, 46, 8519-8527.

10. Wijeratne, S., M. L. Bruening, and G. L. Baker, Layer-by-Layer Assembly of Thick, Cu2+-Chelating Films. Langmuir, 2013. 29(41): p. 12720-12729.

What is claimed is:

1. A method for functionalizing a porous membrane, the method comprising:
   (a) providing a porous membrane substrate comprising a plurality of membrane pores; and
   (b) contacting the membrane pores with an aqueous fluid mixture (i) having a pH value less than 3.8 and (ii) comprising a polyacid polymer comprising repeating units comprising a pendent metal-binding ligand comprising one or more free acid groups selected from the group consisting of carboxylic acid groups, carboxylate groups, and combinations thereof for a time sufficient to adsorb a polyacid layer on surfaces of the membrane pores, thereby forming a polyacid-coated porous membrane comprising the metal-binding ligand and the one or more free acid groups;
   wherein the repeating units are selected from the group consisting of:
      (i) repeating units comprising a nitrogen atom present in a backbone portion of the repeating units;
      (ii) repeating units comprising an amide group linking the pendent metal binding ligand and the polyacid polymer backbone; and
      (iii) repeating units comprising an oxygen atom present in a backbone portion of the repeating units.

2. The method of claim 1, wherein the plurality of membrane pores has an average pore size ranging from 0.02 µm to 50 µm.

3. The method of claim 1, wherein the porous membrane substrate comprises a synthetic polymeric membrane material selected from the group consisting of cellulose acetates, nitrocelluloses, cellulose esters, polysulfones, polyether sulfones, polyacrylonitriles, polyamides, polyimides, polyethylenes, polypropylenes, polytetrafluoroethylenes, polyvinylidene fluorides, polyvinylchlorides, hydroxylated derivatives of the foregoing, and combinations thereof.

4. The method of claim 1, wherein the pH value of the aqueous fluid mixture ranges from 1 to 3.5.

5. The method of claim 1, wherein the polyacid-coated porous membrane has a free acid group content ranging from 1.25 to 10 times that of an analogous polyacid-coated porous membrane in which the aqueous fluid mixture had pH value of 4.

6. The method of claim 1, wherein at least 50% of the polyacid free acid groups in the aqueous fluid mixture are in the form of carboxylic acid groups.

7. The method of claim 1, wherein the polyacid layer is stably adsorbed on the surfaces of the membrane pores due to one or more of hydrophobic interactions, hydrogen bonding interactions, and coordination interactions.

8. The method of claim 1, wherein the aqueous fluid mixture is in the form of an aqueous solution comprising the polyacid polymer and further comprising an electrolyte in solution.

9. The method of claim 1, wherein the polyacid layer is adsorbed directly on the porous membrane substrate.

10. The method of claim 1, wherein the polyacid layer is immobilized on the porous membrane substrate via one or more adhesion layers, wherein at least one of the adhesion layers is adsorbed directly on the porous membrane substrate.

11. The method of claim 1, wherein the polyacid-coated porous membrane has a monolayer of the polyacid polymer adsorbed directly on the porous membrane substrate and comprising the free acid groups.

12. The method of claim 1, wherein the polyacid-coated porous membrane substrate comprises a plurality of polyacid layers, wherein (i) a first polyacid layer is adsorbed directly on the porous membrane substrate and (ii) one or more further polyacid layers are adhered to adjacent polyacid layers via one or more intervening polycation layers.

13. The method of claim 12, wherein the method comprises performing a layer-by-layer polyelectrolyte adsorption process to deposit alternate layers of (i) the polyacid at a pH value less than 3.8 and (ii) the polycation.

14. The method of claim 1, further comprising:
   (c) contacting the metal-binding ligands with metallic ions to form metal-ligand complexes at the surfaces exposed to membrane pore void volumes.

15. The method of claim 14, wherein the metallic ions comprise $Ni^{2+}$.

16. The method of claim 14, wherein the metallic ions comprise one or more of $Cu_{2+}$, $Co_{2+}$, $Fe_{3+}$, and $Ga^{3+}$.

17. The method of claim 1, wherein the metal-binding ligands comprise one or more of nitrilotriacetic acid groups, iminodiacetic acid groups, and salts thereof.

18. A method for functionalizinq a porous membrane, the method comprising:
   (a) providing a porous membrane substrate comprising a plurality of membrane pores; and
   (b) contacting the membrane pores with an aqueous fluid mixture (i) having a pH value less than 3.8 and (ii) comprising a polyacid polymer comprising repeating units comprising a pendent metal-bindinq liqand comprising one or more free acid groups selected from the group consisting of carboxylic acid groups, carboxylate groups, and combinations thereof for a time sufficient to adsorb a polyacid layer on surfaces of the membrane pores, thereby forming a polyacid-coated porous membrane comprising the metal-bindinq liqand and the one or more free acid groups;
   wherein:
      (i) the repeating units comprise a nitrogen atom and have the general formula $-[-CH_2-CH_2-NR-]-$; and
      (ii) R comprises the pendent metal-binding ligand.

19. A method for functionalizinq a porous membrane, the method comprising:
   (a) providing a porous membrane substrate comprising a plurality of membrane pores; and
   (b) contacting the membrane pores with an aqueous fluid mixture (i) having a pH value less than 3.8 and (ii) comprising a polyacid polymer comprising repeating units comprising a pendent metal-binding ligand comprising one or more free acid groups selected from the group consisting of carboxylic acid groups, carboxylate groups, and combinations thereof for a time sufficient to adsorb a polyacid layer on surfaces of the membrane pores, thereby forming a polyacid-coated porous membrane comprising the metal-binding ligand and the one or more free acid groups;
   wherein:
      (i) the repeating units comprise an amide linking group and have the general formula $-[-CH_2-CR_1(C(=O)NR_2 R)-]-$;
      (ii) R comprises the metal-binding ligand;
      (iii) $R_1$ is H or a $C_1$-$C_4$ alkyl or heteroalkyl group; and
      (iv) $R_2$ is H or a $C_1$-$C_4$ alkyl or heteroalkyl group.

20. The method of claim 19, wherein the polyacid polymer is a copolymer further comprising one or more repeating units selected from the group consisting of vinyl acid repeating units, vinyl amide repeating units, and alkylene repeating units.

21. A method for functionalizing a porous membrane, the method comprising:
(a) providing a porous membrane substrate comprising a plurality of membrane pores; and
(b) contacting the membrane pores with an aqueous fluid mixture (i) having a pH value less than 3.8 and (ii) comprising a polyacid polymer comprising repeating units comprising a pendent metal-binding ligand comprising one or more free acid groups selected from the group consisting of carboxylic acid groups, carboxylate groups, and combinations thereof for a time sufficient to adsorb a polyacid layer on surfaces of the membrane pores, thereby forming a polyacid-coated porous membrane comprising the metal-binding ligand and the one or more free acid groups;
wherein:
(i) the repeating units comprise an oxygen atom and have the general formula —[—O—$CH_2$—CH($CH_2$NR)—]—; and
(ii) R comprises the metal-binding ligand.

22. The method of claim 21, wherein the polyacid polymer is a copolymer further comprising one or more alkylene oxide repeating units comprising a polyalkylene oxide pendent group.

23. A polyacid-coated porous membrane formed according claim 1.

24. The method of claim 1, wherein:
(i) the repeating units comprise the nitrogen atom and have the general formula —[—($CR_a R_b$)$_n$—NR—]—;
(ii) n is 2, 3, or 4;
(iii) $R_a$ is H or a $C_1$-$C_4$ alkyl or heteroalkyl group;
(iv) $R_b$ is H or a $C_1$-$C_4$ alkyl or heteroalkyl group; and
(v) R comprises the metal-binding ligand and a $C_2$-$C_{16}$ alkyl or heteroalkyl group.

25. The method of claim 1, wherein:
(i) the repeating units comprise the oxygen atom and have the general formula —[—($CR_a R_b$)$_n$—CH($R_c$NR)—]—;
(ii) n is 1, 2, or 3;
(iii) $R_a$ is H or a $C_1$-$C_4$ alkyl or heteroalkyl group;
(iv) $R_b$ is H or a $C_1$-$C_4$ alkyl or heteroalkyl group;
(iv) $R_c$ is a $C_1$-$C_4$ alkyl or heteroalkyl linking group; and
(v) R comprises the metal-binding ligand and a $C_2$-$C_{16}$ alkyl or heteroalkyl group.

* * * * *